(12) United States Patent
Lee et al.

(10) Patent No.: US 10,873,422 B2
(45) Date of Patent: Dec. 22, 2020

(54) METHOD FOR EXECUTING HARQ IN WIRELESS COMMUNICATION SYSTEM AND DEVICE THEREFOR

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 16/079,652

(22) PCT Filed: Feb. 26, 2016

(86) PCT No.: PCT/KR2016/001920
§ 371 (c)(1),
(2) Date: Aug. 24, 2018

(87) PCT Pub. No.: WO2017/146287
PCT Pub. Date: Aug. 31, 2017

(65) Prior Publication Data
US 2019/0068331 A1     Feb. 28, 2019

(51) Int. Cl.
*H04L 1/18*     (2006.01)
*H04L 5/00*     (2006.01)
(Continued)

(52) U.S. Cl.
CPC ............. *H04L 1/1819* (2013.01); *H04L 1/18* (2013.01); *H04L 1/1845* (2013.01); *H04L 1/1861* (2013.01); *H04L 1/1864* (2013.01); *H04L 1/1896* (2013.01); *H04L 5/0035* (2013.01); *H04L 5/0055* (2013.01); *H04W 74/0833* (2013.01); *H04W 76/27* (2018.02); *H04L 5/0007* (2013.01)

(58) Field of Classification Search
CPC ....... H04L 1/1819; H04L 1/18; H04L 1/1861; H04L 1/1845; H04L 1/1864; H04L 1/1896; H04L 5/0035; H04L 5/0055; H04L 5/0007
See application file for complete search history.

(56) References Cited

U.S. PATENT DOCUMENTS

2010/0275086 A1     10/2010  Bergquist et al.
2011/0243048 A1*    10/2011  Wang ................... H04L 5/0051
                                              370/311
(Continued)

OTHER PUBLICATIONS

PCT International Application No. PCT/KR2016/001920, International Search Report dated Nov. 25, 2016, 4 pages.

*Primary Examiner* — Cynthia Britt
*Assistant Examiner* — Rong Tang
(74) *Attorney, Agent, or Firm* — Lee Hong Degerman Kang Waimey

(57) ABSTRACT

In this specification, a method of performing a hybrid automatic request (HARQ) in a wireless communication system is performed by a user equipment, and includes receiving first data from a first eNB through a first radio link; receiving second data from at least one second eNB through a second radio link; combining the first data and the second data; decoding the combined data; and feedbacking the results of the decoding through at least one of the first radio link or the second radio link.

11 Claims, 42 Drawing Sheets

(51) Int. Cl.
*H04W 76/27* (2018.01)
*H04W 74/08* (2009.01)

(56) References Cited

U.S. PATENT DOCUMENTS

| | | |
|---|---|---|
| 2012/0287869 A1 | 11/2012 | Xi et al. |
| 2013/0250881 A1* | 9/2013 | Liao ................ H04L 5/0035 370/329 |
| 2013/0294367 A1 | 11/2013 | Jalloul et al. |
| 2014/0040694 A1 | 2/2014 | Verma et al. |
| 2015/0036655 A1* | 2/2015 | Pelletier ............ H04L 5/0005 370/330 |

* cited by examiner

【Figure 1】
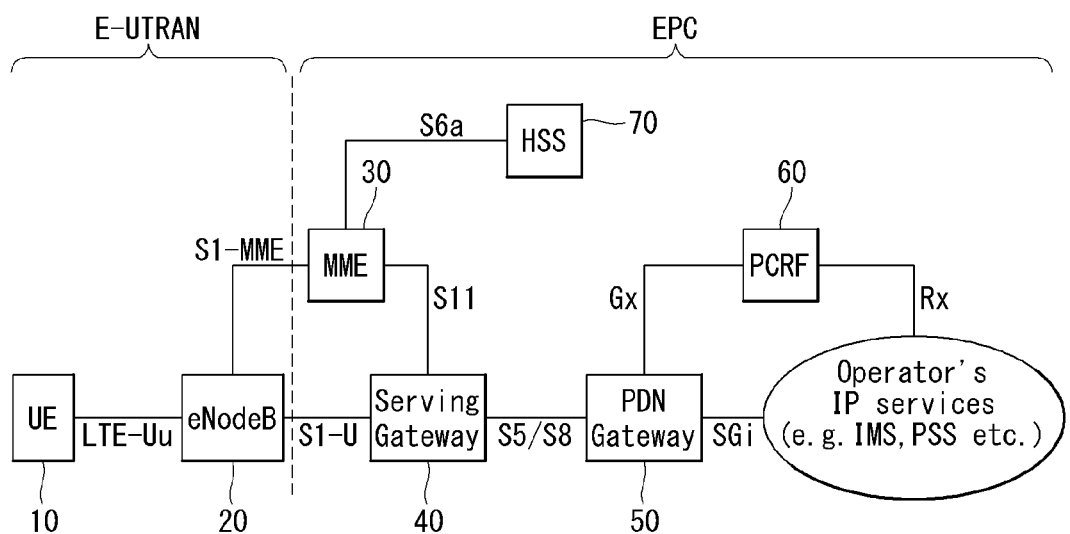

[Figure 2]
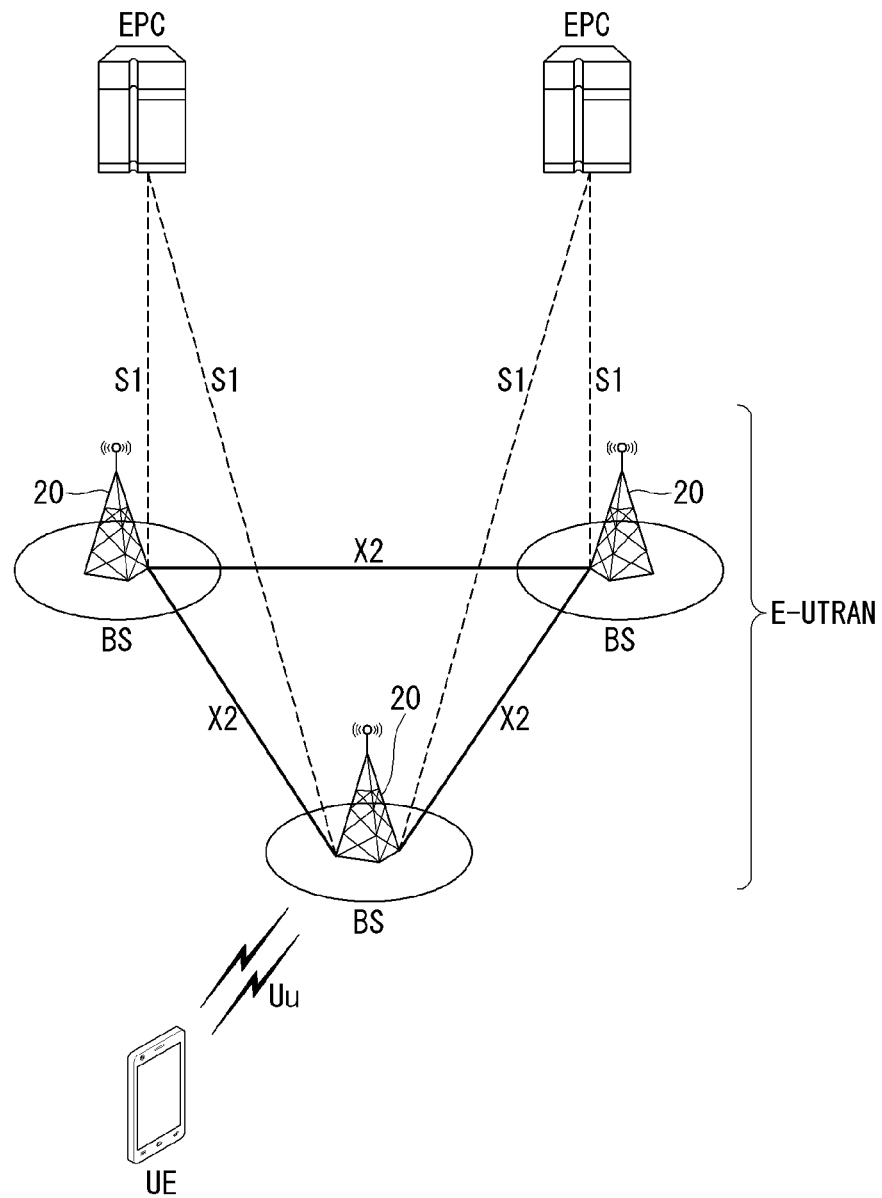

【Figure 3】
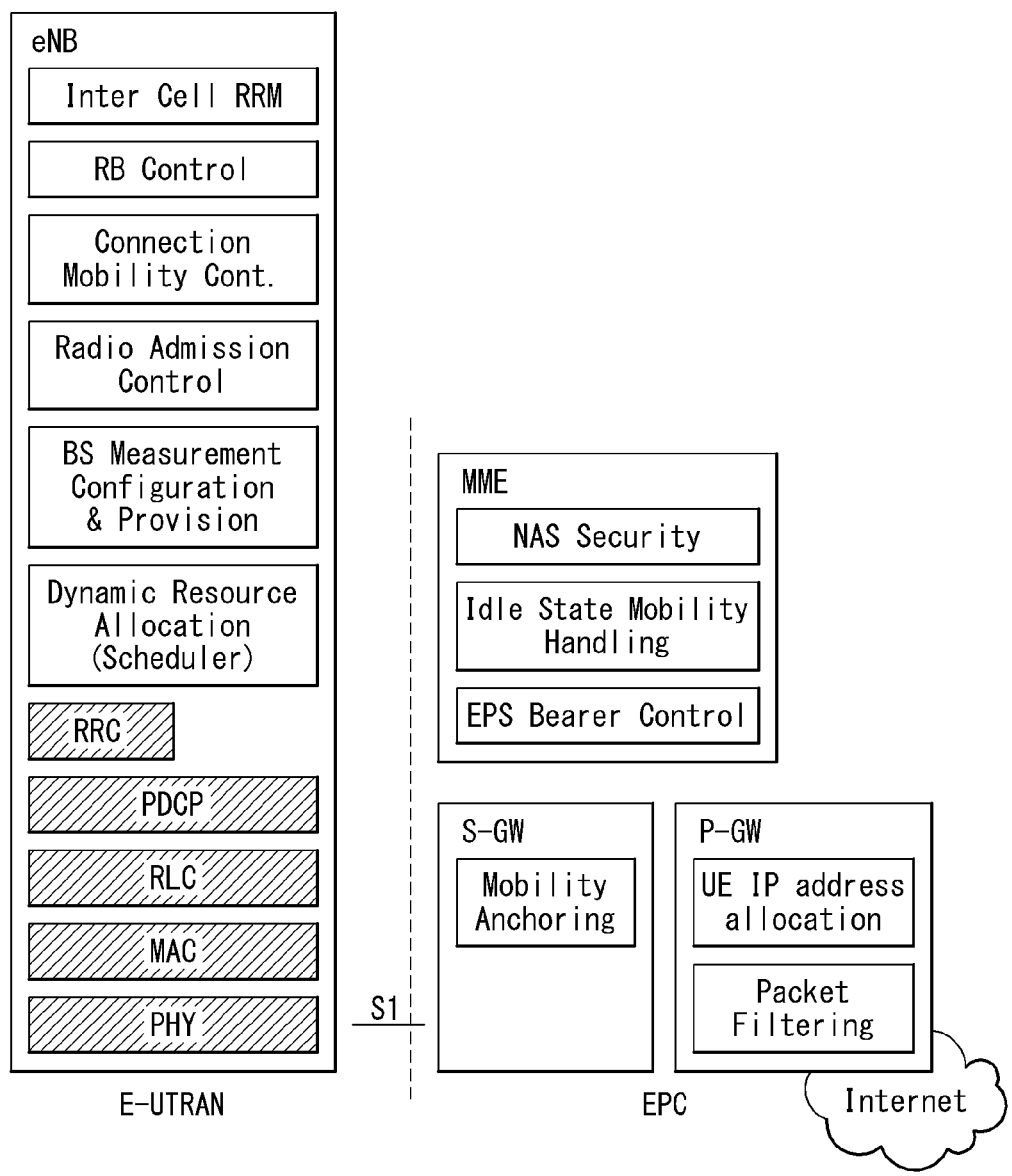

【Figure 4】
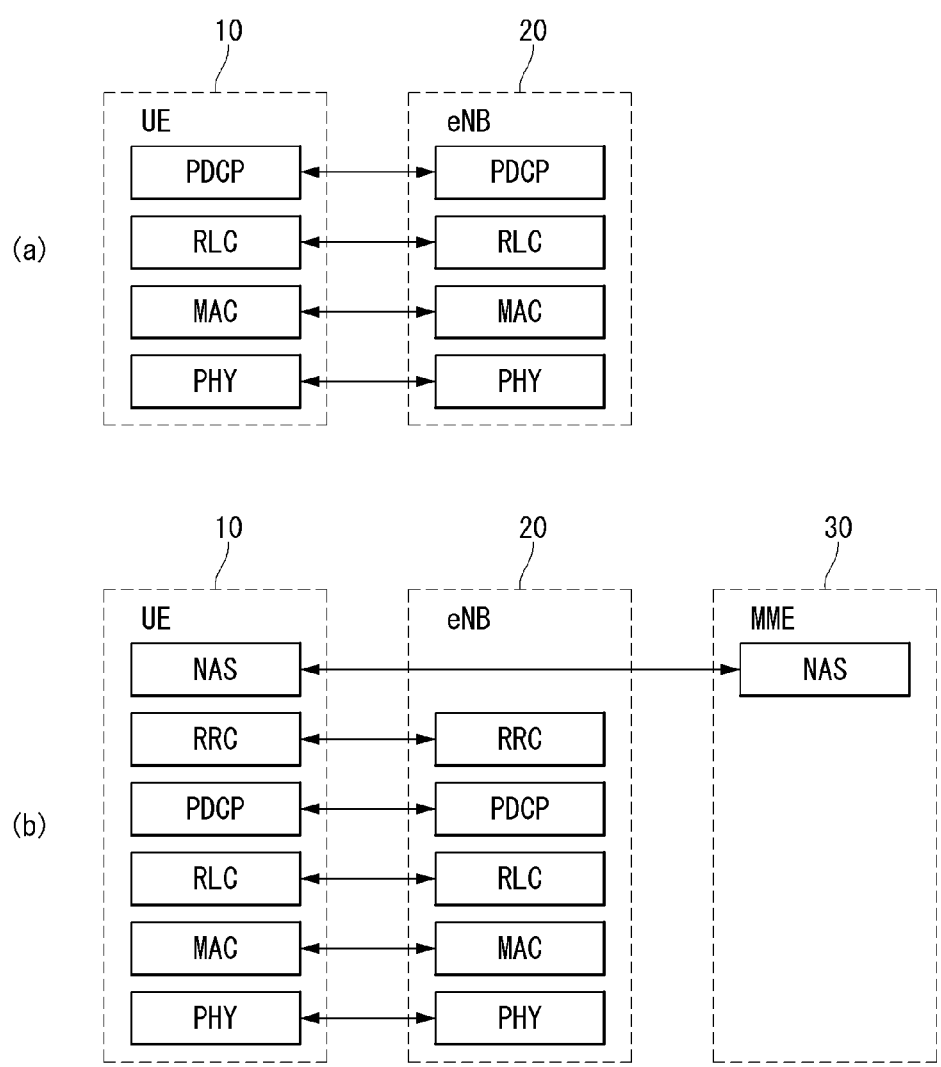

【Figure 5】
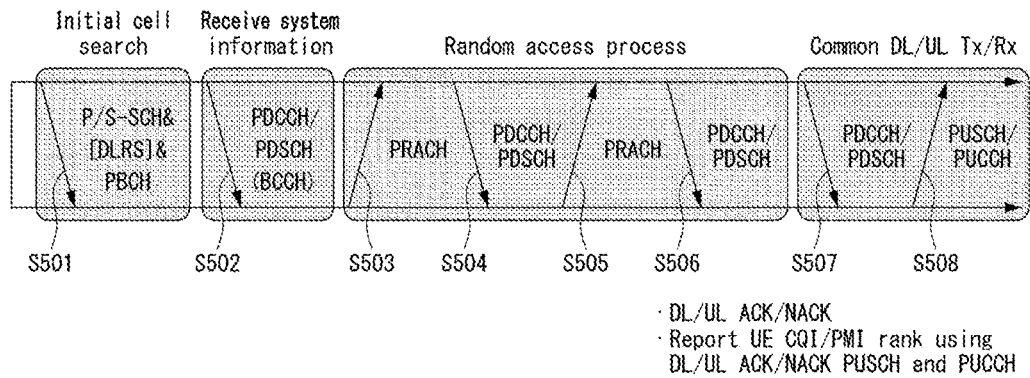
【Figure 6】
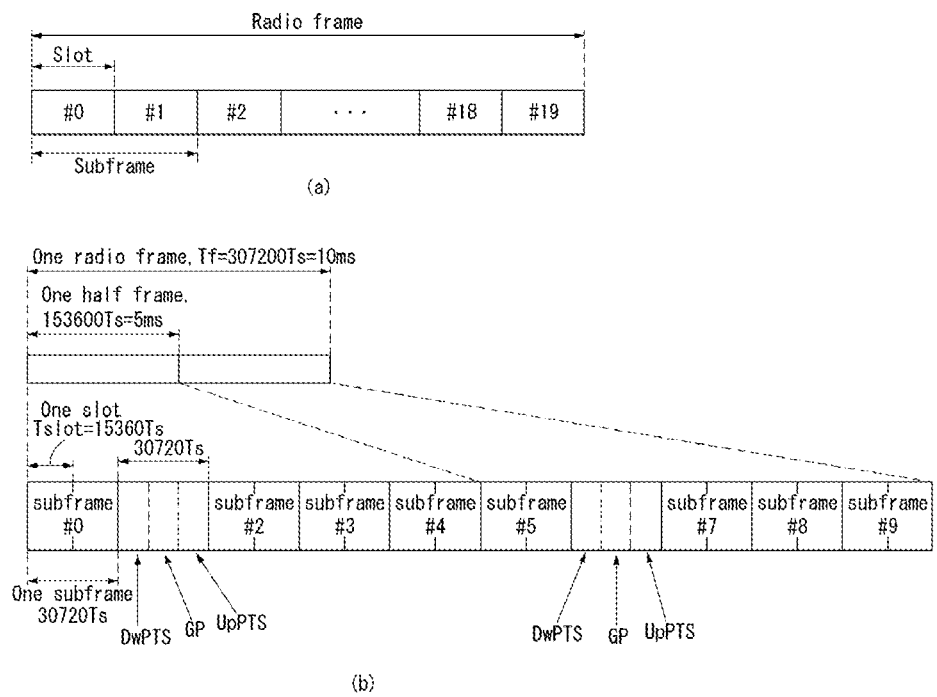

[Figure 7]
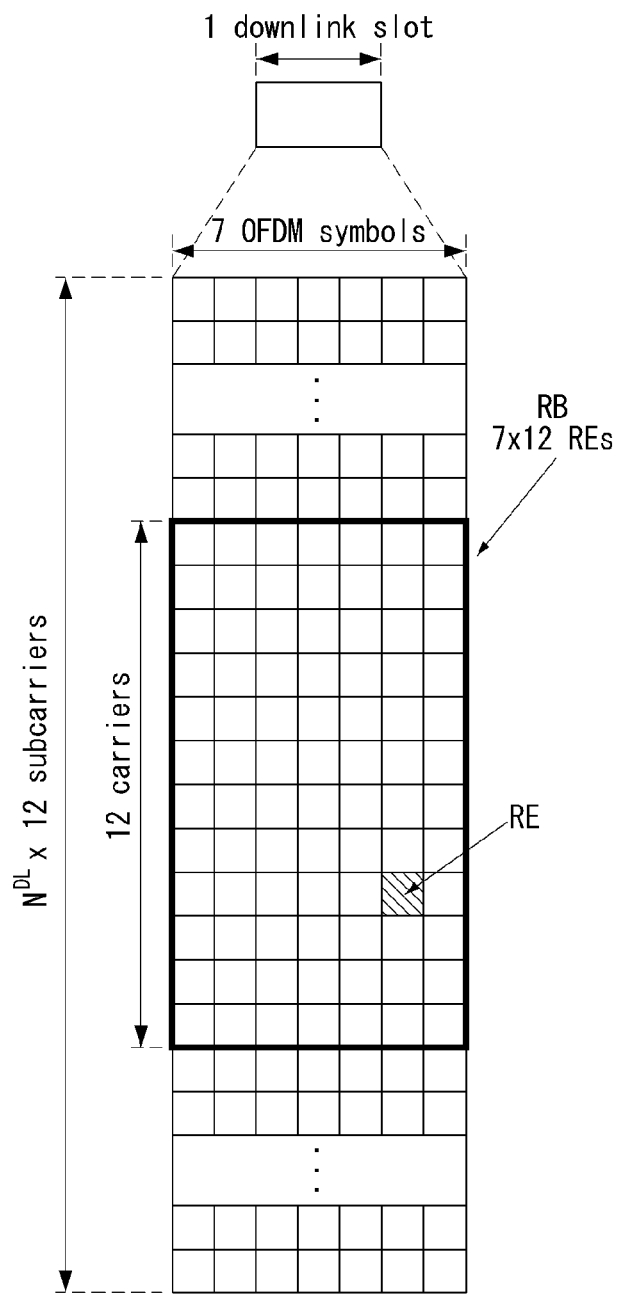

【Figure 8】
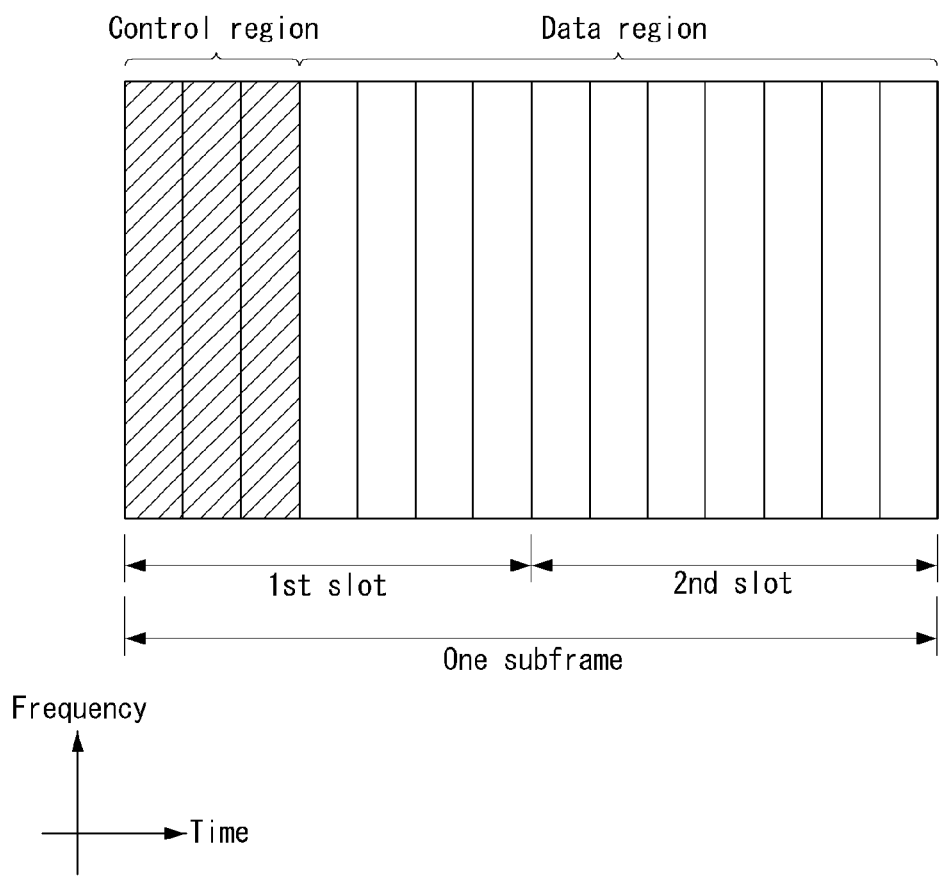

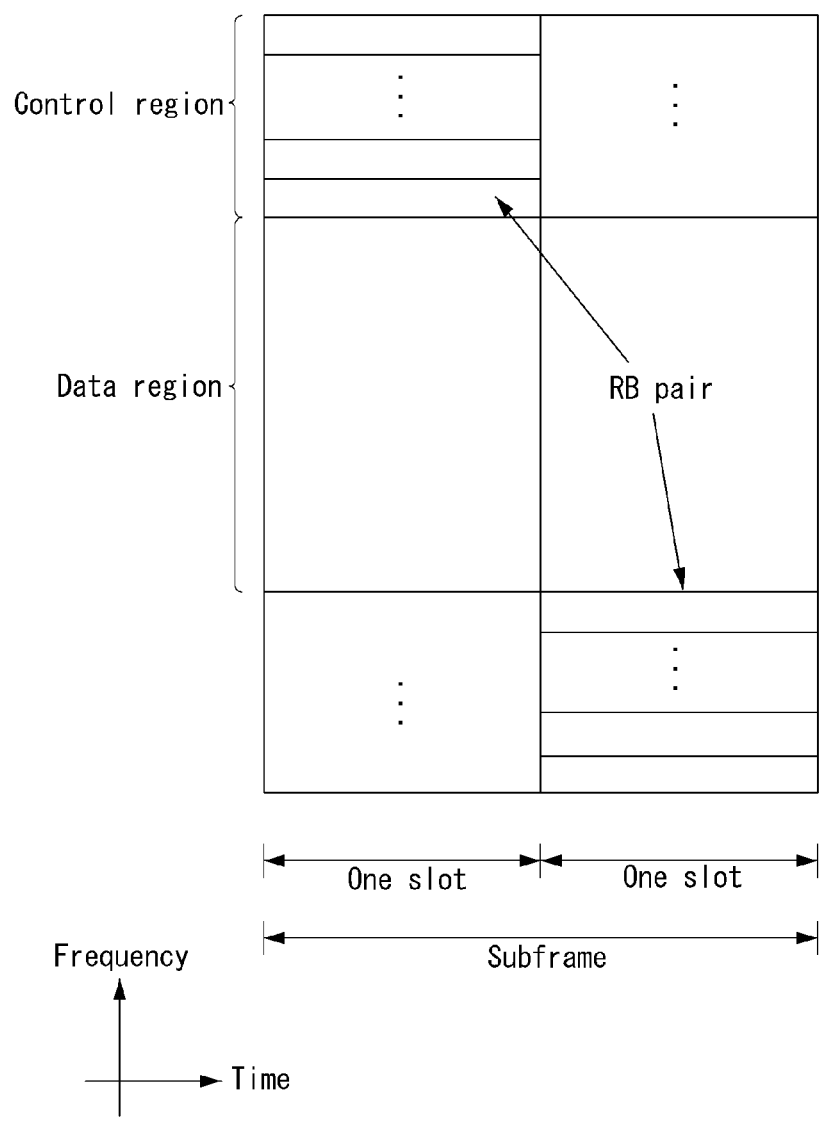
[Figure 9]

[Figure 10]
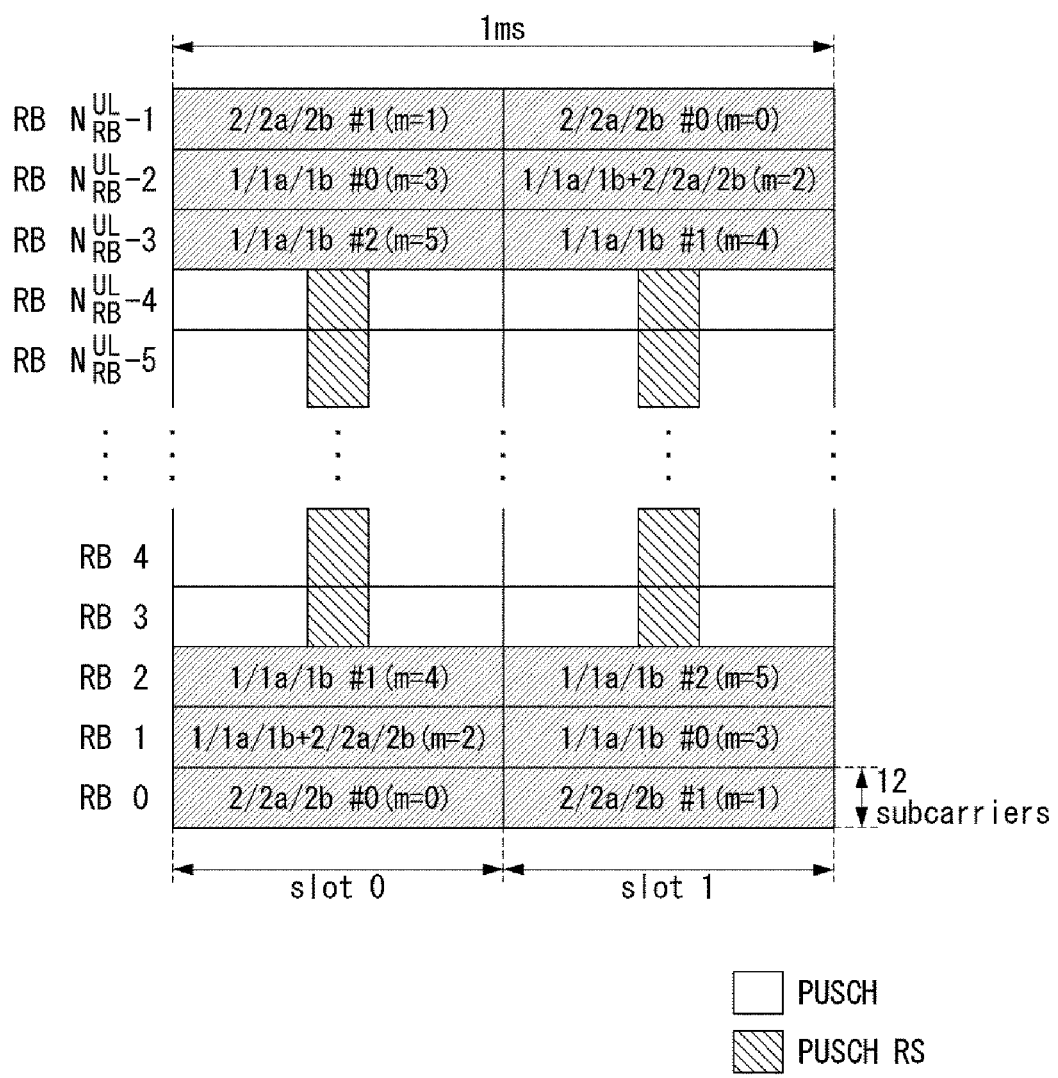

【Figure 11】
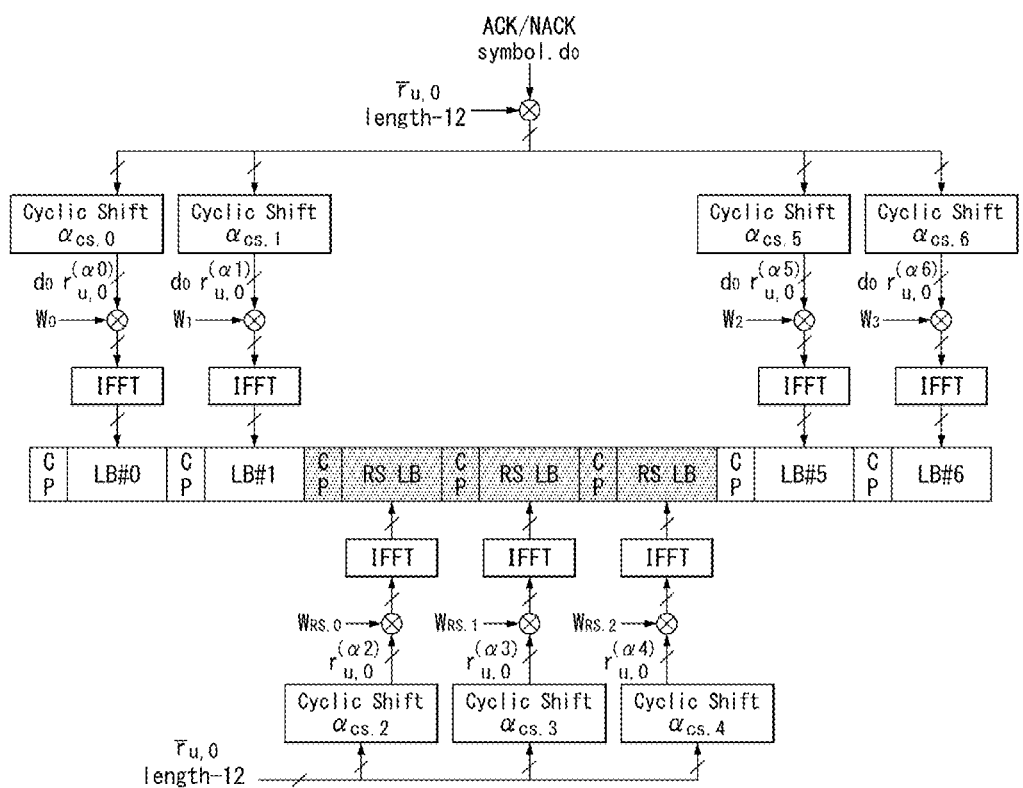

[Figure 12]
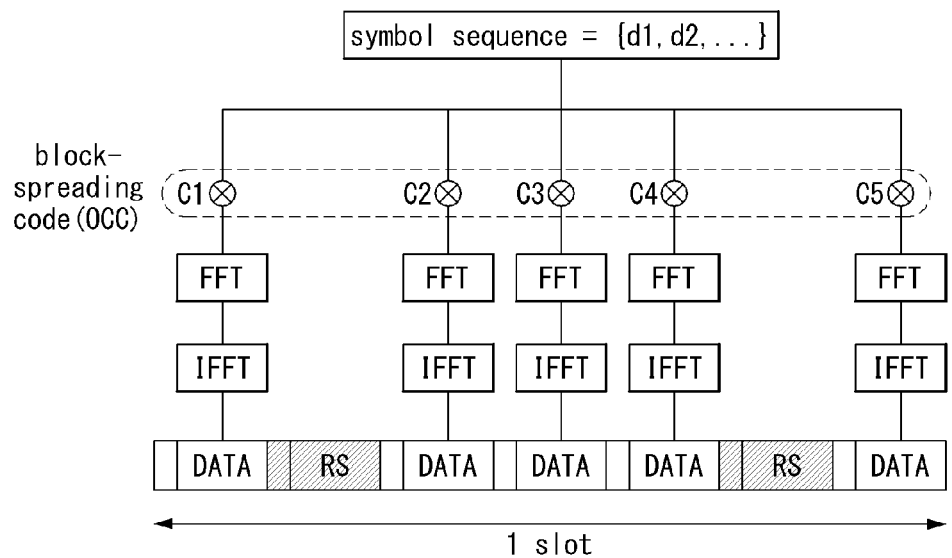
[Figure 13]
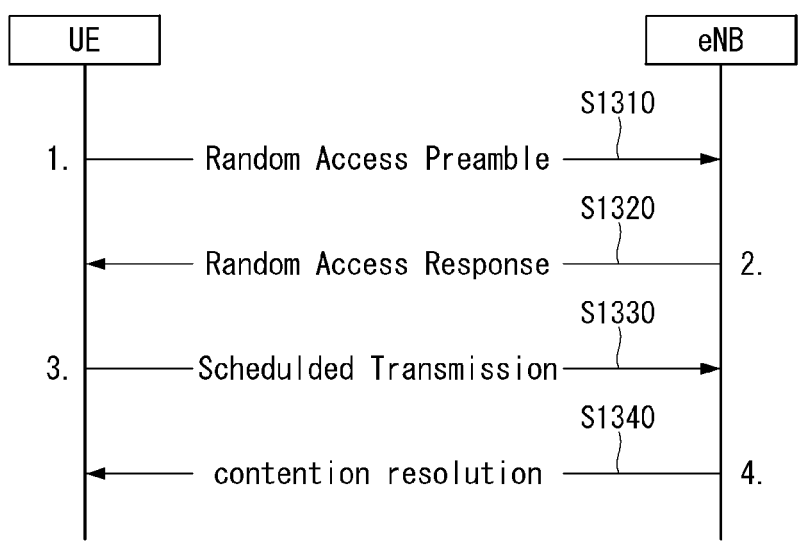

【Figure 14】
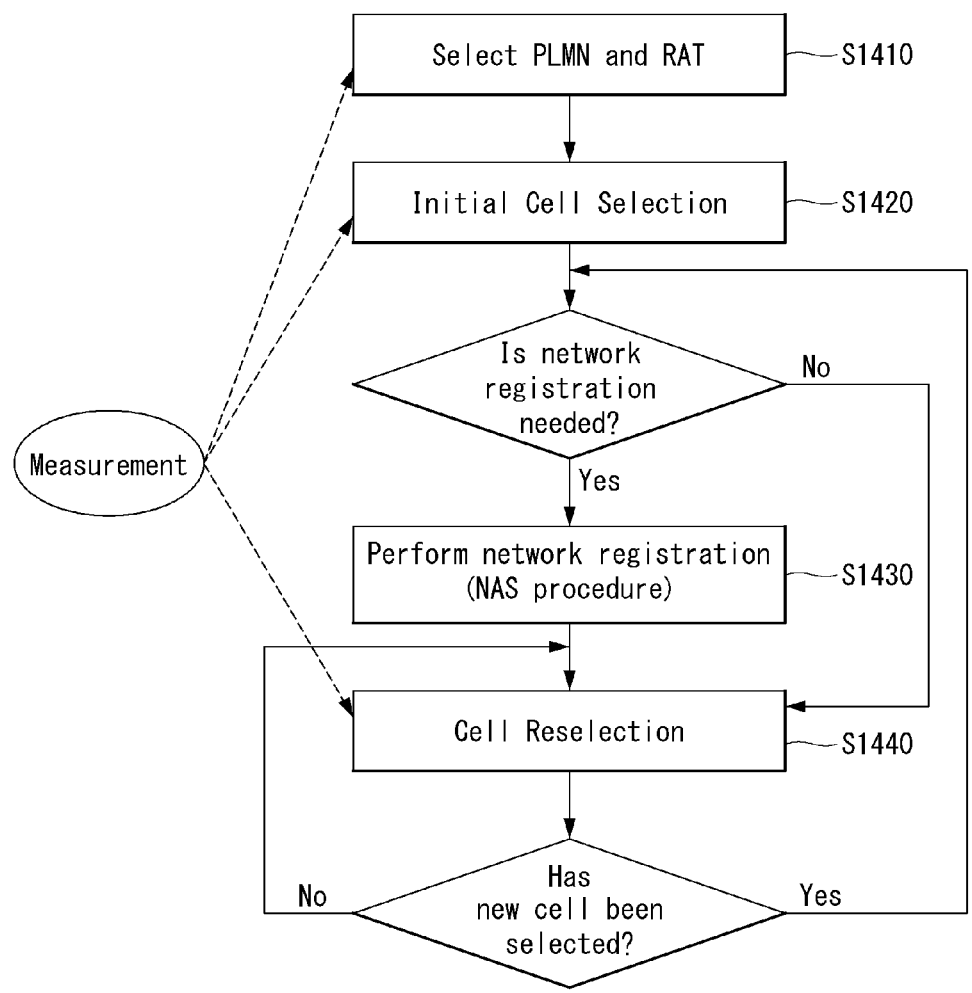

【Figure 15】
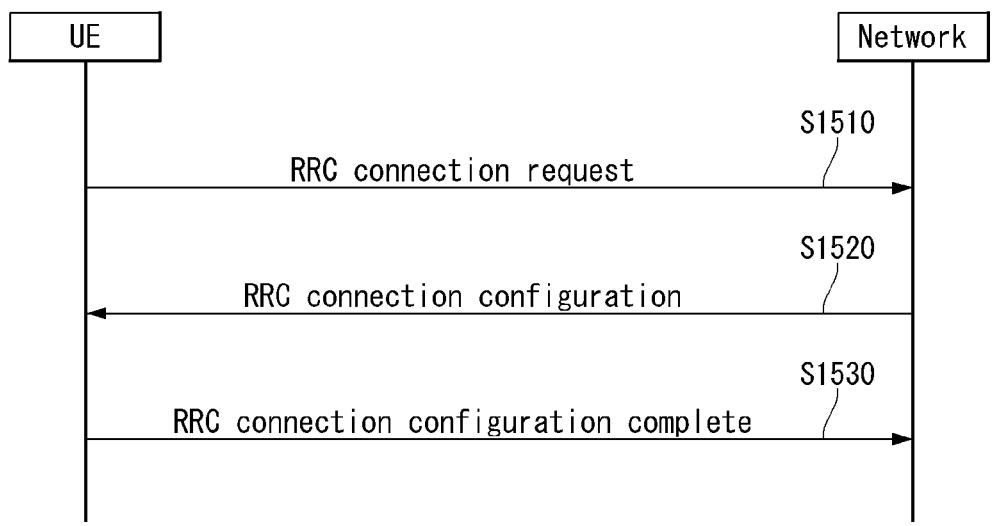
【Figure 16】
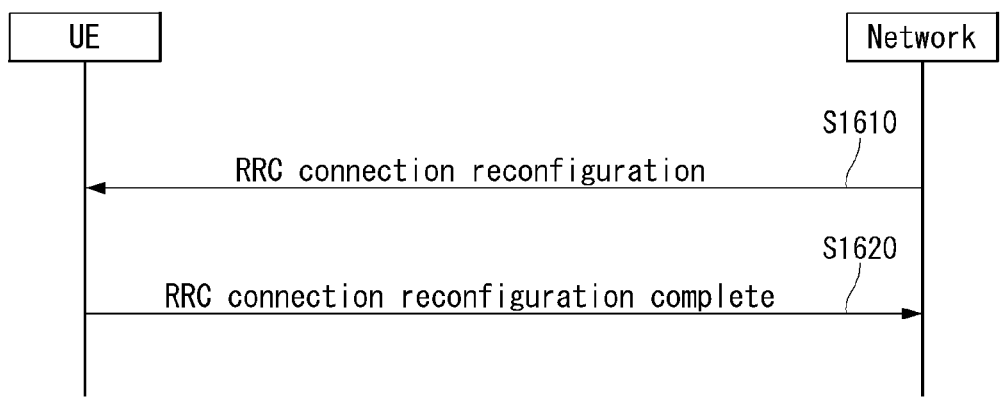

[Figure 17]
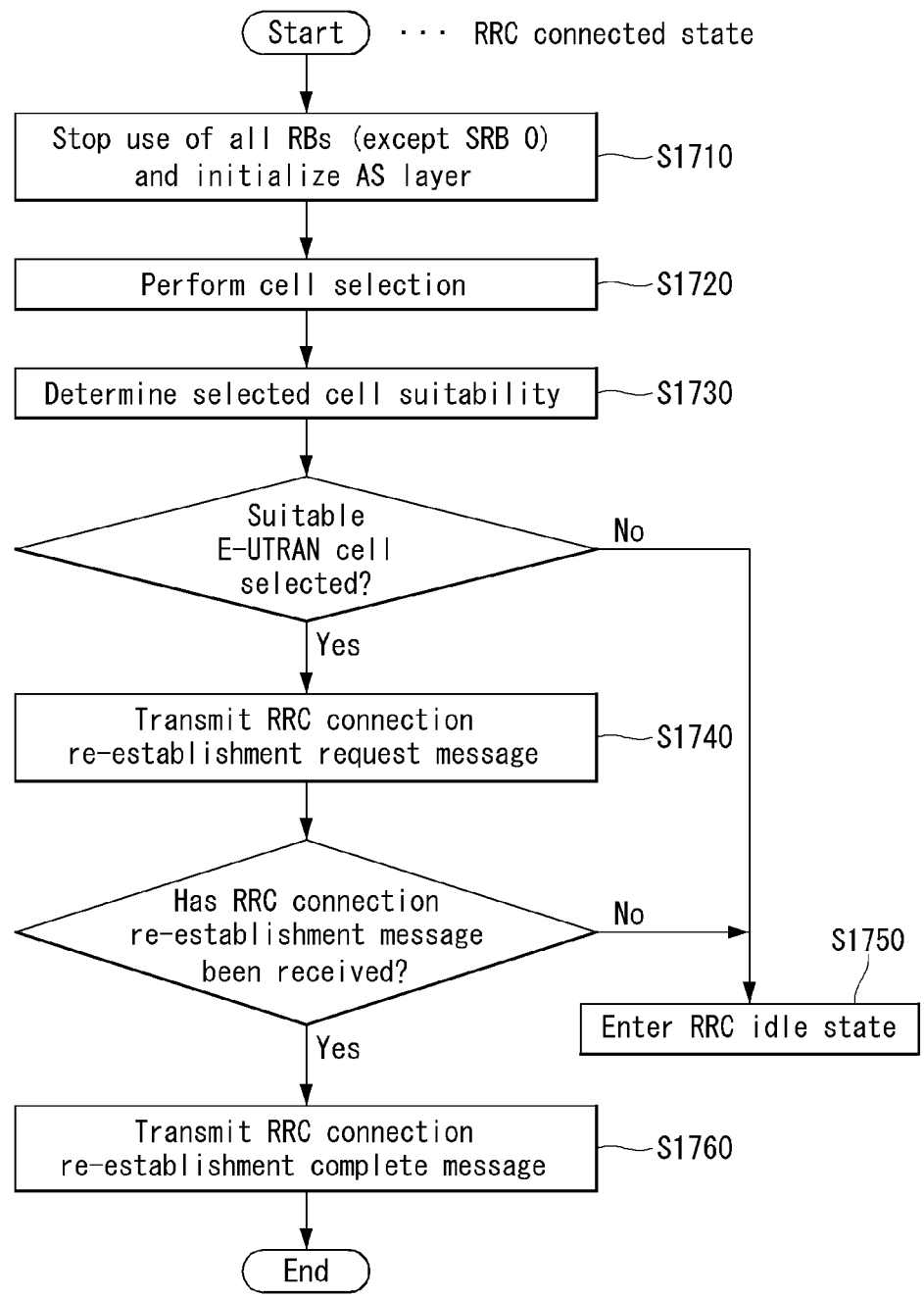

【Figure 18】
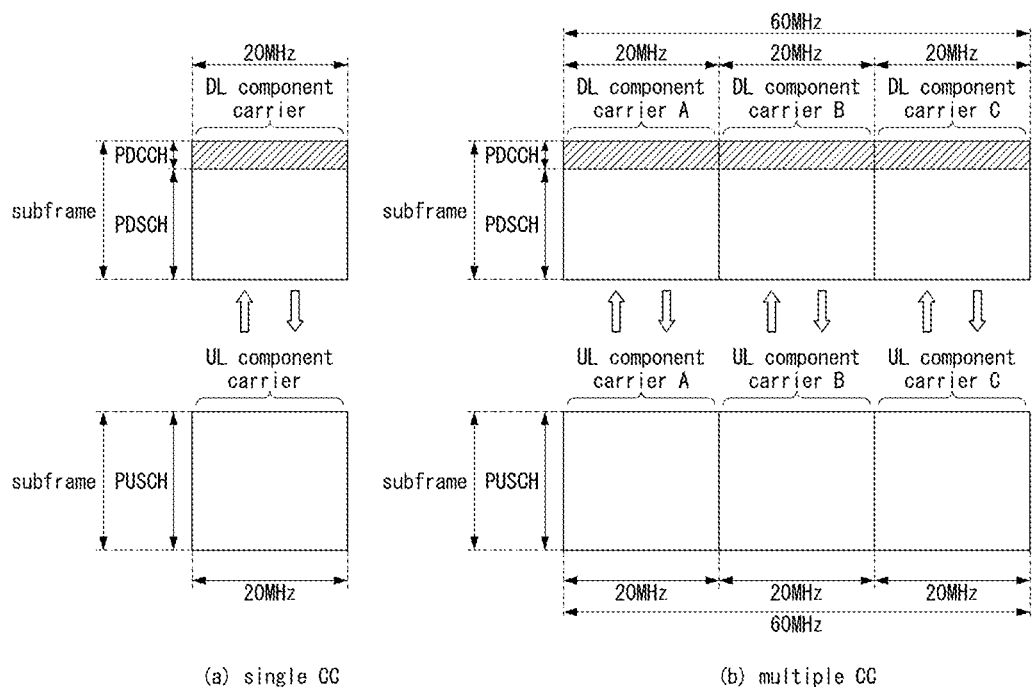
(a) single CC
(b) multiple CC

【Figure 19】
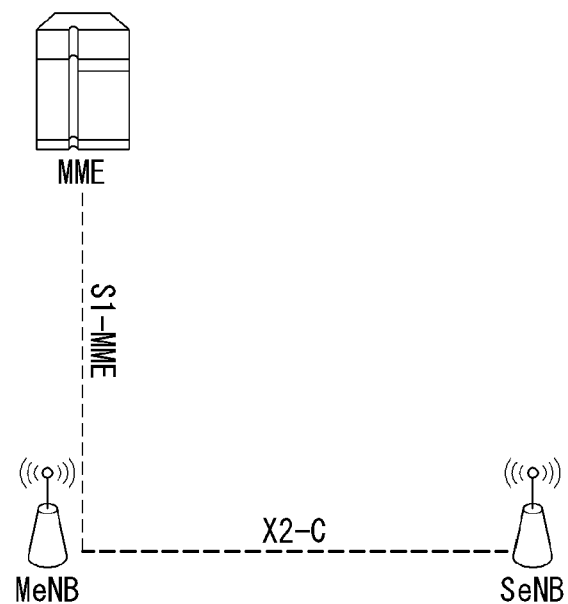
【Figure 20】
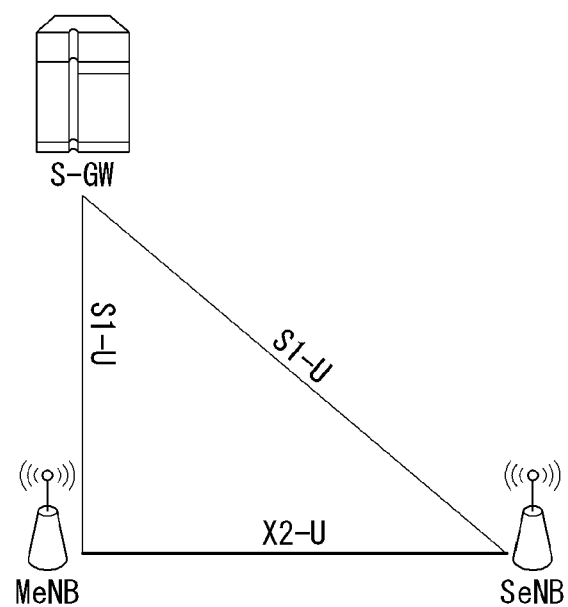

【Figure 21】
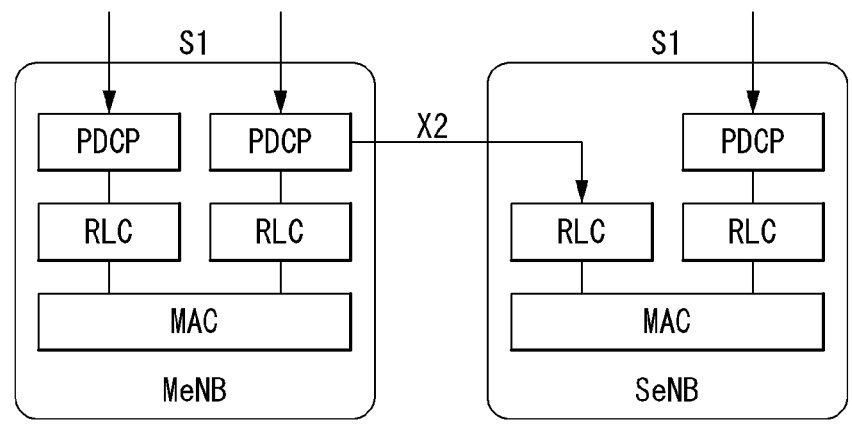
【Figure 22】
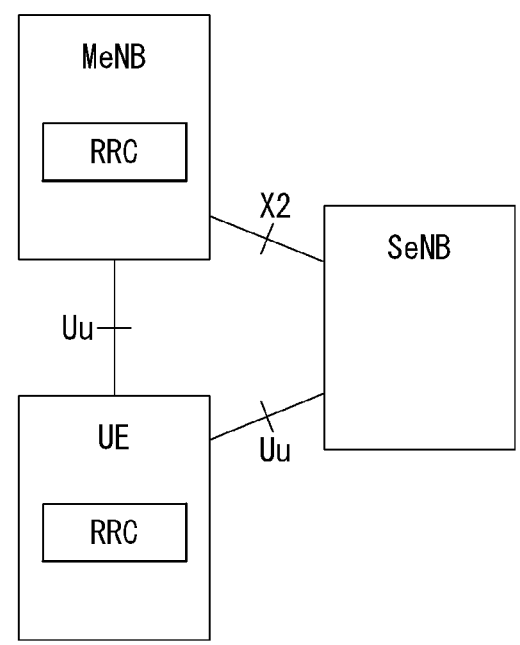

[Figure 23]
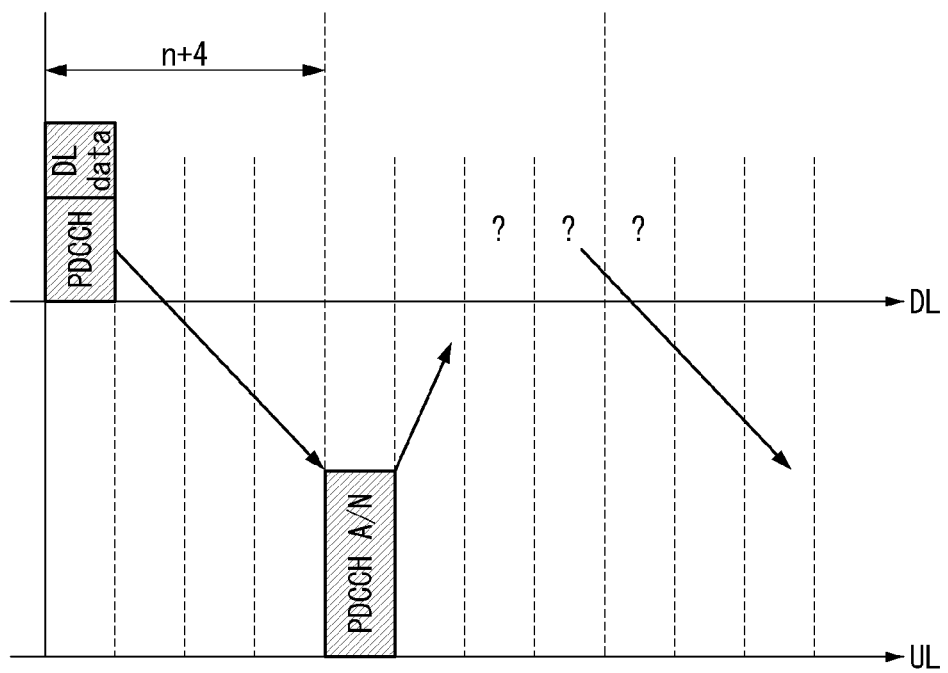

【Figure 24】
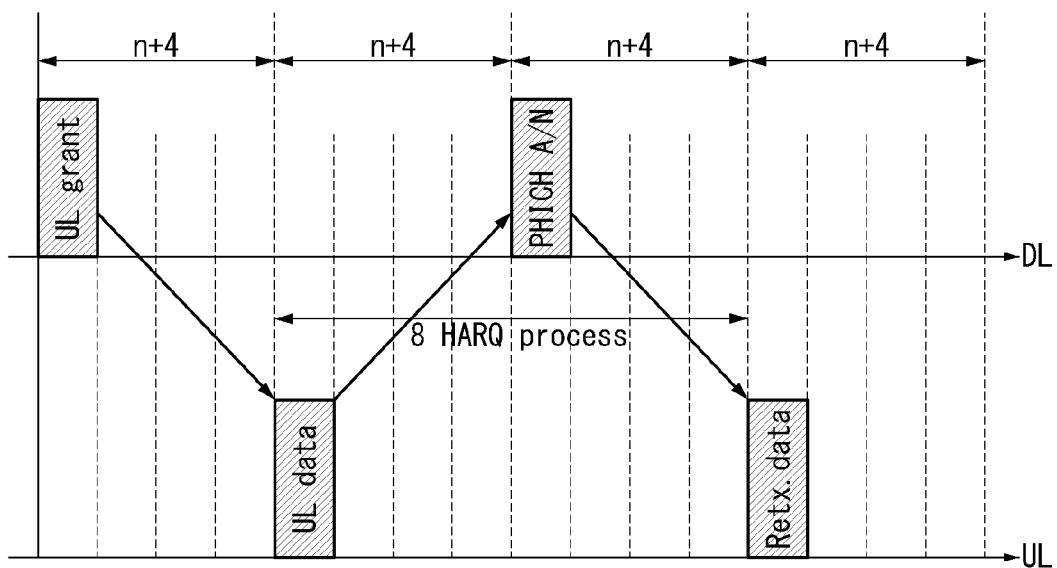

【Figure 25】
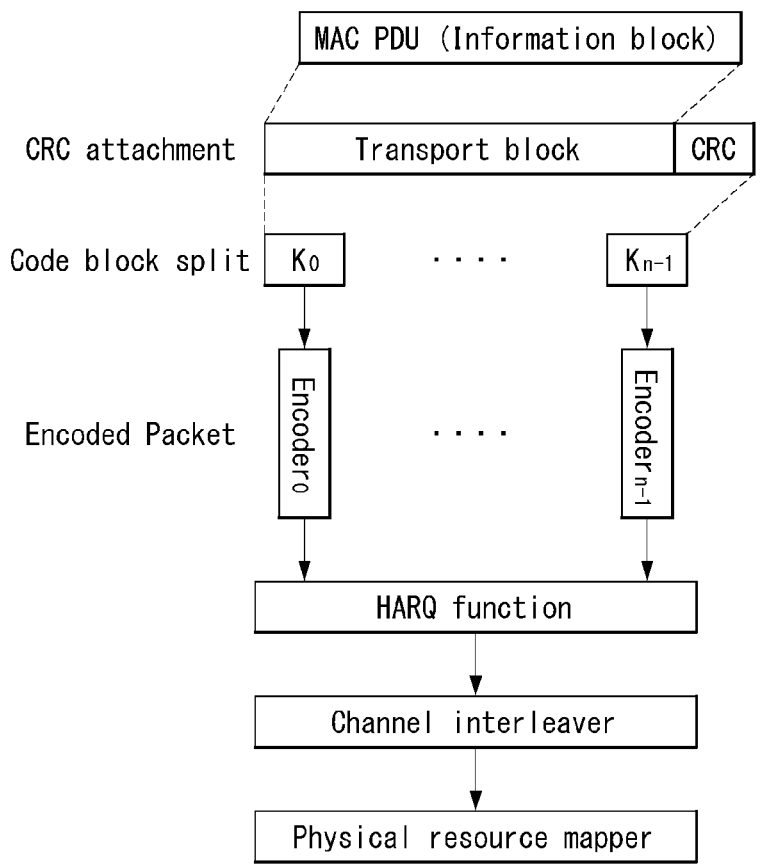
【Figure 26】
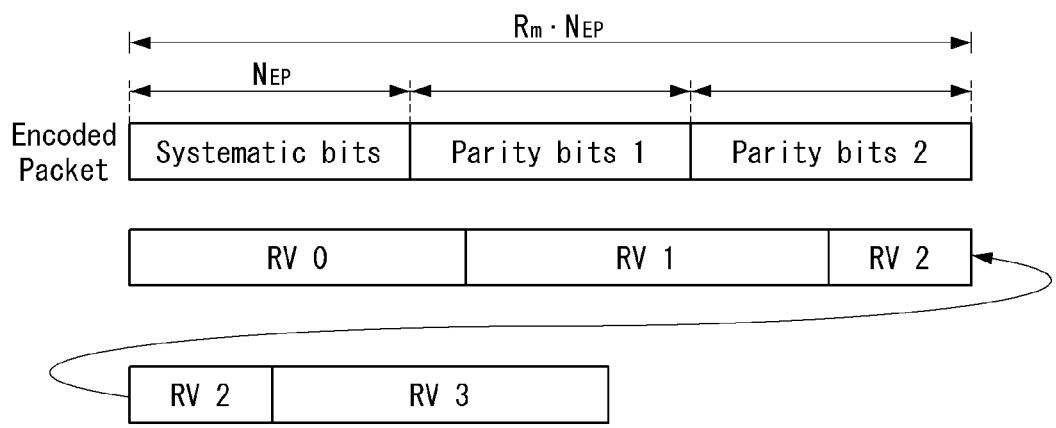

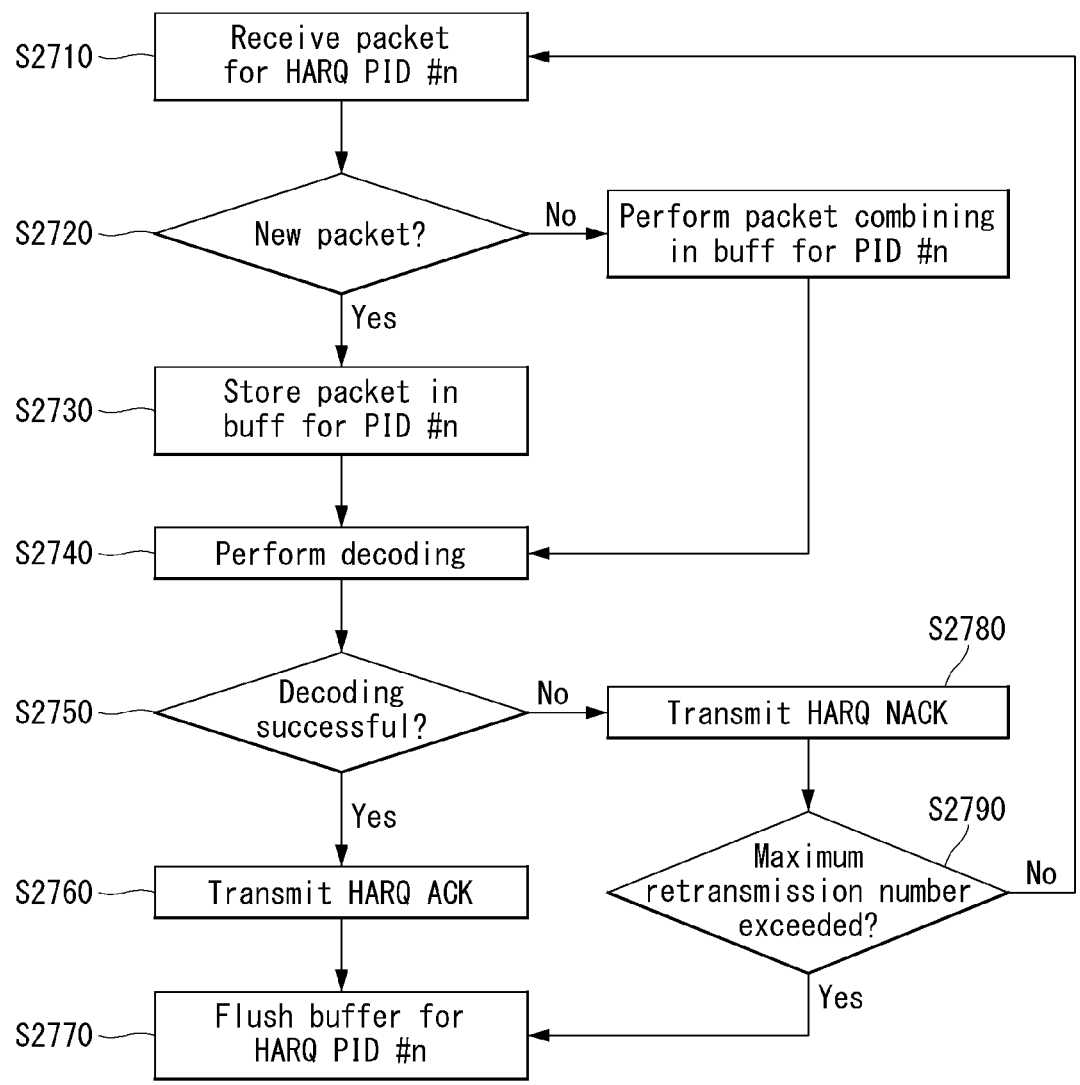
[Figure 27]

[Figure 28]
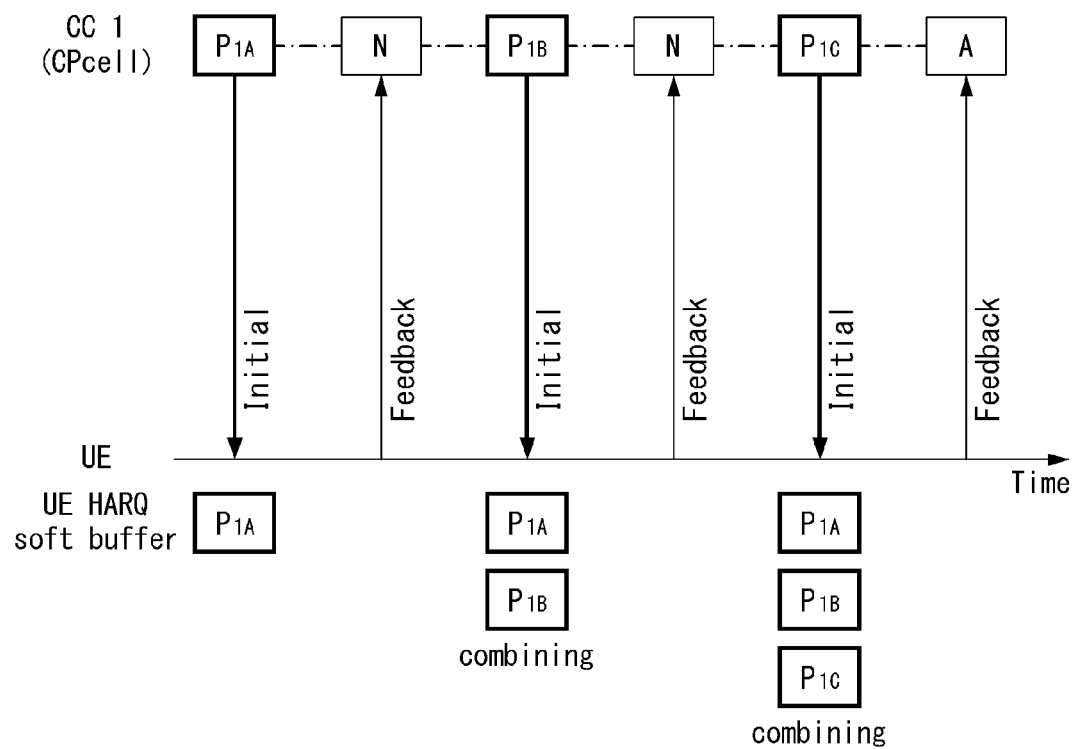

[Figure 29]
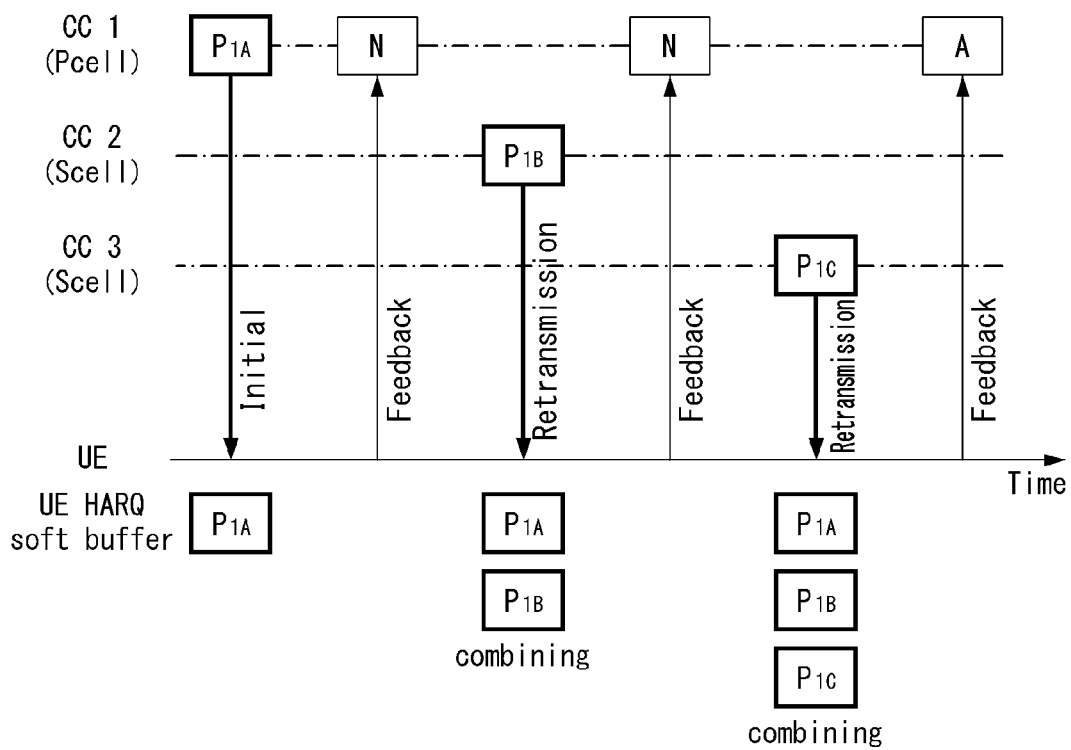

[Figure 30]
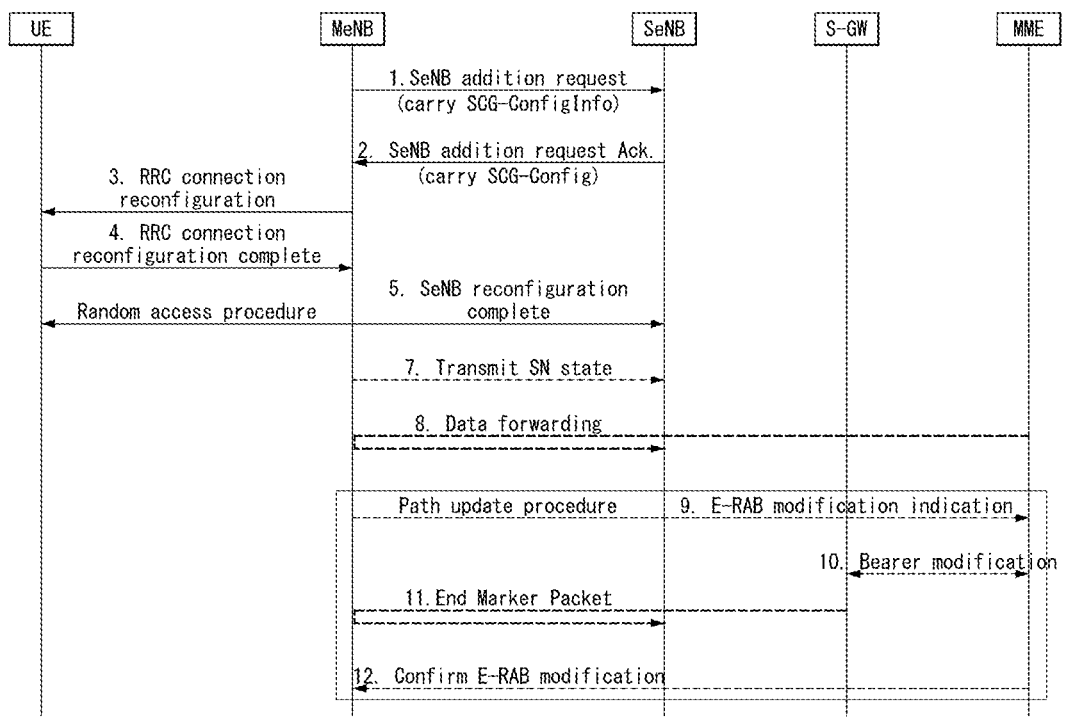

[Figure 31]
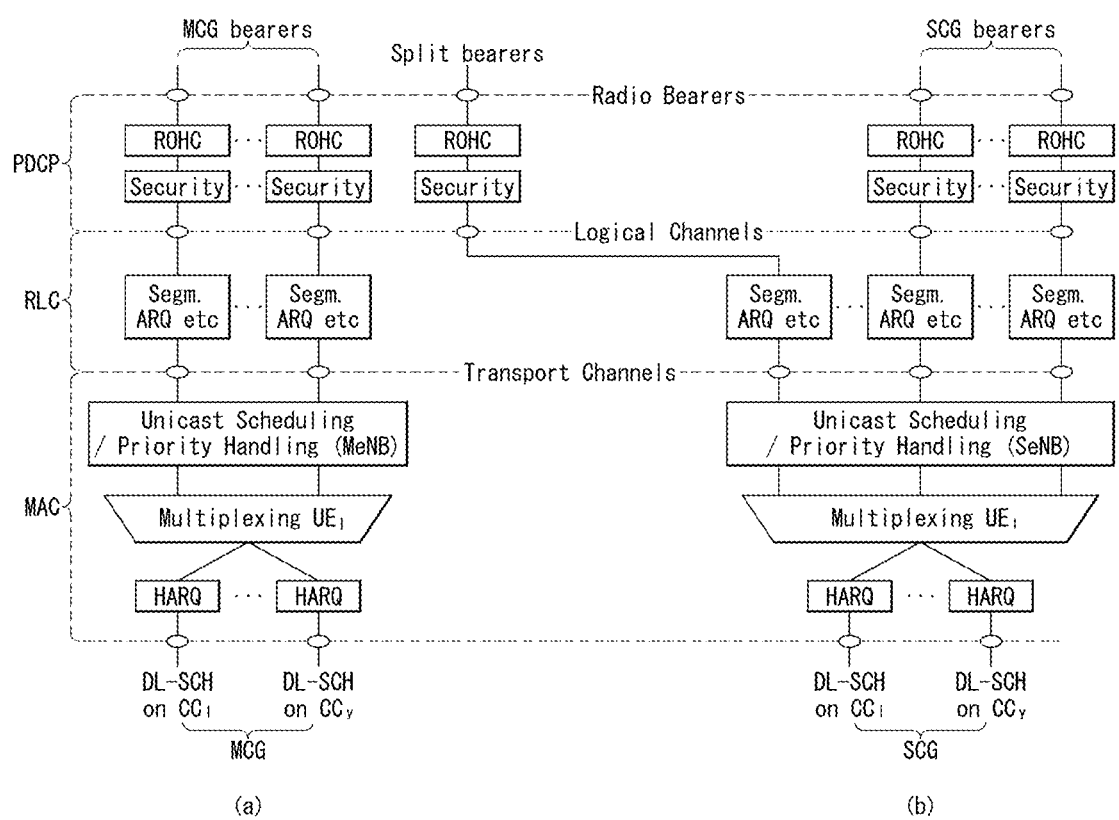

【Figure 32】
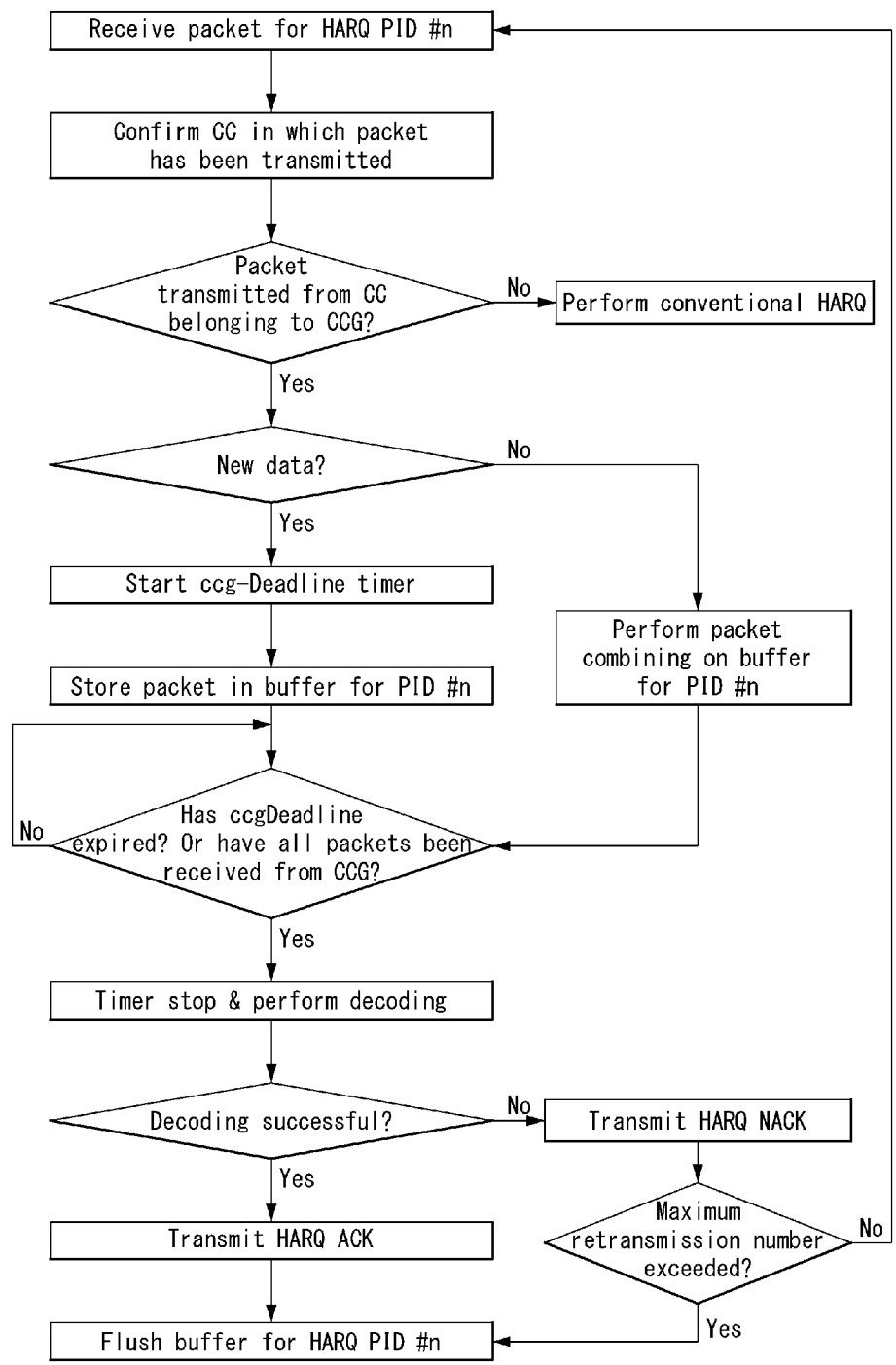

[Figure 33]
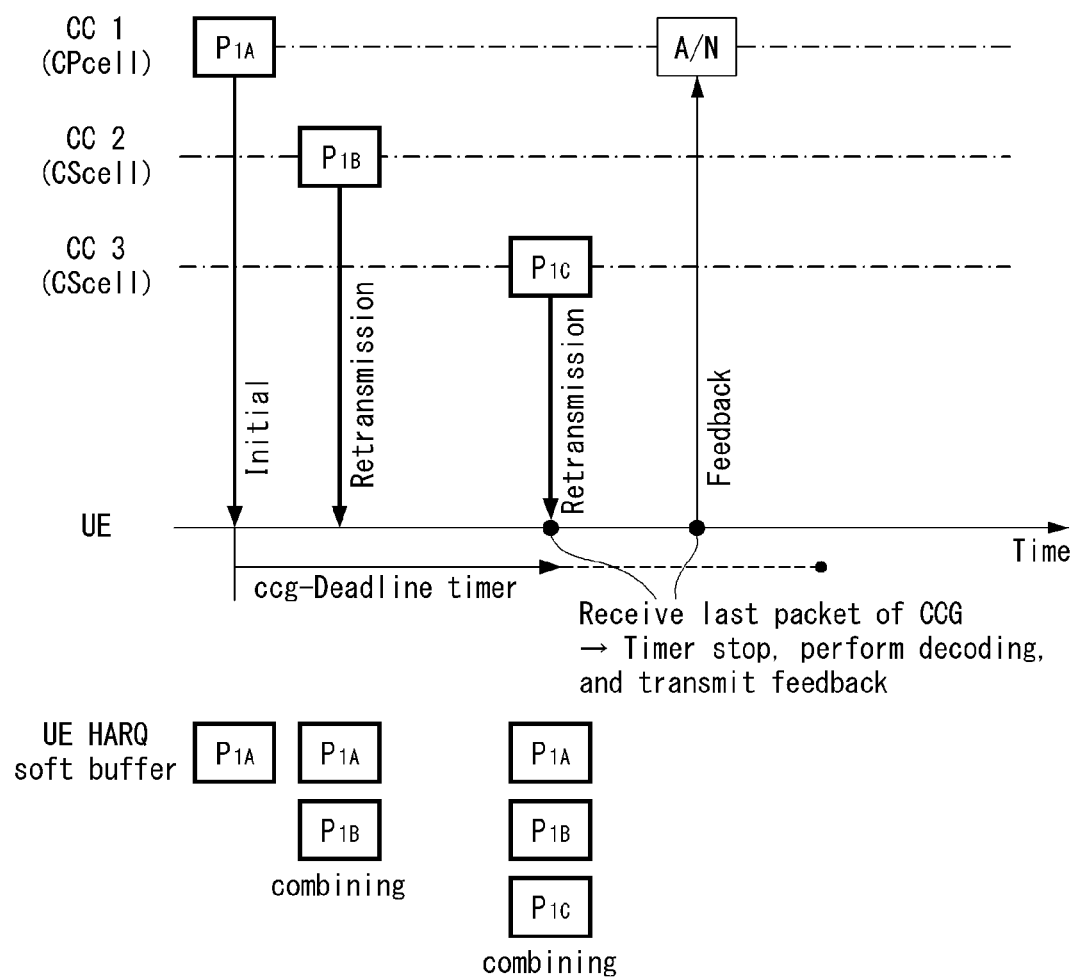

【Figure 34】
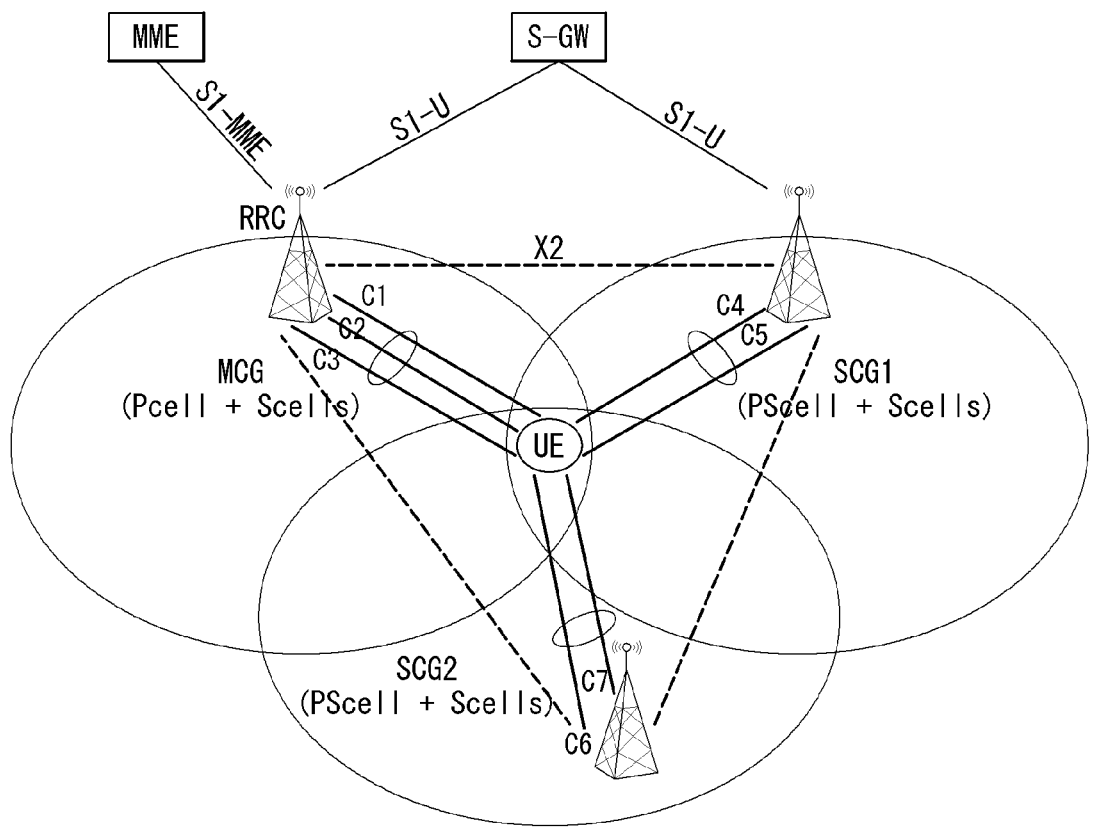
【Figure 35】
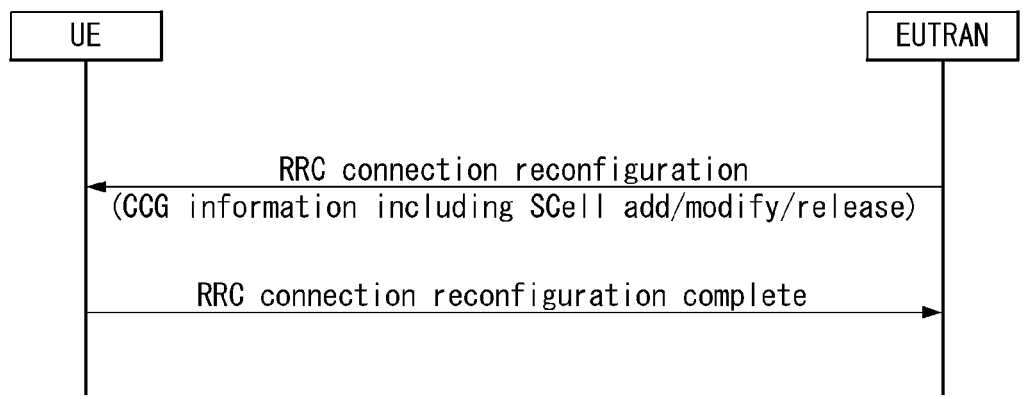

【Figure 36】
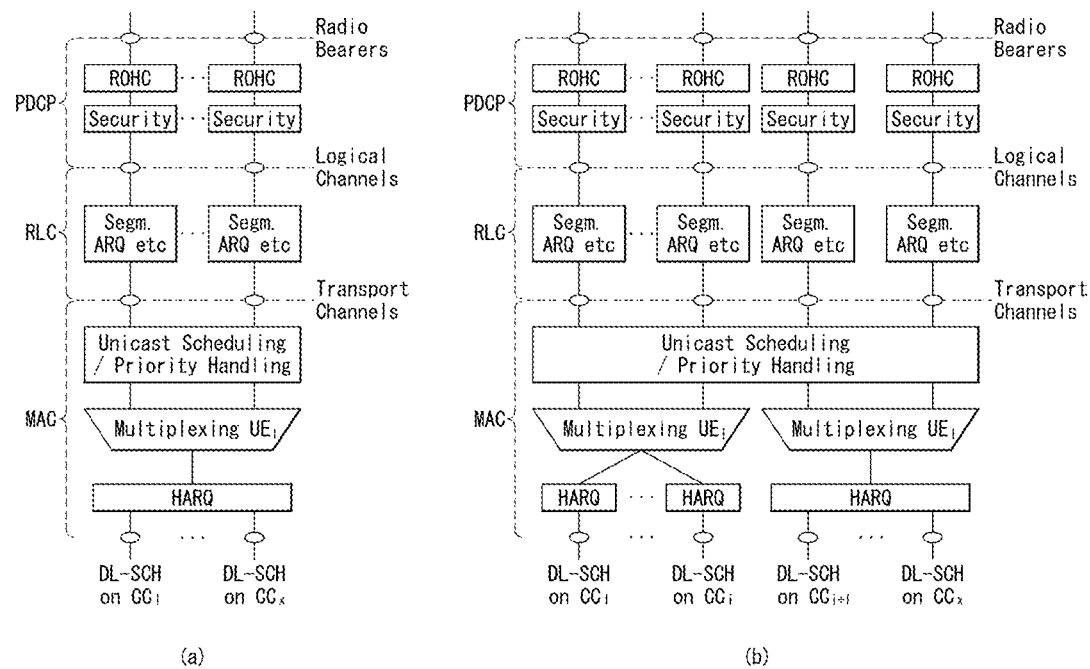

【Figure 37】
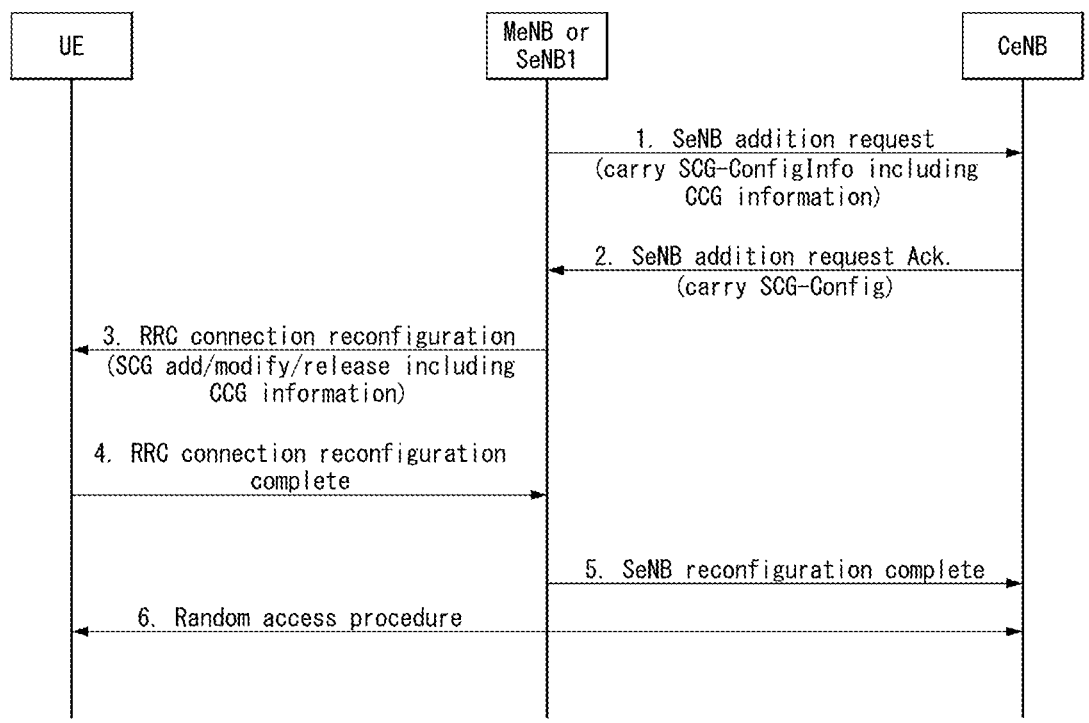

【Figure 38a】
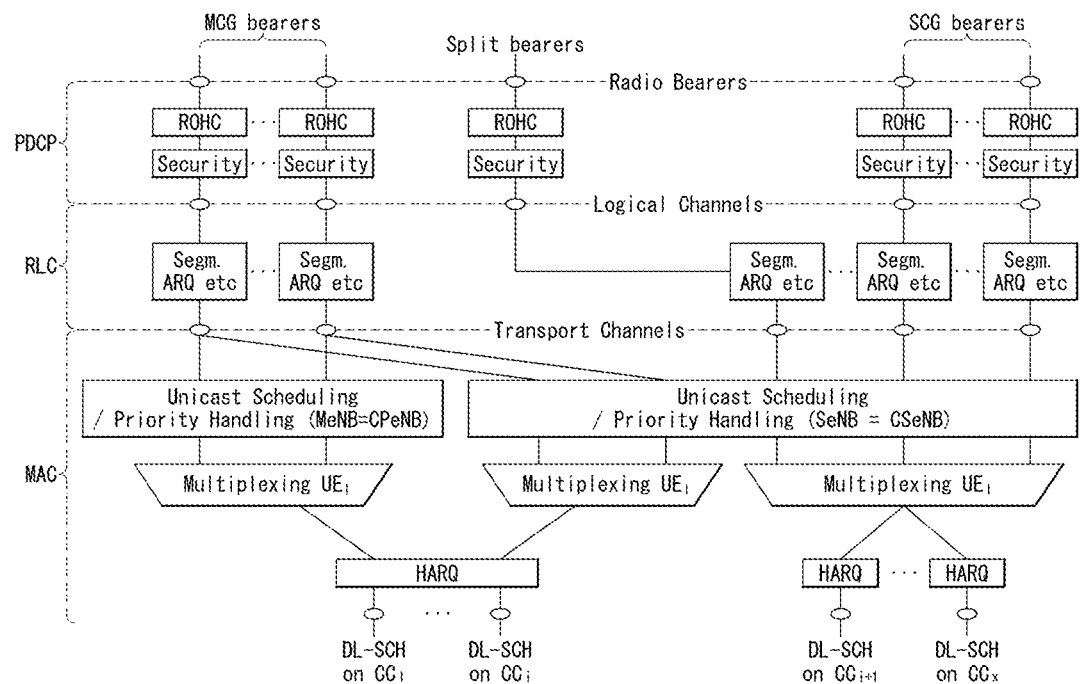

【Figure 38b】
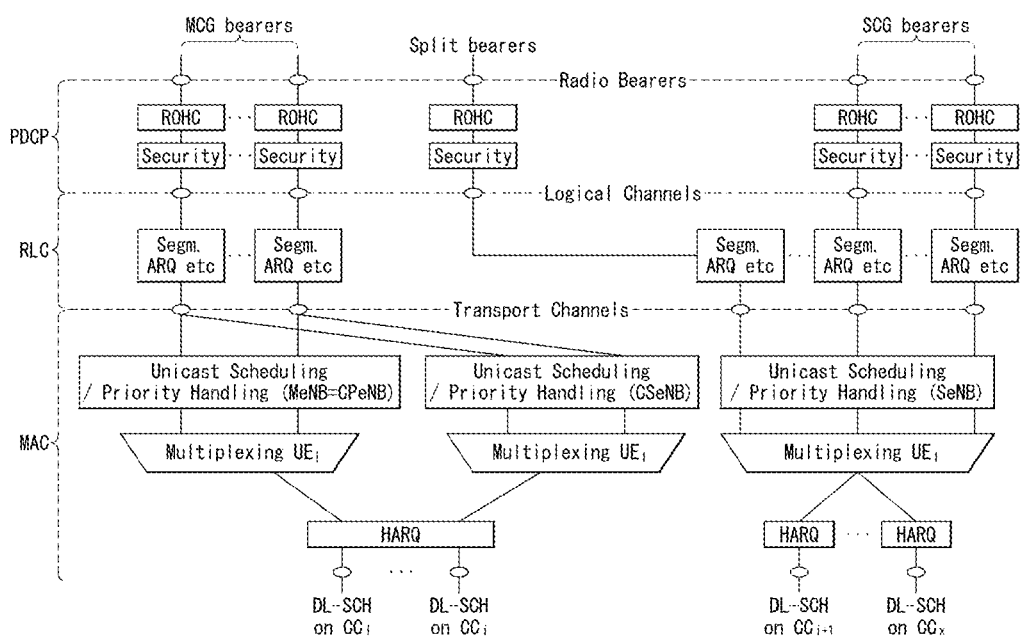

【Figure 38c】
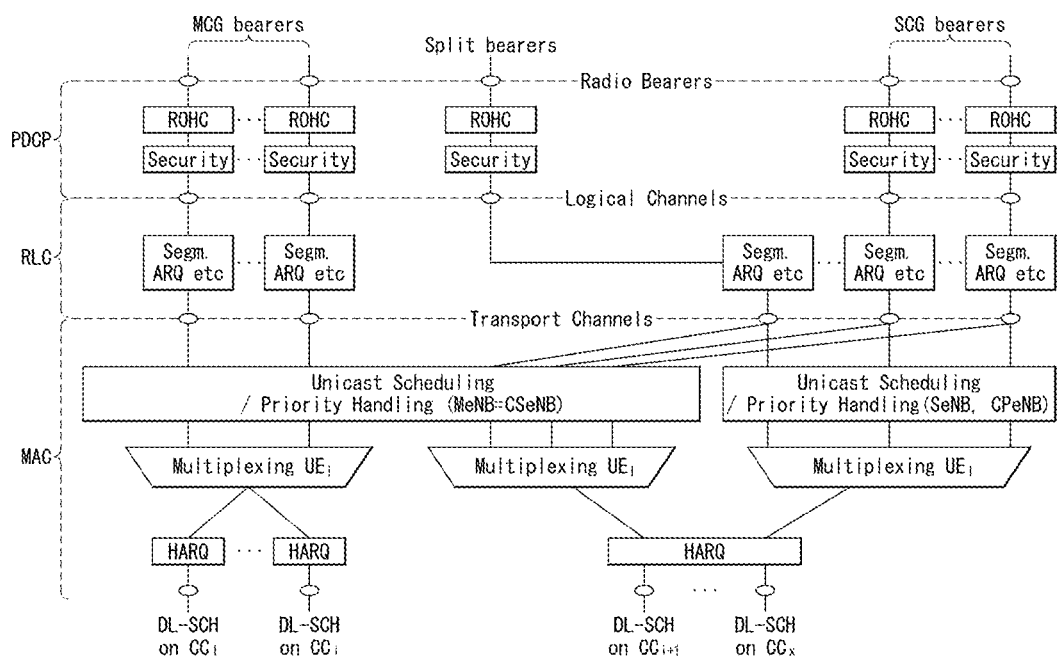

【Figure 38d】
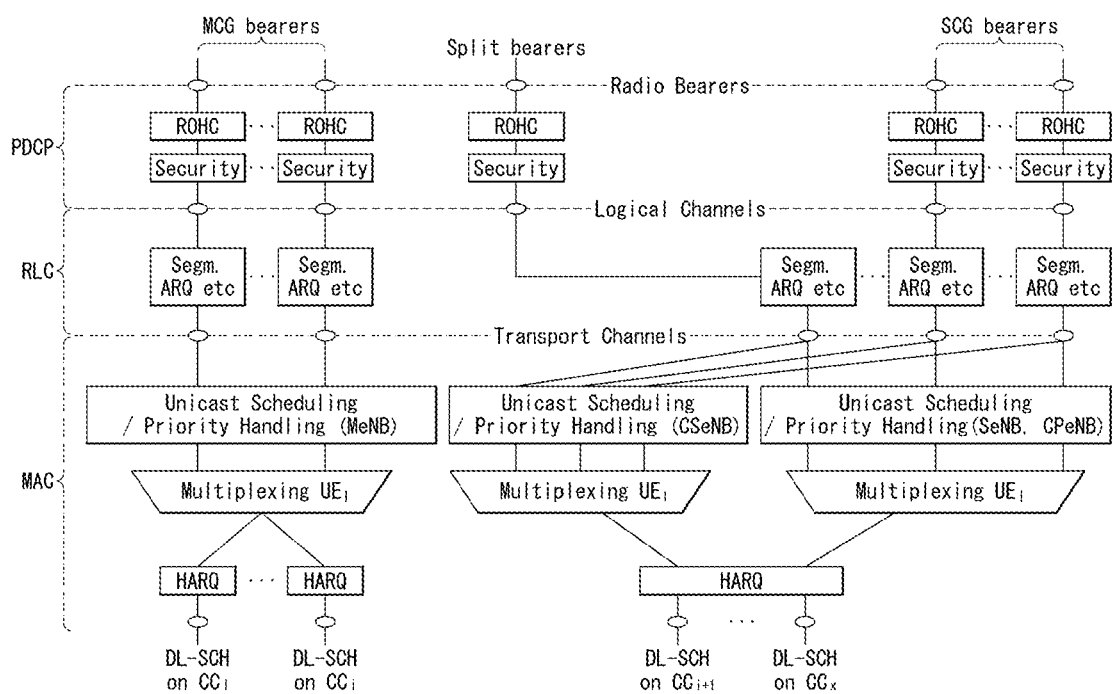

【Figure 39a】
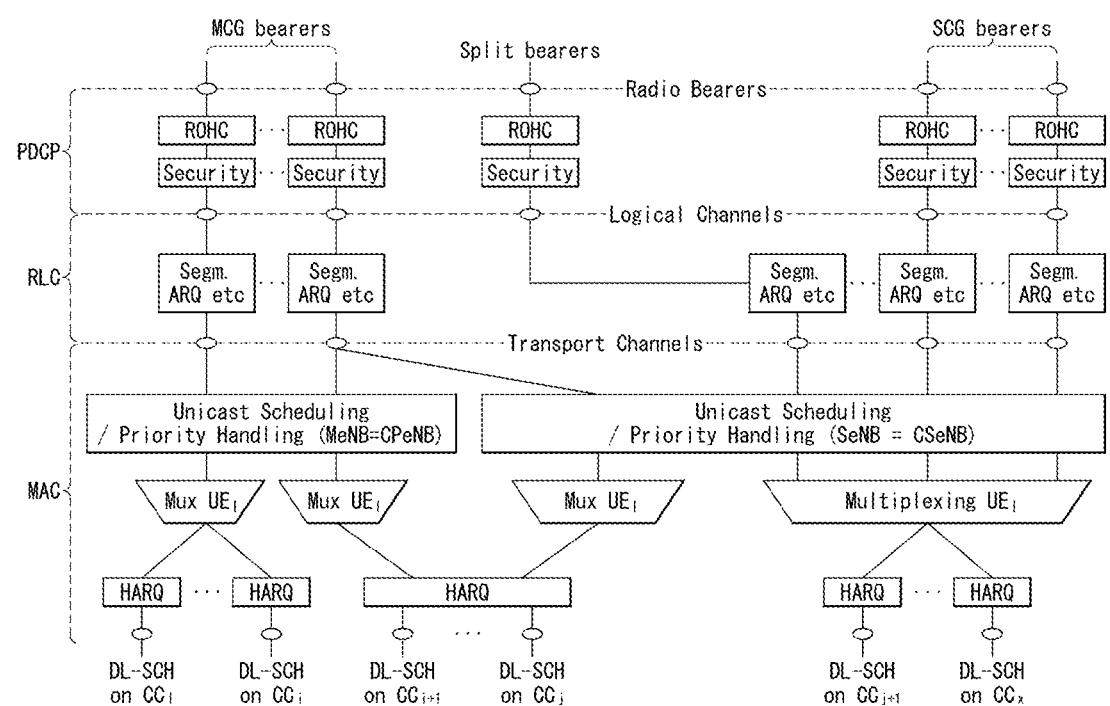

【Figure 39b】
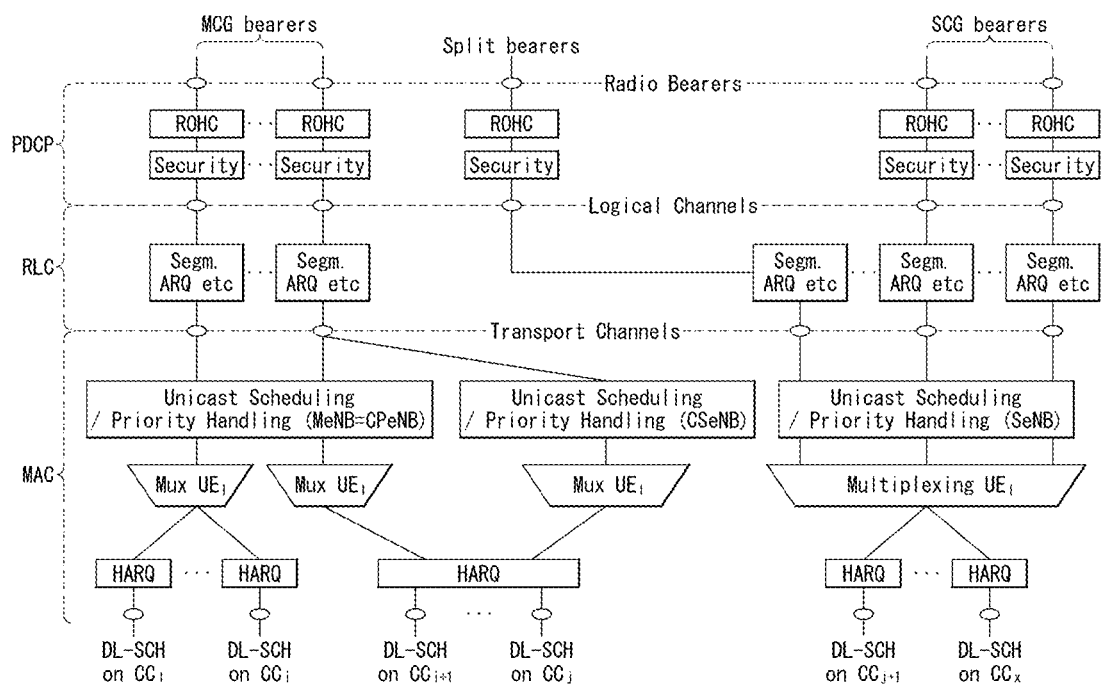

[Figure 39c]
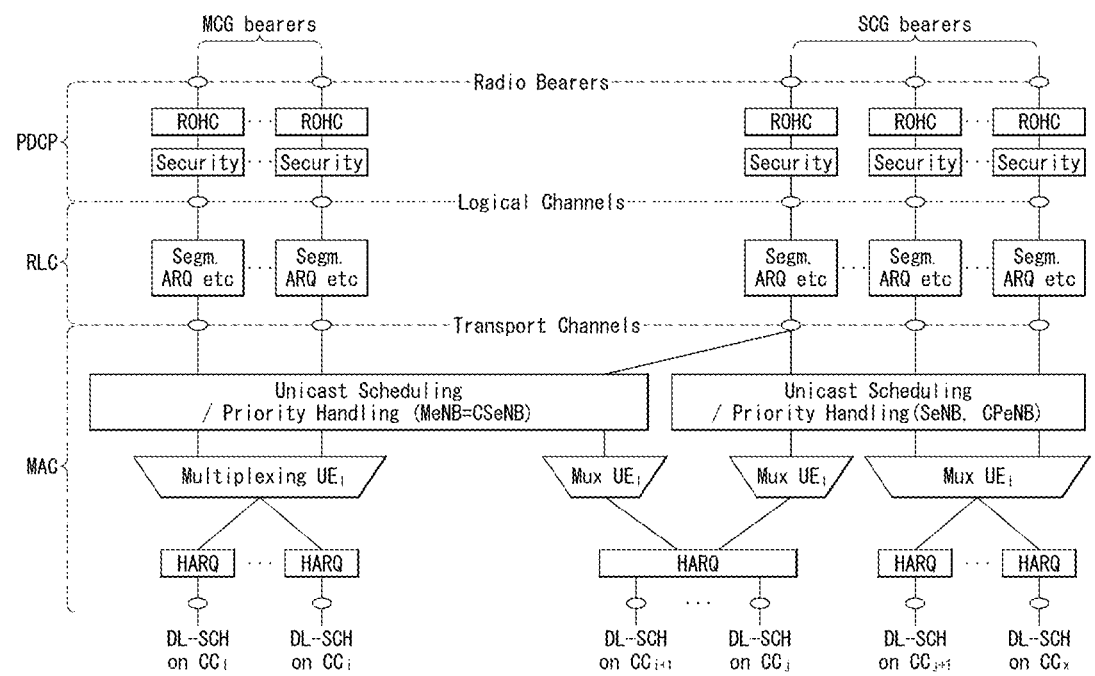

【Figure 39d】
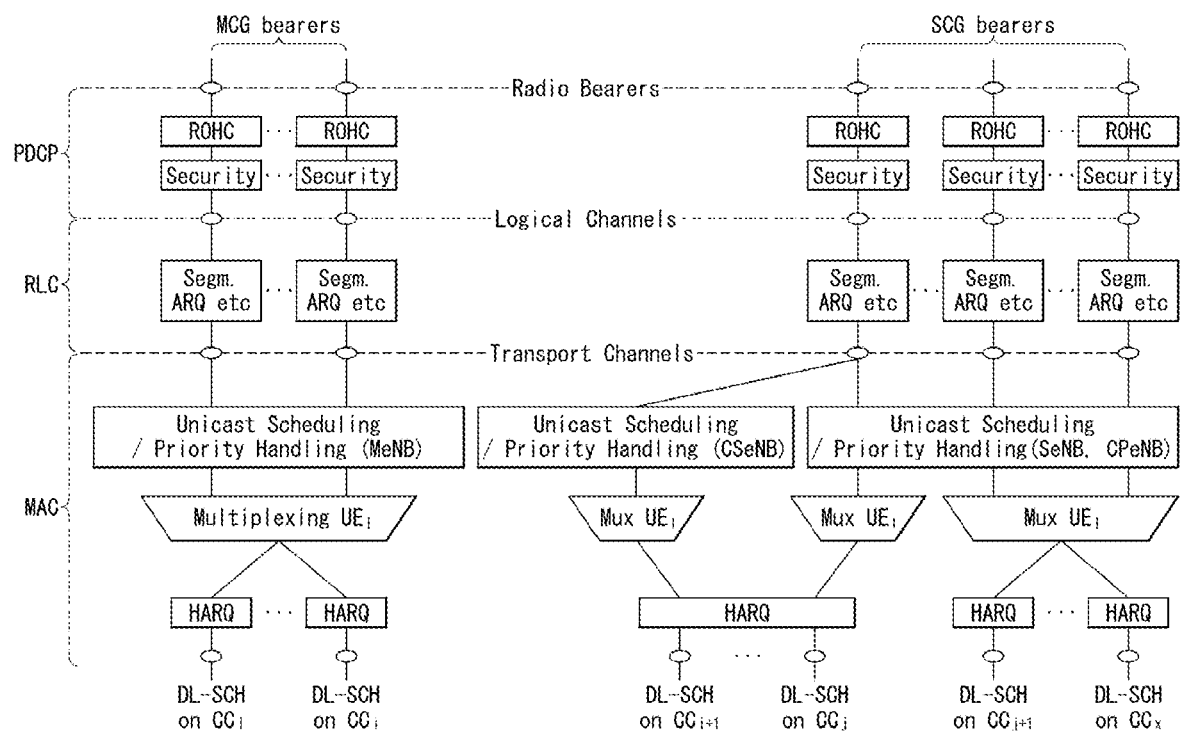

【Figure 40】
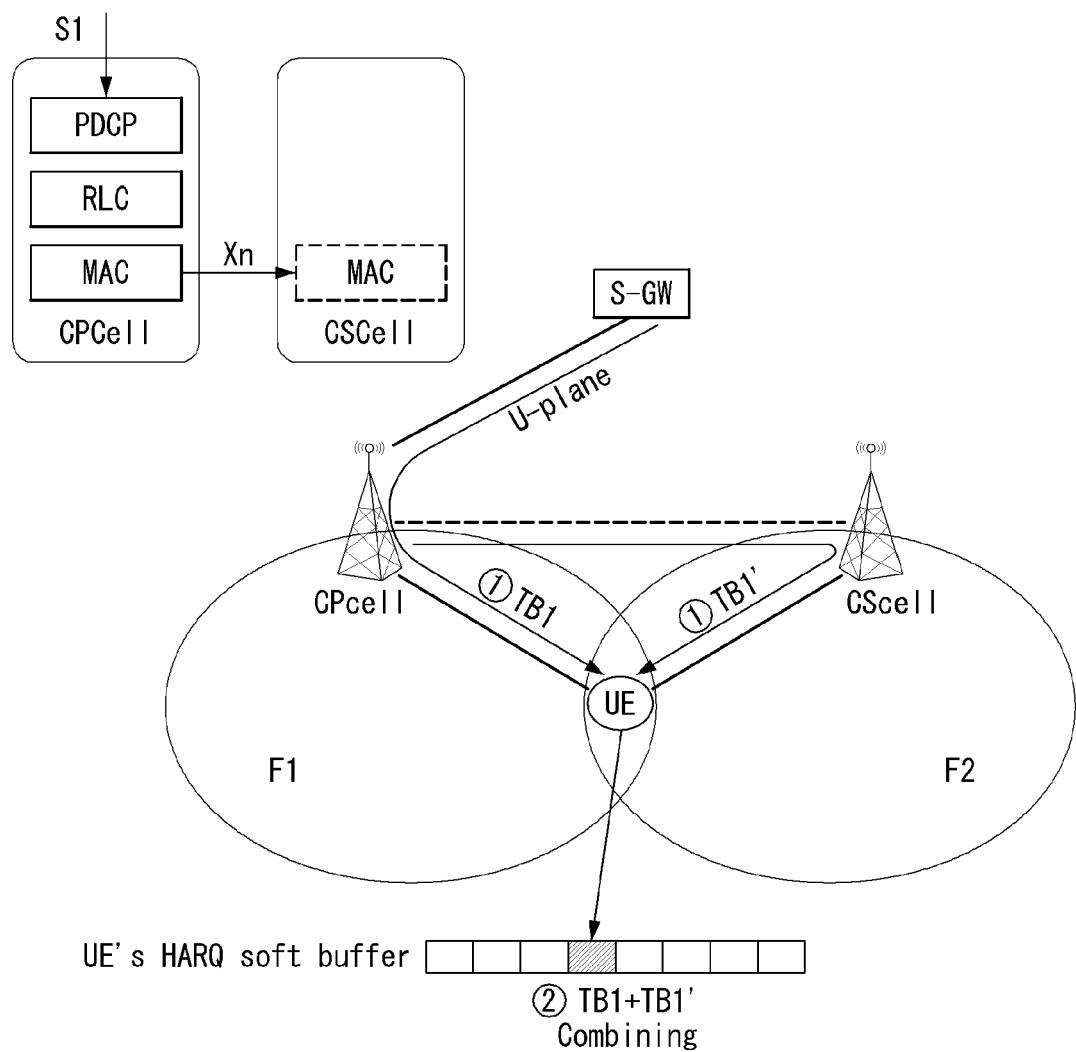

[Figure 41]
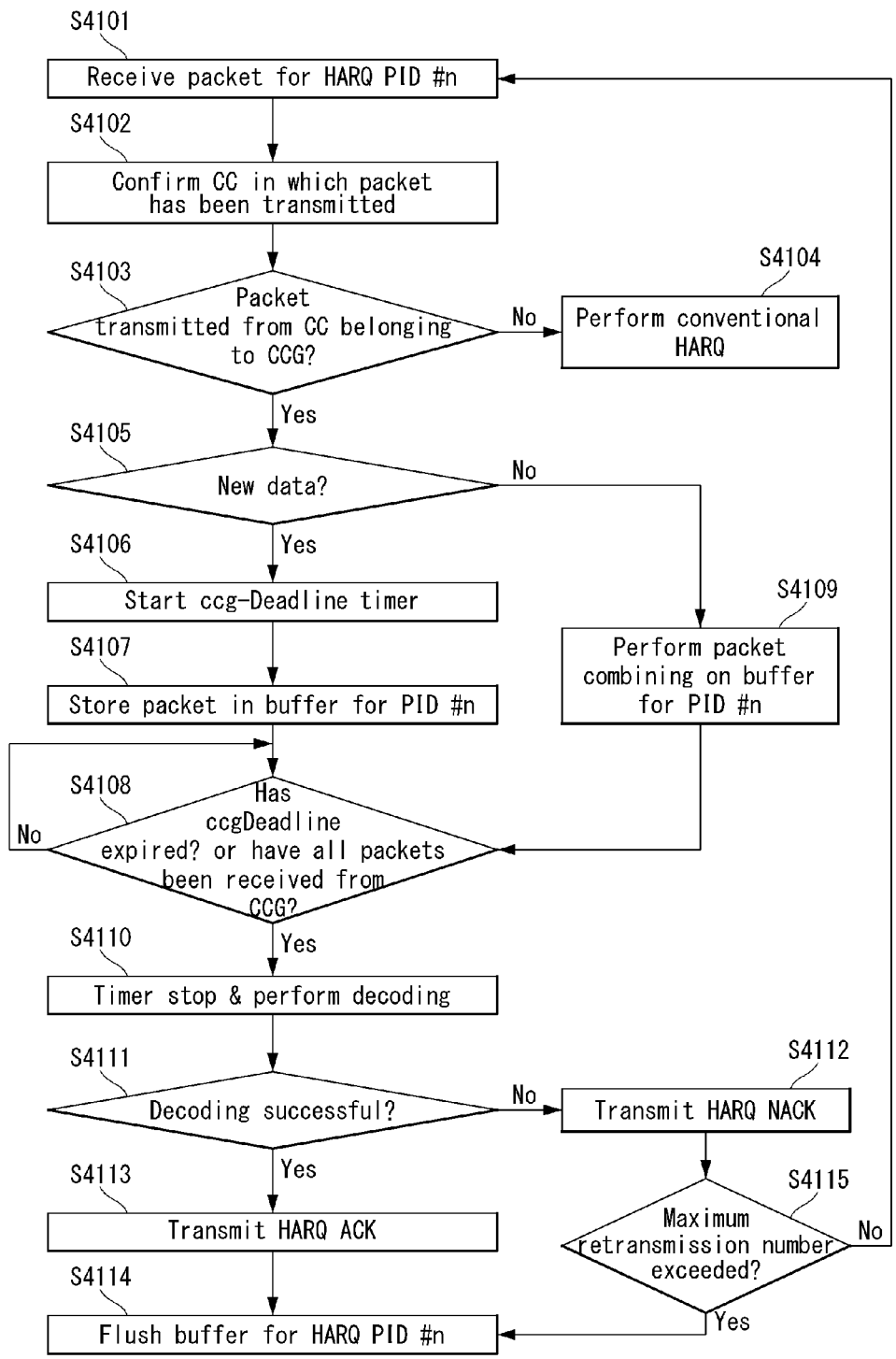

【Figure 42a】
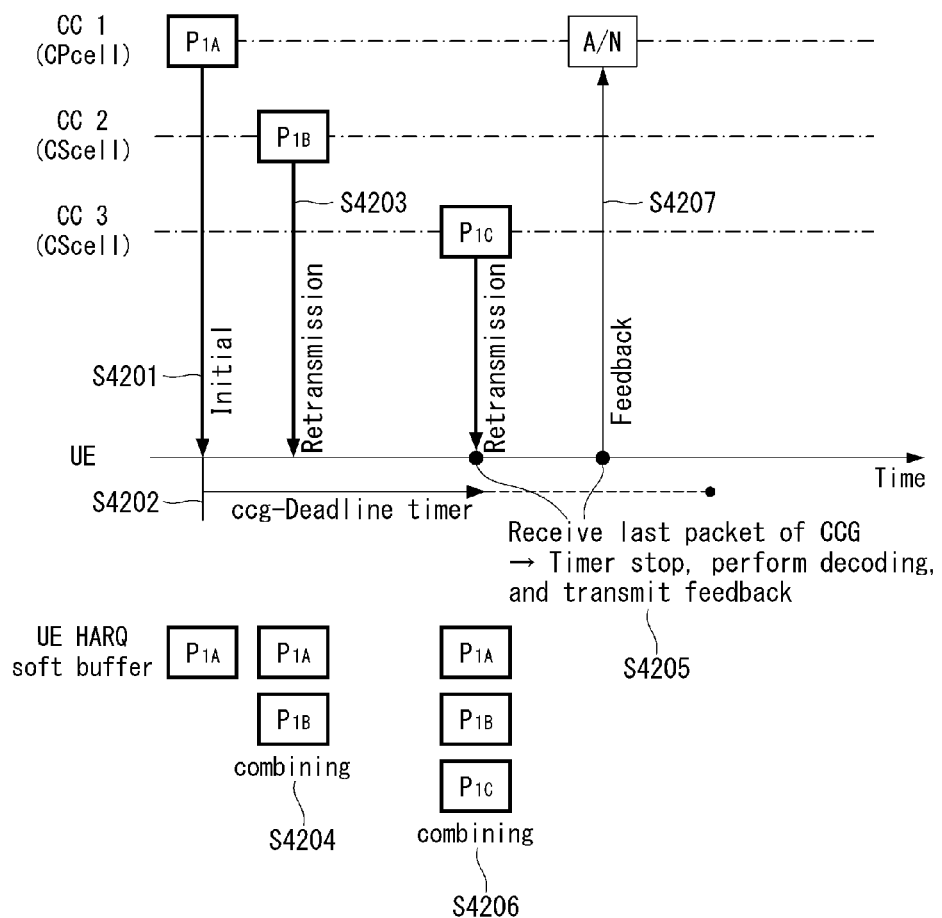

【Figure 42b】
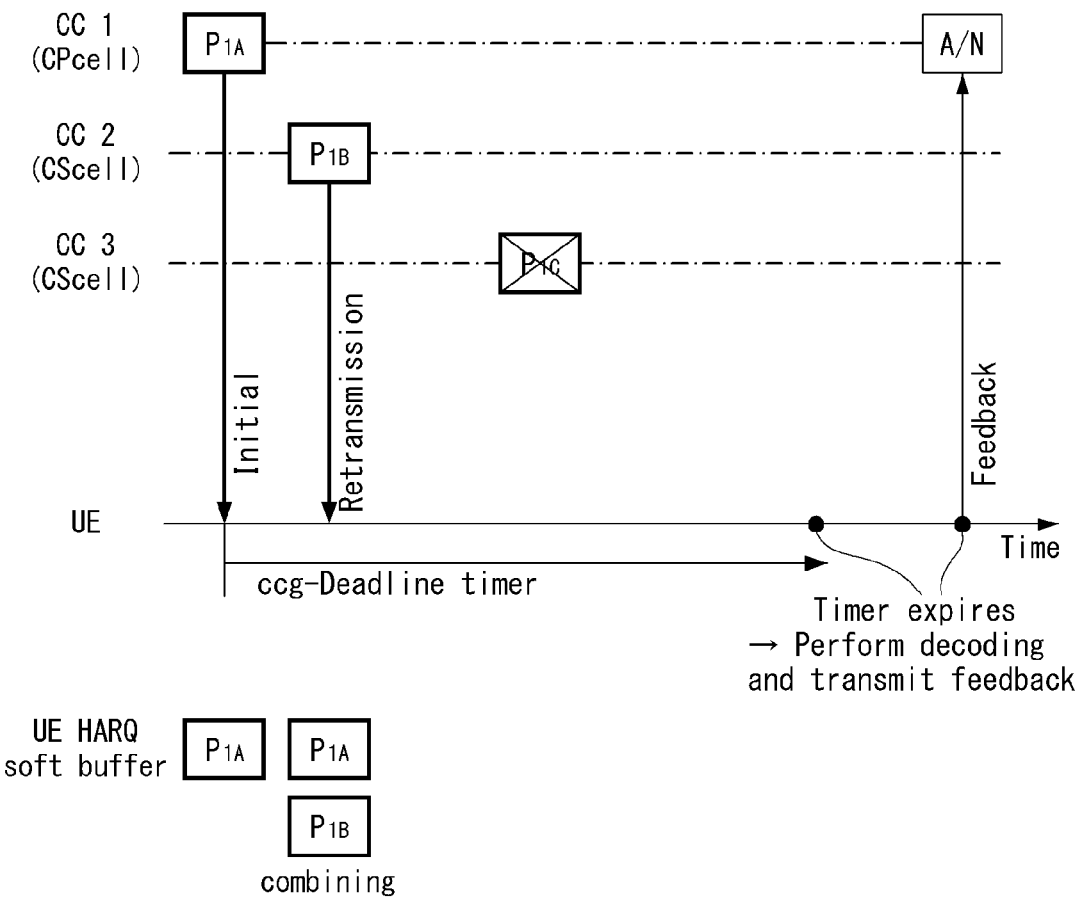
【Figure 43】
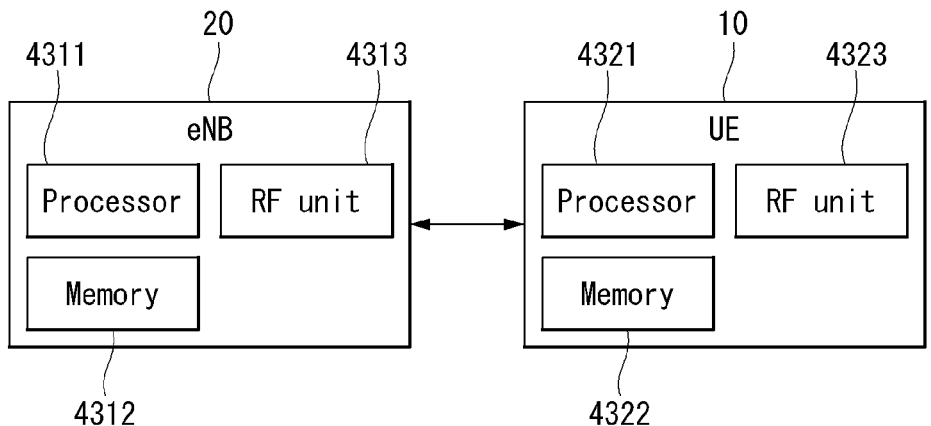

METHOD FOR EXECUTING HARQ IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/001920, filed on Feb. 26, 2016, the contents of which are all hereby incorporated by reference herein in its entirety.

TECHNICAL FIELD

This specification relates to a wireless communication system and, more particularly, to a method of performing an HARQ in a wireless communication system supporting high reliability and low latency communication and an apparatus supporting the same.

BACKGROUND ART

A mobile communication system has been developed to provide voice services while ensuring the activity of a user. However, the mobile communication system has been expanded to its region up to data services in addition to the voice. Today, the shortage of resources is caused due to an explosive increase of traffic, and thus there is a need for a more advanced mobile communication system because users require higher speed services.

Requirements for a next-generation mobile communication system basically include the accommodation of explosive data traffic, a significant increase of a transfer rate per user, the accommodation of the significantly increased number of connection devices, very low end-to-end latency, and high energy efficiency. To this end, research is carried out on various technologies, such as dual connectivity, massive multiple input multiple output (MIMO), in-band full duplex, non-orthogonal multiple access (NOMA), super wideband support, and device networking.

In particular, in the case of 5G mobile communication, an actually felt transfer rate, a maximum transfer rate, a maximum moving speed, transmission latency, the density of UEs, energy efficiency, frequency efficiency, and a system capacity per area are considered as its core performance indices.

DISCLOSURE

Technical Problem

An object of this specification is to provide a method of transmitting and receiving HARQ data (transport blocks) for a UE that requires low-latency and high-reliability data communication using a multi-path in a future wideband wireless communication system.

In particular, an object of this specification is to provide a method for transmitting and receiving the same HARQ data through one or more wireless paths with respect to data that requires high reliability and a method for combining HARQ data transmitted and received through different paths at the same time using a multi-path HARQ indicator.

Technical objects to be achieved by the present invention are not limited to the aforementioned technical objects, and other technical objects not described above may be evidently understood by a person having ordinary skill in the art to which the present invention pertains from the following description.

Technical Solution

In this specification, a method of performing a hybrid automatic request (HARQ) in a wireless communication system is performed by a user equipment (UE), and includes receiving first data from a first eNB through a first radio link; receiving second data from at least one second eNB through a second radio link; combining the first data and the second data; decoding the combined data; and feeding the results of the decoding back through at least one of the first radio link and the second radio link. The first radio link and the second radio link indicate a cell or cell group (CG) of a combining cell group (CCG), and the combining cell group (CCG) indicates a set of at least one cell or cell group capable of transmitting and receiving different HARQ data generated from an identical HARQ transport block (TB).

Furthermore, in this specification, the first data is initial data, and the second data is retransmission data of the initial data.

Furthermore, the method of performing an HARQ of this specification further includes running an HARQ-related timer, wherein the HARQ-related timer runs when the initial data is received, and confirming whether the retransmission data has been fully received until the HARQ-related timer expires.

Furthermore, in this specification, if, as a result of the confirmation, the retransmission data has not been fully received until the HARQ-related timer expires, the feedback is performed on HARQ data received until the HARQ-related timer expires.

Furthermore, in this specification, the first eNB is a combining primary eNB (CPeNB), the second eNB is a combining secondary eNB (CSeNB), and the combining primary eNB is connected to a serving gateway (S-GW) through an S1-U interface.

Furthermore, the combining cell group (CCG) includes at least two of a primary cell (Pcell), a primary secondary cell (PScell) and a secondary cell (Scell), or the combining cell group (CCG) includes a set of master cell groups (MCGs) or secondary cell groups (SCGs).

Furthermore, the method of performing an HARQ of this specification includes configuring the combining cell group, wherein configuring the combining cell group includes receiving a first message including a combining cell group (CCG) information element (IE).

Furthermore, in this specification, the first message is an RRC connection reconfiguration message.

Furthermore, in this specification, the combining cell group information element (CCG IE) includes at least one of a CCG index field to index a specific CCG, a physical cell identifier (PhysCellid) field indicative of a primary cell or primary cell group of a cell or cell group belonging to the CCG and a ccg-deadline field indicative of an HARQ-related timer.

Furthermore, in this specification, the combining cell group information element (CCG IE) is exchanged between the first eNB and the second eNB through an X2 interface before the CCG is configured.

Furthermore, the method of performing an HARQ of this specification further includes receiving a second message indicative of the activation or deactivation of the configured combining cell group.

Furthermore, in this specification, the combining includes confirming whether the second radio link is included in the combining cell group (CCG) and confirming whether the second data received through the second radio link is new data or retransmission data if the second radio link is included in the CCG.

Furthermore, in this specification, a user equipment for performing a hybrid automatic request (HARQ) in a wireless communication system includes a radio frequency (RF) unit for transmitting and receiving radio signals and a processor functionally connected to the RF unit. The processor controls to receive first data from a first eNB through a first radio link, receive second data from at least one second eNB through a second radio link, combine the first data and the second data, decode the combined data, and feeds results of the decoding back through at least one of the first radio link and the second radio link. The first radio link and the second radio link indicate a cell or cell group (CG) of a combining cell group (CCG). The combining cell group (CCG) indicates a set of at least one cell or cell group capable of transmitting and receiving different HARQ data generated from an identical HARQ transport block (TB).

Advantageous Effects

This specification has an effect in that it can rapidly perform error recovery when an error occurs because it can transmit and receive the same HARQ data using a multi-path.

Furthermore, this specification has effects in that it can reduce an average transmission time of data by transmitting and receiving HARQ data using a multi-path and can enhance performance improvement for data reception reliability by successfully receiving data with high reliability within a short time.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings included as part of the detailed description in order to help understanding of the present invention provide embodiments of the present invention, and describe the technical characteristics of the present invention along with the detailed description.

FIG. 1 is a diagram showing an example of an evolved packet system (EPS) related to an LTE system to which the present invention may be applied.

FIG. 2 shows a wireless communication system to which the present invention is applied.

FIG. 3 is a block diagram showing an example of functional split between an E-UTRAN and EPC to which the present invention may be applied.

FIG. 4a is a block diagram showing an example of radio protocol architecture for a user plane to which the technical characteristics of this specification may be applied.

FIG. 4b is a block diagram showing an example of radio protocol architecture for a control plane to which the technical characteristics of this specification may be applied.

FIG. 5 is a diagram for illustrating physical channels used in the 3GPP LTE/LTE-A system to which the present invention may be applied and a common signal transmission method using the physical channels.

FIG. 6 shows the structure of a radio frame in 3GPP LTE/LTE-A to which the present invention may be applied.

FIG. 7 is a diagram illustrating a resource grid for one downlink slot in a wireless communication system to which the present invention may be applied.

FIG. 8 shows the structure of a downlink subframe in a wireless communication system to which the present invention may be applied.

FIG. 9 shows the structure of an uplink subframe in a wireless communication system to which the present invention may be applied.

FIG. 10 shows an example of a form in which PUCCH formats are mapped to the PUCCH regions of uplink physical resource blocks in a wireless communication system to which the present invention may be applied.

FIG. 11 shows the structure of am ACK/NACK channel in the case of a normal CP in a wireless communication system to which the present invention may be applied.

FIG. 12 shows an example in which five SC-FDMA symbols are generated for one slot and transmitted in a wireless communication system to which the present invention may be applied.

FIG. 13 is a diagram for illustrating an operation process of a UE and an eNB in a contention-based random access procedure.

FIG. 14 is a flowchart showing a UE operation of an RRC idle state to which the present invention may be applied.

FIG. 15 is a flowchart showing a process of establishing an RRC connection to which the present invention may be applied.

FIG. 16 is a flowchart showing an RRC connection reconfiguration process to which the present invention may be applied.

FIG. 17 is a diagram showing an example of an RRC connection reestablishment procedure to which the present invention may be applied.

FIG. 18 shows examples of component carriers and carrier aggregations in a wireless communication system to which the present invention may be applied.

FIG. 19 illustrates a control plane for dual connectivity in the E-UTRAN.

FIG. 20 illustrates a user plane structure for dual connectivity in the E-UTRAN.

FIG. 21 illustrates radio interface protocol architecture for dual connectivity between the E-UTRAN and a UE.

FIG. 22 illustrates a control plane structure for dual connectivity in the E-UTRAN.

FIG. 23 is a diagram showing an example of an asynchronous HARQ operation in the downlink.

FIG. 24 is a diagram showing an example of a synchronous HARQ operation in the uplink.

FIG. 25 is a diagram showing an example of information block processing for performing an HARQ.

FIG. 26 is a diagram showing an example of a redundancy version (RV) for an encoded packet.

FIG. 27 is a flowchart showing an example of a method for a receiving stage to process an HARQ packet.

FIG. 28 is a diagram showing an example of the existing HARQ operation principle.

FIG. 29 shows another example of the HARQ operation principle.

FIG. 30 is a diagram showing an example of a SeNB addition procedure to which a method proposed in this specification may be applied.

FIG. 31 shows an example of Layer 2 structure in dual connectivity.

FIG. 32 is a flowchart showing an example of a method of processing an HARQ packet, which is proposed in this specification.

FIG. 33 shows an example of an HARQ process operation principle proposed in this specification.

FIG. 34 shows an example of future 5G network architecture to which a method proposed in this specification may be applied.

FIG. 35 shows an example of a method of configuring a CCG within the same scheduler (eNB), which is proposed in this specification.

FIG. 36 is a diagram showing an example of Layer 2 structure for a CCG configuration, which is proposed in this specification.

FIG. 37 shows an example of a procedure of configuring a CCG of a CG unit within different schedulers (eNB), which is proposed in this specification.

FIG. 38 is a diagram showing another example of Layer 2 structure in the method of configuring a CCG, which is proposed in this specification.

FIG. 39 is a diagram showing yet another example of Layer 2 structure in the method of configuring a CCG, which is proposed in this specification.

FIG. 40 is a diagram showing an example of a redundant transmission method of an HARQ packet through a CCG, which is proposed in this specification.

FIG. 41 is a flowchart showing an example of a method of processing HARQ packets received through a multi-path, which is proposed in this specification.

FIG. 42 is a diagram showing an example of a multi-path HARQ combining execution method through a CCG, which is proposed in this specification.

FIG. 43 illustrates a block diagram of a wireless communication device to which the methods proposed in this specification may be applied.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNodeB or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with the term "fixed station", "base station (BS)", "Node B", "base transceiver system (BTS),", "access point (AP)", "macro eNB or master eNB (MeNB)", "secondary eNB (SeNB)", etc. The term "user equipment (UE)" may be replaced with the term "terminal", "mobile station (MS)", "user terminal (UT)", "mobile subscriber station (MSS)", "subscriber station (SS)", "Advanced Mobile Station (AMS)", "Wireless terminal (WT)", "Machine-Type Communication (MTC) device", "Machine-to-Machine (M2M) device", "Device-to-Device (D2D) device", wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention can be applied. The LTE system aims to provide seamless Internet Protocol (IP) connectivity between a user equipment (UE) 10 and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station (20), it is accompanied by an evolution of the non-radio aspects under the term "System Architecture Evolution" (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS)

between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 40, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update". The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure". UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention can be applied.

Referring to the FIG. 3, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4a is a diagram illustrating radio protocol architecture for a user plane. FIG. 4b is a diagram illustrating radio protocol architecture for a control plane. The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Data is transferred between different PHY layers, that is, the PHY layer of a transmitter and the PHY layer of a receiver, through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

The function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

The functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

FIG. 5 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S501 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S502 step to obtain more specific system information.

Next, the UE may carry out a random access procedure such as the steps of S503 to S506 to complete a connection process to the eNB. To this purpose, the UE transmits a preamble S503 through a physical random access channel (PRACH) and receives a response message in response to the preamble through a PDSCH corresponding to the PRACH S504. In the case of contention-based random access, the UE may carry out a contention resolution procedure including transmission of an additional PRACH signal S505 and reception of a PDCCH signal and the PDSCH signal corresponding to the PDCCH signal S506.

Afterwards, the UE which has carried out the procedure above may carry out reception S507 of the PDCCH signal and/or PDSCH signal and transmission S508 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 6 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 6(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 6(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 7 shows an example of a resource grid for one downlink slot in the wireless communication system to which the present invention can be applied.

Referring to the FIG. 7, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k,l) in the slot. Here, k (k=0, . . . , NRB×12−1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

FIG. 8 shows a structure of a downlink subframe in the wireless communication system to which the present invention can be applied.

Referring to the FIG. 8, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 9 shows a structure of an uplink subframe in the wireless communication system to which the present invention can be applied.

Referring to the FIG. 9, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 2 below depending on each PUCCH format.

TABLE 2

| PUCCH format | Modulation scheme | # of bits per subframe | Usage |
| --- | --- | --- | --- |
| 1(x) | N/A | N/A | Scheduling Request |
| 1a | BPSK | 1 | 1-bit A/N + SR |
| 1b | QPSK | 2 | 2-bits A/N + SR |
| 2x | QPSK | 20 | CQI or CQI + A/N |
| 2a | QPSK + BPSK | 20 + 1 | CQI + 1-bit A/N |
| 2b | QPSK + BPSK | 20 + 2 | CQI + 2-bits A/N |
| 3 | QPSK | 48 | A/N + SR |

PUCCH format 1(x) is used for SR-only transmission. In the case of SR-only transmission, a waveform which is not modulated is applied.

The PUCCH format 1a or 1b is used to transmit HARQ ACK/NACK. In the case that HARQ ACK/NACK is solely transmitted in a specific subframe, PUCCH format 1a or 1b may be used. Alternatively, HARQ ACK/NACK and an SR may be transmitted in the same subframe using PUCCH format 1a or 1b.

As described above, PUCCH format 1a or 1b may be used for the case that an SR is transmitted together with HARQ ACK/NACK. A PUCCH index for HARQ ACK/NACK is implicitly determined from a lower CCE index which is mapped for the related PDCCH.

PUCCH format 2 is used for the transmission of a CQI, and PUCCH format 2a or 2b is used for the transmission of a CQI and HARQ ACK/NACK.

In the case of the extended CP, PUCCH format 2 may also be used for the transmission of a CQI and HARQ ACK/NACK.

FIG. 10 illustrates an example of a type in which PUCCH formats are mapped to a PUCCH region of an uplink physical resource block in the wireless communication system to which the present invention may be applied.

In FIG. 10, NRBUL represents the number of resource blocks in the uplink, and 0, 1, . . . , NRBUL-1 mean the numbers of physical resource blocks. Basically, the PUCCH is mapped to both edges of an uplink frequency block. As illustrated in FIG. 10, PUCCH format 2/2a/2b is mapped to a PUCCH region expressed as m=0, 1 and this may be expressed in such a manner that PUCCH format 2/2a/2b is mapped to resource blocks positioned at a band edge. Furthermore, both PUCCH format 2/2a/2b and PUCCH format 1/1a/1b may be mixedly mapped to a PUCCH region expressed as m=2.

Next, PUCCH format 1/1a/1b may be mapped to a PUCCH region expressed as m=3, 4, and 5. The number (NRB(2)) of PUCCH RBs which are usable by PUCCH format 2/2a/2b may be indicated to UEs in a cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency unit (or a frequency resolution) to be measured may be controlled by an eNB. In the time domain, periodic and aperiodic CQI reporting may be supported. PUCCH format 2 may be used for only the periodic reporting and the PUSCH may be used for aperiodic reporting. In the case of the aperiodic reporting, an eNB may instruct a UE to transmit a scheduling resource on which an individual CQI reporting is carried for the uplink data transmission.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), . . . , y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 11 shows the structure of an ACK/NACK channel in the case of a common CP in a wireless communication system to which an embodiment of the present invention may be applied.

FIG. 11 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of $\Delta_{shift}^{PUCCH}$. HARQ ACK/NACK is set by a cell-specific higher layer signaling parameter shift.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CP. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

PHICH (Physical HARQ Indication Channel)

Hereinafter, PHICH will be described.

Since an LTE system does not support SU-MIMO in uplink, only 1-bit ACK/NACK for PUSCH, that is, a single data stream, of one UE is transmitted through a PHICH.

The 1-bit ACK/NACK is encoded into 3 bits using repetition coding with a code rate of ⅓. The coded ACK/NACK is modulated by Binary Phase Shift Keying (BPSK) to generate three modulation symbols. The modulation symbols are spread using a Spreading Factor (SF) of 4 in the case of normal CP and are spread using an SF of 2 in the case of extended CP.

Orthogonal sequences are used for spreading the modulation symbols, and the number of orthogonal sequences used for spreading becomes SF*2 in terms of I/Q multiplexing concept.

Accordingly, PHICHs spread using SF*2 orthogonal sequences are defined as one PHICH group. Layer mapping is performed on the spread symbols. The layer-mapped symbols are mapped to resources and transmitted.

PHICH carries HARQ ACK/NACK for PUSCH transmission. Multiple PHICHs mapped to the same set of resource elements constitute a PHICH group, and PHICHs within the same PHICH group are separated through different orthogonal sequences. In the FDD system, $n_{PHICH}^{group}$, i.e., the number of PHICH groups, is constant in all subframes.

A resource used in the PHICH can be determined based on a lowest physical resource block (PRB) index of resource allocation in the PUSCH and a cyclic shift value of a demodulation reference signal (DMRS) transmitted using a UL grant.

A resource to which the PHICH is mapped (hereinafter, a PHICH resource) can be expressed by an index pair ($n_{PHICH}^{group}$, $n_{PHICH}^{seq}$). Herein, $n_{PHICH}^{group}$ denotes a PHICH group index, and $n_{PHICH}^{seq}$ denotes an orthogonal sequence index in the PHICH group.

FIG. 13 is a diagram for an operation process between a terminal and a base station in a contention based random access procedure.

(1) First Message Transmission

First of all, a terminal randomly selects one random access preamble from a set of random access preambles indicated by system information or a handover command. The terminal selects a PRACH (physical RACH) resource capable of carrying the random access preamble and is then able to transmit the corresponding random access preamble (S1310).

(2) Second Message Reception

A method of receiving random access response is similar to the aforesaid non-contention based random access procedure. In particular, after the terminal has transmitted the random access preamble, as shown in the step S1310, the terminal attempts a reception of its random access response on PDCCH within a random access response receiving window instructed by the system information or the handover command of a base station. The terminal then receives PDSCH via corresponding RA-RNTI information (S1320). Through the received PDSCH, the terminal is able to receive uplink grant (UL grant), temporary cell identifier (temporary C-RNTI), time synchronization correction value (timing advance command: TAC) and the like.

(3) Third Message Transmission

If the terminal receives a random access response valid to itself, the terminal processes information contained in the random access response. In particular, the terminal applies the TAC and stores the temporary C-RNTI. The terminal also transmits data (i.e., a third message) to the base station using the UL grant (S1330). In this case, it is preferable that the third message contains an identifier of the terminal since a base station is unable to determine which terminal performs the random access procedure in the contention based random access procedure when the third message does not contains the identifier of the terminal. Thus it is preferable to identify a terminal for a future contention resolution.

Two kinds of methods have been discussed as a method of having a terminal identifier included. In a first method, if a terminal has a valid cell identifier assigned in a corresponding cell prior to the random access procedure, the terminal transmits its cell identifier via an uplink transmission signal corresponding to the UL grant. If the valid cell identifier is not assigned prior to the random access procedure, the terminal transmits its unique identifier (e.g., S-TMSI, a random ID, etc.). The unique identifier is generally longer than the cell identifier. If the terminal transmits data corresponding to the UL grant, the terminal initiates a timer for collision solution (contention resolution timer).

(4) Fourth Message Reception

After the terminal has transmitted the data containing its identifier using the UL grant contained in the random access response, the terminal waits for an instruction of the base station for the contention resolution. In particular, the terminal attempts a reception of PDCCH to receive a specific message (S1340). Two kinds of methods have been discussed as a method of receiving the PDCCH. As mentioned in the foregoing description, if the third message transmitted based on the UL grant is transmitted using it the cell identifier, the terminal attempts the reception of the PDCCH using its cell identifier. If the identifier is a unique identifier, the terminal is able to attempt the reception of the PDCCH using the temporary C-RNTI contained in the random access response. Thereafter, in the former case, if the terminal received the PDCCH through its cell identifier before the contention resolution timer expires, the terminal determines that the random access procedure is successfully performed. The terminal then ends the random access procedure. In the latter case, if the terminal received the PDCCH via the temporary C-RNTI before the contention resolution timer expires, the terminal checks the data carried on the PDSCH instructed by the PDCCH. If the unique identifier of the terminal is included in the content of the data, the terminal determines that the random access procedure is successfully performed. The terminal then ends the random access procedure.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state.

When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) 'Radio Resource Control (RRC); Protocol specification (Release 8)', the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

FIG. 14 is a flowchart showing an operation of a UE in RRC_IDLE state to which the present invention can be applied.

It is illustrated in FIG. 14 that a procedure of registering a PLMN through a cell selection and performing a cell reselection if needed after the UE is initially turned on.

Referring the FIG. 14, the UE selects a RAT for communicating with a PLMN from which the UE intends to be served (SS1410). Information about the PLMN and the RAT may be selected by a user of the UE. The user may use the information stored in a Universal Subscriber Identity Module (USIM).

A UE selects a highest cell among a measured BS and cells having higher quality than a predetermined value (SS1420). This procedure is referred as an initial cell reselection, and performed by a UE turned on. The cell selection procedure will be described in the following. After the cell selection, the UE periodically receives system information from the BS. The predetermined value is a value defined in a communication system for ensuring a physical signal quality in data transmission/reception. Therefore, the predetermined value may vary with a RAT to which the each predetermined value is applied.

The UE performs a network registration if needed (SS1430). The UE registers self information (i.e. IMSI) for being served by the network (i.e. paging). The UE does not register whenever the UE selects a cell. When the UE's own information about the network is different from information about the network provided from the system information, the UE performs the network registration procedure.

The UE performs cell reselection based on a service environment or the UE's environment provided from the cell (S1440). The UE, when the strength or quality value of a signal, which has been measured from the base station from which the UE is serviced, is lower that a value measured from the base station of a neighbor cell, selects one of other cells providing a better signal characteristic than the base station to which the UE is linked. This process is referred to as cell reselection as distinguished from the initial cell selection of the No. 2 process. At this time, a temporal restricting condition is assigned to prevent cells from being frequently reselected as the signal characteristics vary. The cell reselection procedure is to be described below in detail.

FIG. 15 is a flowchart showing an RRC connection establishment procedure to which the present invention can be applied.

A UE sends to a network an RRC connection request message for requesting an RRC connection (S1510). The network sends an RRC connection setup message in response to the RRC connection request (S1520). After receiving the RRC connection setup message, the UE enters an RRC connection mode.

The UE sends to the network an RRC connection setup complete message used to confirm successful completion of the RRC connection establishment (S1530).

FIG. 16 is a flowchart showing an RRC connection reconfiguration procedure to which the present invention can be applied.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S1610). In response to the RRC connection reconfiguration, the UE sends to the network an RRC connection reconfiguration complete message used to confirm successful completion of the RRC connection reconfiguration (S1620).

FIG. 17 is a view illustrating an example RRC connection reestablishment procedure to which the present invention can be applied.

Referring to FIG. 17, the UE stops using all of the configured radio bearers except SRB 0 (Signaling Radio Bearer #0) and initializes various sub-layers of AS (Access Stratum) (S1710). Further, the UE sets up each sub-layer and physical layer as default configuration. During such procedure, the UE maintains the RRC connection state.

The UE performs a cell selection procedure for conducting an RRC connection reestablishment procedure (S1720). Although the UE maintains the RRC connection state during the RRC connection reestablishment procedure, the cell selection procedure may be performed like the cell selection procedure performed by the UE in the RRC idle mode.

After performing the cell selection procedure, the UE identifies the system information on a corresponding cell to determine whether the corresponding cell is a proper cell (S1730). In case the selected cell is determined to be a proper E-UTRAN cell, the UE sends an RRC connection reestablishment request message to the corresponding cell (S1740).

On the other hand, in case the cell selected through the cell selection procedure for performing the RRC connection reestablishment procedure is determined to be a cell using other RAT than the E-UTRAN, the UE stops the RRC connection reestablishment procedure and enters the RRC idle mode (S1750).

The UE may be implemented to finish identifying whether the cell is proper within a limited time through the cell selection procedure and reception of the system information on the selected cell. To that end, the UE may run a timer as the UE initiates the RRC connection reestablishment procedure. The timer, when the UE is determined to have selected a proper cell, may stop. In case the timer expires, the UE considers it as failure of the RRC connection reestablishment procedure and may enter the RRC idle mode. This timer is hereinafter referred to as a radio link failure timer. According to the LTE spec. TS 36.331, a timer denoted T311 may be utilized as the radio link failure timer. The UE may obtain configuration values of the timer from the system information of the serving cell.

When receiving the RRC connection reestablishment request message from the UE and accepting the request, the cell transmits an RRC connection reestablishment message to the UE.

When receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure has been complete (S1760).

On the contrary, unless the cell receives the RRC connection reestablishment request message from the UE and accepts the request, the cell transmits an RRC connection reestablishment reject message to the UE.

If the RRC connection reestablishment procedure is successfully done, the cell and the UE perform an RRC connection reestablishment procedure. By doing so, the UE recovers to the state before performing the RRC connection reestablishment procedure and maximally guarantees service continuity.

General Carrier Aggregation

A communication environment considered in the embodiments of the present invention includes all of multi-carrier support environments.

That is, a multi-carrier system or carrier aggregation (CA) system used in the present invention refers to a system that aggregates and uses one or more component carriers (CCs) having a smaller bandwidth than a target band when configuring a target wideband in order to support a wideband.

In the present invention, the multi-carrier means an aggregation of carriers (or carrier aggregation). In this case, an aggregation of carriers means all of aggregations between non-contiguous carriers in addition to an aggregation between contiguous carriers.

Furthermore, the number of component carriers aggregated between the downlink and the uplink may be differently set. A case where the number of downlink component carriers (hereinafter referred to as "DL CCs") and the number of uplink component carriers (hereinafter referred to as "UL CCs") are the same is called a symmetric aggregation. A case where the number of DL CCs and the number of UL CCs are different is called an asymmetric aggregation. Such a carrier aggregation may be interchangeably used with a term, such as a carrier aggregation, a bandwidth aggregation or a spectrum aggregation.

A carrier aggregation formed by combining two or more component carriers has an object of support up to a 100 MHz bandwidth in the LTE-A system. When one or more carriers having a smaller bandwidth than a target band are combined, the bandwidth of the combined carriers may be limited to the bandwidth used in the existing system in order to maintain backward compatibility with the existing IMT system. For example, the existing 3GPP LTE system may support {1.4, 3, 5, 10, 15, 20} MHz bandwidths. The 3GPP LTE-advanced system (i.e., LTE-A) may support a bandwidth greater than 20 MHz using only the bandwidths for compatibility with the existing system.

Furthermore, a carrier aggregation system used in the present invention may define a new bandwidth and support a carrier aggregation regardless of the bandwidths used in the existing system.

The LTE-A system uses the concept of a cell in order to manage radio resources.

The aforementioned carrier aggregation environment may be called a multiple cell environment. A cell is defined by a pair of a downlink resource (DL CC) and uplink resource (UL CC) combination, but an uplink resource is not an essential element. Accordingly, a cell may include only a downlink resource or a downlink resource and an uplink resource. If a specific UE has only one configured serving cell, it may have one DL CC and one UL CC. If a specific UE has two or more configured serving cells, it may have DL CCs corresponding to the number of cells, and the number of UL CCs may be equal to or smaller than number of DL CCs.

Alternatively, a DL CC and an UL CC may be configured in reverse. That is, if a specific UE has multiple configured serving cells, a carrier aggregation environment in which the number of UL CCs greater than number of DL CCs may be supported. That is, a carrier aggregation may be construed as being an aggregation of two or more cells having different carrier frequencies (center frequencies of cells). In this case, the aforementioned "cell" must be distinguished from a "cell" as a region covered by an eNB and used in general.

A cell used in the LTE-A system includes a primary cell (PCell) and a secondary cell (SCell). The P cell and the S cell may be used as serving cells. A UE that is in the RRC_CONNECTED state, but that has a carrier aggregation not configured therein or does not support a carrier aggregation has only one a serving cell configured as only a P cell. In contrast, a UE that is in the RRC_CONNECTED state and has a carrier aggregation configured therein may include one or more serving cells. A P cell and one or more S cells are included in all of the serving cells.

A serving cell (P cell and S cell) may be configured through an RRC parameter. PhysCellId is the physical layer identifier of a cell and has integer values of 0 to 503. SCellIndex is a short ID used to identify an S cell and has integer values of 1 to 7. ServCellIndex is a short ID used to identify a serving cell (P cell or S cell) and has integer values of 0 to 7. The value 0 is applied to a P cell, and SCellIndex is previously assigned to apply to an S cell. That is, in ServCellIndex, a cell having the smallest cell ID (or cell index) becomes a P cell.

A P cell means a cell that operates on a primary frequency (or primary CC). A UE may use a P cell to perform an initial connection establishment process or to perform a connection reconfiguration process. A P cell may refer to a cell indicated in a handover process. Furthermore, a P cell means a cell, that is, the center of control-related communication, from among serving cells configured in a carrier aggregation environment. That is, a UE may receive a PUCCH allocated thereto in its own P cell only and perform transmission, and may use only a P cell to obtain system information or to change a monitoring procedure. An evolved universal terrestrial radio access network (E-UTRAN) may change only a P cell for a handover procedure using an RRC connection reconfiguration (RRCConnectionReconfigutaion) message of a higher layer including mobility control information (mobilityControlInfo) with respect to a UE that supports a carrier aggregation environment.

An S cell may mean a cell that operates on a secondary frequency (or secondary CC). Only one P cell is allocated to a specific UE, and one or more S cells may be allocated to the UE. An S cell may be configured after an RRC connection is established, and may be used to provide an additional radio resource.

In a carrier aggregation environment, a PUCCH is not present in the remaining cells, that is, an S cell other than a P cell, from among configured serving cells. The E-UTRAN may provide all of pieces of system information related to the operation of a related cell in the RRC_CONNECTED state through a dedicated signal when adding an S cell to a UE supporting a carrier aggregation environment. A change of system information may be controlled by the release and addition of a related S cell. In this case, an RRC connection reconfiguration (RRCConnectionReconfigutaion) message of a higher layer may be used. The E-UTRAN may perform dedicated signaling having a different parameter for each UE rather than broadcasting within a related S cell.

After an initial security activation process is started, the E-UTRAN may configure a network including one or more S cells in addition to a P cell initially configured in a connection establishment process. In a carrier aggregation environment, a P cell and an S cell may operate as respective component carriers. In the following embodiments, a primary component carrier (PCC) may be used as the same meaning as a P cell, and a secondary component carrier (SCC) may be used as the same meaning as an S cell.

FIG. 18 shows examples of component carriers and carrier aggregations in a wireless communication system to which the present invention may be applied.

FIG. 18(a) shows a single carrier structure used in the LTE system. The component carrier includes a DL CC and an UL CC. One component carrier may have a frequency range of 20 MHz.

FIG. 18(b) shows a carrier aggregation structure used in the LTE_A system. FIG. 18(b) shows a case where 3 component carriers having a frequency size of 20 MHz have been combined. Three DL CCs and three UL CCs are present, but the number of DL CCs and UL CCs is not limited. In the case of a carrier aggregation, a UE can monitor 3 CCs at the same time, may receive a downlink signal/data and may transmit an uplink signal/data.

If N DL CCs are managed in a specific cell, a network may allocate M (M≤N) DL CCs to a UE. In this case, the UE may monitor only the M limited DL CCs and receive a DL signal. Furthermore, the network may give priority to L (L≤M≤N) DL CCs and allocate a primary DL CC to the UE. In such a case, the UE must monitor the L DL CCs. Such a method may be identically applied to uplink transmission.

Linkage between the carrier frequency (or DL CC) of a downlink resource and the carrier frequency (or UL CC) of an uplink resource may be indicated by a higher layer message, such as an RRC message, or system information. For example, a combination of a DL resource and an UL resource may be configured by a linkage defined by system information block Type2 (SIB2). Specifically, the linkage may mean a mapping relation between a DL CC in which a PDCCH carrying an UL grant is transmitted and an UL CC using an UL grant and may mean a mapping relation between a DL CC (or UL CC) in which data for an HARQ is transmitted and an UL CC (or DL CC) in which an HARQ ACK/NACK signal is transmitted.

Dual Connectivity (DC)

In a heterogeneous network supporting small cell evolution, there are various requirements related to mobility robustness, a signaling load increasing due to frequent handover, the improvement of throughput per user, and a system capacity.

As a solution for realizing such requirements, the E-UTRAN supports a dual connectivity (DC) operation in which various RX/TX UEs are provided by two different schedulers in RRC_CONNECTED and which is configured to use radio resources positioned at two eNBs connected through non-ideal backhaul through an X2.

Dual connectivity may imply control and data separation. For example, control signaling for mobility is provided through a macro cell at the same time as the time when a high-speed data connection is provided through a small cell. Furthermore, separation between the downlink and the uplink and a connection between the downlink and the uplink are provided through different cells.

eNBs related to dual connectivity for a specific UE may assume two different roles. For example, one eNB may behave as a MeNB or a SeNB.

In dual connectivity, a UE may be connected to one MeNB and one SeNB.

An MeNB is an eNB that terminates at least one S1-MME in dual connectivity (DC). An SeNB is an eNB that provides an additional radio resource for a UE, but is not a master eNB in dual connectivity.

Additionally, DC in which a CA has been configured means an operation mode of a UE in the RRC connection state, and includes a master cell group and a secondary cell group.

In this case, the "cell group" indicates a group of serving cells related to a master eNB (MeNB) or secondary eNB (SeNB) in dual connectivity.

A "master cell group (MCG)" is a group of serving cells related to a MeNB, and includes a primary cell (PCell) and optionally one or more secondary cells (SCells) in dual connectivity.

A "secondary cell group (SCG)" indicates a group of serving cells related to a SeNB including a primary SCell (pSCell) and optionally one or more SCells.

In this case, a "cell" described hereinafter must be distinguished from a "cell" as a common area covered by an eNB. That is, the cell indicates a combination of a downlink resource and optionally an uplink resource.

A linkage between the carrier frequency (e.g., the center frequency of a cell) of a downlink resource and the carrier frequency of an uplink resource is indicated by system information transmitted in a downlink resource.

An MCG bearer is a radio protocol positioned only in a MeNB in order to use only a MeNB resource in dual connectivity. An SCG bearer is a radio protocol positioned only in a SeNB in order to use a SeNB resource in dual connectivity.

Furthermore, a split bearer is a radio protocol positioned in both a MeNB and a SeNB in order to use both MeNB and SeNB resources in dual connectivity.

FIG. 19 illustrates a control plane for dual connectivity in the E-UTRAN.

Inter-eNB control plane signaling for dual connectivity is performed for X2 interface signaling.

Control plane signaling toward an MME is performed by S1 interface signaling. Only one S1-MME connection per UE is present between a MeNB and the MME.

Each eNB needs to independently handle UEs. For example, each eNB provides a PCell to some UEs while providing an SCell(s) for an SCG to other UEs.

Each eNB related to dual connectivity for a specific UE posses its own radio resource and is chiefly responsible for allocating the radio resources of its own cells. Each coordination is performed by X2 interface signaling between the MeNB and the SeNB.

As shown in FIG. 19, the MeNB is a C-plane connected to the MME through the S1-MME, and the MeNB and the SeNB are interconnected through X2-C.

FIG. 20 illustrates a user plane structure for dual connectivity in the E-UTRAN.

FIG. 20 shows the user plane (U-plane) connectivity of eNBs related to dual connectivity for a specific UE. The user plane connectivity depends on bearer selection configured as follows.

With respect to MCG bearers, a MeNB is a U-plane connected to an S-GW through an S1-U, and a SeNB is not related to the transmission of user plane data.

For split bearers, the MeNB is a user plane connected to the S-GW through the S1-U. Furthermore, the MeNB and the SeNB are interconnected through an SMS X2-U.

In this case, the split bearers are radio protocols positioned in both the MeNB and the SeNB in order to use both MeNB and SeNB resources.

For SCG bearers, the SeNB is directly connected to the S-GW through the S1-U.

Accordingly, if the MCG and the split bearer have only to be configured, there is no termination of the S1-U in the SeNB.

FIG. 21 illustrates radio interface protocol architecture for dual connectivity between the E-UTRAN and a UE.

In dual connectivity, radio protocol architecture using a specific bearer depends on how a bearer has been set up.

Three alternatives, that is, an MCG bearer, an SCG bearer and a split bearer, are present.

That is, other bearers (e.g., MCG bearers) are provided by only a MeNB, whereas specific bearers (e.g., SCG bearers) of a UE may also be provided by a SeNB.

Furthermore, other bearers (e.g., MCG bearers) are provided by only a MeNB, whereas specific bearers (e.g., split bearers) of a UE may be split. Such three alternatives are shown in FIG. 21.

If a MCG bearer and an SCG bearer are set up, an S1-U fully completes a radio-interface U-plane protocol stack currently defined for each bearer in a given eNB, and enables the transmission of one EPS bearer to be realized by one node.

The transmission of other bearers may still occur at the same time from a MeNB and a SeNB.

If a split bearer is set up, an S1-U is terminated in a MeNB having a PDCP layer always present in the MeNB.

Separately, an independent RLC bearer (SAP over RLC) is present and is terminated in a MeNB for each eNB configured to transmit the PDCP PDUs of a PDCP bearer (SAP over PDCP) from the viewpoint of a UE.

The PDCP layer provides PDCP PDU routing for transmission and provides a PDCP PDU reordered for reception for split bearers in dual connectivity.

SRBs are always MCG bearers and thus use radio resources provided by a MeNB.

In this case, DC may be illustrated as having at least one bearer configured to use radio resources provided by a SeNB.

FIG. 22 illustrates a control plane structure for dual connectivity in the E-UTRAN.

In a dual connectivity operation, a SeNB posses its own radio resources and is chiefly responsible for allocating the radio resources of its own cells.

Accordingly, some coordination is still required between a MeNB and a SeNB in order to enable the allocation.

The following at least one RRC function is appropriate when the addition of a small cell layer to a UE for a dual connectivity operation is considered.

Common radio resource configuration of small cell layer

Dedicated radio resource configuration of small cell layer

Measurement and mobility control for small cell layer

In a dual connectivity operation, a UE always stays in one RRC state (e.g., RRC connection state or RRC idle state).

Referring to FIG. 22, after the coordination of an RRM function between a MeNB and a SeNB, the MeNB generates the last RRC message transmitted toward a UE.

A UE RRC entity watches all of messages incoming from one entity (from the MeNB). A UE responds to only the entity. Such L2 transmission of messages depends on a selected user plane structure and an intended solution.

The following common principles are applied to an operation of dual connectivity.

1. A MeNB maintains the RRM measurement configuration of a UE and determines to request a SeNB to provide additional resources (serving cells) for the UE by checking received measurement or based on traffic conditions or bearer types, for example.

2. When the request is received from the MeNB, the SeNB may generate a container that causes the configuration of additional serving cells for the UE.

3. The MeNB and the SeNB exchange information about the UE configuration through RRC containers (inter-node messages) transmitted in Xn messages. In this case, the Xn interface may be an X2 interface in the LTE/LTE-A system.

4. The SeNB may initiate the reconfiguration of its own present serving cells (e.g., PUCCHs toward the SeNB).

5. The MeNB does not change the content of an RRC configuration provided by the SeNB.

Coordinated Multi-Point (COMP) Transmission and Reception

In line with the need of LTE-advanced, for performance improvement of a system, CoMP transmission was proposed. CoMP is also called co-MIMO, collaborative MIMO or network MIMO. CoMP is expected to improve performance of a UE positioned at the cell boundary and to improve the throughput of an average cell (sector).

In general, inter-cell interference deteriorates performance of a UE positioned at the cell boundary and average cell (sector) efficiency in a multi-cell environment in which a frequency reuse index is 1. In order to reduce inter-cell interference, a simple manual method, such as fractional frequency reuse (FFR), was applied in the LTE system so that a UE positioned at the cell boundary has proper performance efficiency in an interference-limited environment. However, a method of reusing inter-cell interference as a desired signal of a UE or reducing inter-cell interference instead of reducing the use of a frequency resource per cell is more profitable. In order to achieve the aforementioned object, a CoMP transmission method may be applied.

A CoMP method that may be applied to the downlink may be divided into a joint processing (JP) method and a coordinated scheduling/beamforming (CS/CB) method.

In the JP method, data may be used in each point (eNB) of a CoMP unit. The CoMP unit means a set of eNBs used in a CoMP method. The JP method may be divided into a joint transmission method and a dynamic cell selection method.

The joint transmission method means a method in which signals are transmitted from a plurality of points, that is, all or some in a CoMP unit, at the same time through a PDSCH. That is, data transmitted to one UE may be transmitted from a plurality of transmission points at the same time. Quality of a signal transmitted to a UE regardless of whether the transmission is coherently or non-coherently can be improved through such a joint transmission method. Interference with another UE can be positively removed.

The dynamic cell selection method means a method in which a signal is transmitted from one point through a PDSCH in a CoMP unit. That is, data transmitted to one UE at a specific time is transmitted from one point, and data is not transmitted to the UE at another point within a CoMP unit. A point that transmits data to the UE may be dynamically selected.

In accordance with the CS/CB method, a CoMP unit performs beamforming through cooperation for data transmission to one UE. That is, data is transmitted from only a serving cell to a UE, but user scheduling/beamforming may be determined through cooperation between a plurality of cells within a CoMP unit.

In the case of the uplink, CoMP reception means the reception of a signal transmitted by cooperation between a plurality of geographically separated points. A CoMP method that may be applied to the uplink may be divided into a joint reception (JR) method and a coordinated scheduling/beamforming (CS/CB) method.

The JR method means a method for a plurality of points, that is, all or some in a CoMP unit, to receive a signal transmitted through a PDSCH. In the CS/CB method, a signal transmitted through a PDSCH is received only in one point. In contrast, user scheduling/beamforming may be determined through cooperation between a plurality of cells within a CoMP unit.

HARQ Process in LTE/LTE-A System

Current LTE uses 8 HARQ processes as a method for error recovery of data. The following two types of HARQs are defined depending on data retransmission timing.

FIG. 23 is a diagram showing an example of an asynchronous HARQ operation in the downlink.

Referring to FIG. 23, an eNB that has received NACK sets an NDI within a DL grant (DCI format 1) as a bit indicative of retransmission when transmitting retransmission data, and transmits the retransmission data. In this case, an HARQ process ID is included to indicate retransmission for which data.

FIG. 24 is a diagram showing an example of a synchronous HARQ operation in the uplink.

Referring to FIG. 24, an eNB that has transmitted NACK sets an NDI within an UL grant (DCI format 1) as a bit indicative of retransmission and allocates a data resource for retransmission to a new resource or omits an UL grant so that retransmission data is transmitted through the same resource as that of initial data transmission. In this case, retransmission timing is fixed as a subframe after 4 ms from NACK reception.

FIG. 25 is a diagram showing an example of information block processing for performing an HARQ.

Referring to FIG. 25, some of or the entire MAC PDU, that is, information block, is transmitted through a transport block (TB) so that it is transmitted through a physical layer.

CRC is attached to one transport block (TB). TO attach CRC to the TB may be simply called "CRC attachment."

The TB to which CRC has been attached is split in a proper size for channel encoding. The split block is called a "code block."

An encoder performs channel encoding on a code block and outputs an encoded packet.

The encoder may apply a turbo code, that is, one of error correction codes.

The turbo code is a structural code in which information bits are included as systematic bits.

For example, in the case of a turbo code having a code rate of ⅓, 2 parity bits are allocated to one systematic bit.

In a conventional HARQ, one HARQ function is performed in a TB unit. An HARQ processor performs an HARQ mode (CC or IR) and HARQ method (adaptive HARQ or non-adaptive HARQ) suitable for a retransmission environment on an encoded packet in order to retransmit a packet having an error.

A channel interleaver disperses transmission errors according to channels by mixing the encoded packet in a bit unit.

A physical resource mapper converts the interleaved encoded packets into a data symbol and maps the data symbol to a data region.

FIG. 26 is a diagram showing an example of a redundancy version (RV) for an encoded packet.

Referring to FIG. 26, all of bit strings of encoded packets are called a mother codeword.

A mother codeword generated by applying a turbo code includes systematic bits having a bit string having the same length as a code block and at least one parity bit related to the systematic bits.

Assuming that a mother code rate is 1/Rm and the size of a code block input to the encoder is NEP, the length of a mother codeword is Rm•NEP.

If the encoder uses a convolutional turbo code (CTC) of a double binary structure, the NEP is the number of bits input to a CTC turbo encoder and is a parameter defined as the size of an encoded packet.

If the size of the internal interleaver of the CTC turbo encoder is $N^{대}$, $^{NEP}=2*N$.

If the mother code rate is ⅓, it may be seen that the mother codeword includes one systematic bit and two parity bits as in FIG. 26.

Furthermore, the HARQ scheme basically attempts error correction on a received code and determines whether to perform retransmission using a single error detection code, such as cyclic redundancy check (CRC).

The HARQ scheme is basically divided into three forms with respect to retransmission. LTE performs the HARQ scheme through a CC (No. 2 scheme) or IR (No. 3 scheme).

1) Type-I HARQ Scheme: a receiving stage discards an erroneous packet and makes a retransmission request. A transmission stage transmits a packet, such as that upon first transmission. In this case, reliability improvement of a system and performance improvement through FEC are obtained by discarding an erroneous packet.

2) Type-I HARQ Scheme with Chase Combining: this is a scheme in such a way as to combine and use an erroneous packet and a packet in which the erroneous packet has been retransmitted instead of discarding the erroneous packet. There is an effect in that signal power is improved by combining several packets.

3) Type-II HARQ Scheme (Incremental redundancy Scheme): This is a scheme for using a code of a high code rate upon initial transmission and transmitting additional redundancy when retransmission occurs in order to prevent a case where an unnecessarily high redundant code is transmitted upon initial transmission in the case of Type-I.

In an HARQ of the IR mode, a mother codeword is divided into a plurality of bit string blocks and transmitted in a bit string block unit. The bit string block is indicated as 4 RVs as in FIG. 26.

A first bit string block including a systematic bit is indicated as an RV0, a second bit string block contiguous in a first block is indicated as an RV1, a third bit string block is indicated as an RV2, and a fourth bit string block is indicated as an RV3.

In this case, it may be seen that if contiguous bit string blocks exceed the length of a mother codeword, an exceeded portion is circularly transmitted as in FIG. 26.

FIG. 27 is a flowchart showing an example of a method for a receiving stage to process an HARQ packet.

A UE that has received an encoded packet decodes the encoded packets in the sequence of FIG. 27.

Referring to FIG. 27, when the UE receives a packet for a specific HARQ process ID (HARQ PID) (S2710), it confirms whether the received packet is a new packet (S2720).

If, as a result of the confirmation, the received packet is a new packet, the UE stores the new packet in a buffer for the corresponding PID (S2730) and performs decoding (S2740).

Thereafter, the UE feeds the result of the decoding execution back to an eNB (or transmission stage). That is, the UE checks whether the decoding is successful (S2750) and transmits corresponding feedback to the eNB.

If the decoding has failed and the UE transmits NACK to the eNB (S2780), the eNB confirms whether a maximum retransmission number of HARQ encoded packets has been exceeded (S2790), and performs retransmission on the HARQ encoded packet (CC or IR mode).

In this case, the UE that has received the retransmitted packet performs combining on the previously stored encoded packet and the retransmission packet.

In step S2790, if the maximum retransmission number has been exceeded, the UE performs step S2770. If the maximum retransmission number has not been exceeded in step S2790, the UE performs step S2710.

In step S2750, if the decoding has been successfully performed, the UE transmits HARQ ACK to the eNB (S2760) and flushes the data of the corresponding HARQ buffer (S2770).

FIG. 28 is a diagram showing an example of the existing HARQ operation principle.

In FIG. 28, P1A, P1B and P1C mean HARQ packets generated in the same coded bits.

In the case of the IR mode, the P1A, P1B and P1C may mean different RVs.

As shown in FIG. 28, in the case of a conventional HARQ, when a UE receives a new packet, the UE transmits feedback for the received packet to an eNB.

If the UE has transmitted NACK to the eNB, the UE receives a retransmitted second packet from the eNB.

Thereafter, the UE performs combining on the first packet and the second packet and feeds the results of the combining back to the eNB.

In current LTE, one HARQ entity is mapped to each CC.

FIG. 29 shows another example of the HARQ operation principle.

That is, FIG. 29 shows a method of transmitting HARQ packets generated in the same transport block (TB) through different CCs.

In this case, the retransmitted HARQ packets may be mapped to the same HARQ entity, may be combined and may be retransmitted.

Secondary Cell Configuration in LTE-A

RRC Connection Control

RRC connection establishment is accompanied by the establishment of an SRB1.

An E-UTRAN completes RRC connection establishment before it completes S1 connection establishment, for example, before it receives UE context information from EPC.

Accordingly, AS security is not activated in the initial step of an RRC connection.

In the initial step of the RRC connection, the E-UTRAN may configure a UE so that the UE performs a measurement report.

However, the UE may receive a handover message only when security has been activated.

When receiving the UE context from the EPC, the E-UTRAN activates security (both ciphering and integrity protection) using an initial security activation procedure.

An RRC message for activating security (command and successful response) is subjected to integrity protection. In contrast, ciphering is started after the corresponding procedure is completed.

That is, a response to a message used to activate security is not ciphered. In contrast, a subsequent message (e.g., used to establish an SRB2 and DRBs) is subjected to integrity protection and ciphered.

After the initial security activation procedure is initiated, the E-UTRAN initiates the establishment of an SRB2 and DRBs. For example, the E-UTRAN may perform a corresponding task before it receives the confirmation of security initial activation from the UE.

In any case, the E-UTRAN applies both ciphering and integrity protection on an RRC connection reconfiguration message used to configure the SRB2 and the DRBs.

If initial security activation and/or radio bearer establishment fail (i.e., if security activation and DRB establishment are triggered by a joint S1-procedure not supporting a partial success), the E-UTRAN releases the RRC connection.

Security is always activated from the beginning with respect to the SRB2 and the DRBs. For example, the E-UTRAN does not establish such bearers before it activates security.

Critical extension has been defined with respect to some radio configuration fields.

A change from the original version of the field to an importantly extended version is permitted to use all of connection reconfigurations.

A UE returns to the original version of a partially importantly extended field depending on handover and a reconfiguration.

If the importantly extended version is changed into the original field, it is possible only when a handover or reconfiguration procedure is used using all of configuration options.

After the initial security activation procedure is initiated, the E-UTRAN may configure a UE supporting one or more SCells and a CA in addition to a PCell initially configured during connection establishment.

The PCell is used to provide security input and a higher layer system information (NAS mobility information, for example, a TAI).

The SCells are used to provide additional downlink and selective uplink radio resources.

The UE is part of an MCG unless DC is configured with respect to all of configured SCells.

However, if DC is configured, specific SCells are part of an SCG.

In such a case, while the E-UTRAN configures a CG (split DRB) used in the UL, user data delivered by a DRB may be delivered through the MCG, through the SCG or through the MCG and the SCG in the DL.

The RRC connection reconfiguration message may be used to change a DRB type from an MCG-DRB to an SCG-DRB or split DRB in addition to a change of a DRB type from an SCG-DRB or split DRB to an MCG-DRB.

An SCG change is a synchronous SCG reconfiguration procedure including the refresh of security if the reset/reestablishment of layer 2 and SCG DRBs are configured.

The corresponding procedure is used in different scenarios, such as SCG establishment, a PSCell change, key refresh and a change of a DRB type.

A UE performs an SCG change-related operation when it receives an RRCConnectionReconfiguration message including a mobilityControlInfoSCG.

In general, the released of an RRC connection is initiated by the E-UTRAN.

The corresponding procedure may be used to re-direct a UE toward an E-UTRA frequency or a carrier frequency between RATs again.

Dual Connectivity Operation, TS 36.300

SeNB Addition

An SeNB addition procedure is initiated by a MeNB and is used for a SeNB to establish UE context in order to provide radio resources to a UE.

This procedure is used to add at least the first cell (PSCell) of an SCG.

FIG. 30 is a diagram showing an example of a SeNB addition procedure to which a method proposed in this specification may be applied.

A MeNB determines to request a SeNB to allocate a radio resource with respect to a specific E-RAB indicative of E-RAB parameters (TNL address information corresponding to a bearer type).

Additionally, the MeNB indicates a total UE capability for UE capability coordination to be basically used for an MCG configuration and a reconfiguration by the SeNB within SCG-ConfigInfo, but does not include an SCG configuration.

The MeNB may provide that the recent measurement results for the request SCG cell(s) should be added. The SeNB may reject the corresponding request.

In the SeNB, if an RRM entity can permit a resource request, each radio resource and each transmission network resource dependent on a bearer option are allocated.

The SeNB triggers random access so that the synchronization of a radio resource configuration can be performed. The SeNB provides the MeNB with a new radio resource of an SCG in the SCG-configuration.

With respect to SCG bearers, the SeNB provides S1 DL TNL address information about each E-RAB along with the new radio resource of the SCG and provides X2 DL TNL address information along with a security algorithm for split bearers.

If the MeNB guarantees the new configuration, the MeNB transmits an RRCConnectionReconfiguration message, including the new radio resource of the SCG, to a UE based on SCG Config.

The UE applies the new configuration and sends an RRCConnectionReconfigurationComplete message.

If the UE cannot comply with a configuration (or part of the configuration) included in the RRCConnectionReconfiguration message, it performs a reconfiguration failure procedure.

The MeNB notifies the SeNB that the UE has successfully completed the reconfiguration procedure.

The UE performs synchronization toward the PSCell of the SeNB.

In the sequence, the UE transmits an RRCConnectionReconfigurationComplete message and performs a random access procedure toward the side in which an SCG has not been defined.

A successful RA procedure toward the SCG is not necessary for the successful completion of an RRC connection reconfiguration procedure.

In the case of an SCG bearer dependent on the bearer characteristics of each E-RAB, the MeNB may take measures so that a service stop attributable to the activation of dual connectivity (data transmission, SN state transmission) is minimized.

The update of a user plane (UP) path toward EPC is performed with respect to the SCG bearers.

SCG-Config. Message

An SCG-Config. message is used to transmit an SCG radio configuration generated by a SeNB. The transmission direction of the message is from a secondary eNB (SeNB) to a master eNB (SeNB).

Table 3 shows an example of an SCG-Config. message format.

TABLE 3

```
-- ASN1START
SCG-Config-r12 ::=              SEQUENCE {
    criticalExtensions              CHOICE {
        c1                              CHOICE {
            scg-Config-r12                  SCG-Config-r12-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE { }
    }
}
SCG-Config-r12-IEs ::=          SEQUENCE {
    scg-RadioConfig-r12             SCG-ConfigPartSCG-r12   OPTIONAL,
    nonCriticalExtension            SEQUENCE { }   OPTIONAL
}
-- ASN1STOP
```

Table 4 is a table showing an SCG-Config. field.

TABLE 4

| SCG-Config field descriptions |
| --- |
| scg-RadioConfig-r12<br>Includes the change of the dedicated SCG configuration and, upon addition of an SCG cell, the common SCG configuration.<br>The SeNB only includes a new SCG cell in response to a request from MeNB, but may include release of an SCG cell release or release of the SCG part of an SCG/Split DRB without prior request from the MeNB.<br>The SeNB does not use this field to initiate release of the SCG. |

SCG-ConfigInfo Message

An SCG-ConfigInfo message is used by a MeNB so that it is requested from a SeNB in order to perform a specific operation (e.g., establish, modify or release an SCG). The transmission direction of the corresponding message is from a master eNB to a secondary eNB.

Table 5 shows an example of an SCG-ConfigInfo message format.

TABLE 5

```
-- ASN1START
SCG-ConfigInfo-r12 ::=                SEQUENCE {
    criticalExtensions                CHOICE {
        c1                                CHOICE{
            scg-ConfigInfo-r12                SCG-ConfigInfo-r12-IEs,
            spare7 NULL,
            spare6 NULL, spare5 NULL, spare4 NULL,
            spare3 NULL, spare2 NULL, spare1 NULL
        },
        criticalExtensionsFuture          SEQUENCE { }
    }
}
SCG-ConfigInfo-r12-IEs ::=        SEQUENCE {
    radioResourceConfigDedMCG-r12     RadioResourceConfigDedicated           OPTIONAL,
    sCellToAddModListMCG-r12          SCellToAddModList-r10                  OPTIONAL,
    measGapConfig-r12                 MeasGapConfig                          OPTIONAL,
    powerCoordinationInfo-r12         PowerCoordinationInfo-r12       OPTIONAL,
    scg-RadioConfig-r12               SCG-ConfigPartSCG-r12                  OPTIONAL,
    eutra-CapabilityInfo-r12          OCTET STRING (CONTAINING UECapabilityInformation)
    OPTIONAL,
    scg-ConfigRestrictInfo-r12        SCG-ConfigRestrictInfo-r12             OPTIONAL,
    mbmsInterestIndication-r12        OCTET STRING (CONTAINING
                                          MBMSInterestIndication-r11)          OPTIONAL,
    measResultServCellListSCG-r12 MeasResultServCellListSCG-r12 OPTIONAL,
    drb-ToAddModListSCG-r12               DRB-InfoListSCG-r12                OPTIONAL,
    drb-ToReleaseListSCG-r12          DRB-ToReleaseList                      OPTIONAL,
    sCellToAddModListSCG-r12              SCellToAddModListSCG-r12           OPTIONAL,
    sCellToReleaseListSCG-r12             SCellToReleaseList-r10             OPTIONAL,
    p-Max-r12                         P-Max                                      OPTIONAL,
    nonCriticalExtension              SEQUENCE { }                           OPTIONAL
}
DRB-InfoListSCG-r12 ::=           SEQUENCE (SIZE (1..maxDRB)) OF DRB-InfoSCG-r12
DRB-InfoSCG-r12 ::=               SEQUENCE {
    eps-BearerIdentity-r12            INTEGER (0..15)              OPTIONAL, -- Cond DRB-Setup
    drb-Identity-r12                  DRB-Identity,
    drb-Type-r12                      ENUMERATED {split, scg}       OPTIONAL, -- Cond DRB-
Setup
    ...
}
SCellToAddModListSCG-r12 ::=      SEQUENCE (SIZE (1..maxSCell-r10)) OF Cell-ToAddMod-r12
Cell-ToAddMod-r12 ::=                 SEQUENCE {
    sCellIndex-r12                        SCellIndex-r10,
    cellIdentification-r12                SEQUENCE {
        physCellId-r12                        PhysCellId,
        dl-CarrierFreq-r12                    ARFCN-ValueEUTRA-r9
    }                                                                           OPTIONAL, -- Cond
SCellAdd
    measResultCellToAdd-r12               SEQUENCE {
        rsrpResult-r12                        RSRP-Range,
        rsrqResult-r12                        RSRQ-Range
    }                                                                           OPTIONAL, -- Cond
SCellAdd2
    ...
}
MeasResultServCellListSCG-r12 ::=     SEQUENCE (SIZE (1..maxServCell-r10)) OF
MeasResultServCellSCG-r12
MeasResultServCellSCG-r12 ::=         SEQUENCE {
    servCellId-r12                        ServCellIndex-r10,
    measResultSCell-r12                   SEQUENCE {
        rsrpResultSCell-r12                   RSRP-Range,
        rsrqResultSCell-r12                   RSRQ-Range
    },
    ...
```

TABLE 5-continued

```
}
SCG-ConfigRestrictInfo-r12 ::=      SEQUENCE {
    maxSCH-TB-BitsDL-r12                INTEGER (1..100),
    maxSCH-TB-BitsUL-r12                INTEGER (1..100)
}
-- ASN1STOP
```

Table 6 shows an example of an SCG-ConfigInfo field.

TABLE 6

SCG-ConfigInfo field descriptions drb-ToAddModListSCG
Includes DRBs the SeNB is requested to establish or modify (DRB type change).
drb-ToReleaseListSCG
Includes DRBs the SeNB is requested to release.
maxSCH-TB-BitsXL
Indicates the maximum DL-SCH/UL-SCH TB bits that may be scheduled in a TTI. Specified as a percentage of the value defined for the applicable UE category.
measGapConfig
Includes the current measurement gap configuration.
measResultServCellListSCG
Includes measurement results of SCG (serving) cells.
radioResourceConfigDedMCG
Includes the current dedicated MCG radio resource configuration.
sCellToAddModListMCG
Includes the current MCG SCell configuration.
sCellToAddModListSCG
Includes SCG cells the SeNB is requested to establish. Measurement results may be provided for these cells.
sCellToReleaseListSCG
Includes SCG cells the SeNB is requested to release.
scg-RadioConfig
Includes the current dedicated SCG configuration.
scg-ConfigRestrictInfo
Includes fields for which MeNB explicitly indicates the restriction to be observed by SeNB.
p-Max
Cell specific value i.e. as broadcast by PCell.
(a cell-specific value, that is, a value broadcasted by a PCell)

5G has an object of constructing an ultra-low latency system having an extremely short response time to the extent that a user cannot notice awkwardness although a tactile information most sensitive to a latency time from among the five senses of the human being is provided through the Internet as requirements for supporting various real-time application services, such as healthcare, traffic security, disaster safety and remote medical control, are increased.

Furthermore, such services that require ultra-low latency also take into consideration a scenario that requires reliability high data transmission in addition to latency.

Accordingly, there is a need for technology (ultra-reliable and low latency communication) in which data can be rapidly transmitted with high reliability (about 99.999%).

As described above, in order to improve reliability of a radio link for data transmission, a multi-connectivity network structure is taken into consideration in 5G.

However, a multi-connectivity structure, such as a dual connectivity network now provided by 3GPP or cellular/Wi-Fi interworking, was implemented for the object of throughput improvement or traffic offloading of a UE rather than reliability improvement.

In both dual connectivity and cellular/Wi-Fi interworking, one or more U-plane paths may be configured with respect to one UE, but resource allocation and a retransmission method in a radio section are processed through respective links.

In the existing multi-connectivity method, different data is transmitted through one or more radio links for throughput improvement or traffic offloading.

To this end, a UE configures an independent MAC sub-layer entity for each cell in a dual connectivity or carrier aggregation environment.

Such Layer 2 structure is shown in FIG. 31.

As shown in FIG. 31, data transmitted to a specific UE within the same scheduler (or the same eNB) is multiplexed in a MAC sublayer, and a transport block (TB) for each component carrier (CC) is mapped to each multiplexed datum and transmitted. This requires a separate HARQ entity for each CC.

FIG. 31 shows an example of Layer 2 structure in dual connectivity.

A future communication technology, such as 5G, may use the multi-connectivity environment for a UE provided with a new service that requires high reliability, such as a mission-critical service (MCS).

In this case, a detailed method for improving link or data reliability using a multi-connectivity network structure has not been now defined.

A technology for improving reception performance of data transmission may include the existing joint transmission of CoMP.

However, the joint transmission of CoMP is a method of transmitting the same data using the same resource region (time, frequency) in different transport points (TPs), and may have an effect in that it can improve the throughput of a UE positioned in a cell boundary by improving reception power.

However, the joint transmission of CoMP requires tight synchronization between two TPs due to restriction that the same resource region must be used.

Accordingly, the joint transmission of CoMP is not now adopted in the standard due to backhaul delay that may be caused until data is transmitted.

Hereinafter, a multi-path HARQ data combining execution method of transmitting urgent data for supporting a new 5G ultra reliable & low latency machine type communication (uMTC) service with high reliability, which is proposed in this specification, is described.

That is, this specification provides a method of transmitting and receiving multiple packet(s) for the same HARQ transport block (TB) through two or more radio links in order to improve data reception performance of a UE which supports multi-connectivity.

Specifically, the method proposed in this specification may be basically divided into (1) an HARQ combining cell group (CCG) configuration method and (2) a method of transmitting and receiving multiple HARQ packet(s) through an HARQ CCG.

That is, the HARQ CCG configuration method first defines the concept of a combining cell group (CCG) for combining HARQ packets and defines a CCG configuration procedure.

Furthermore, the method of transmitting and receiving multiple HARQ packet(s) through an HARQ CCG is to define the decoding and feedback method of an HARQ packet(s) received during a specific timer (ccg-Deadline).

FIG. 32 is a flowchart showing an example of a method of processing an HARQ packet, which is proposed in this specification, and FIG. 33 shows an example of an HARQ process operation principle proposed in this specification.

That is, a UE can process an HARQ packet as shown in FIG. 32, and can perform an operation for an HARQ process as shown in FIG. 33.

FIG. 33 shows an example of a case where all of packets belonging to a CCG have been received within a timer. FIGS. 32 and 33 are described more specifically later.

A method of transmitting and receiving multiple packets generated from the same HARQ transport block (TB) through different two or more radio links in order to improve data reception performance of a UE supporting multi-connectivity proposed in this specification is as follows.

That is, a multi-path HARQ data combining method proposed in this specification improves reception performance of HARQ data through a link diversity effect in such a manner that different HARQ packets generated from the same HARQ transport block (TB) are received through different two links.

Furthermore, accordingly, this specification has an effect in that it can rapidly transmit data with high reliability compared to the existing technology for a ultra reliable and low latency MTC (uMTC) UE.

In this case, if reliability of each radio link is assumed to be the same as a conventional technology and reliability of the uMTC UE is not satisfied through a single link, the UE may perform multi-connectivity so that required reliability is satisfied by connecting multiple radio links to one or more eNBs.

In this case, in order to improve the data reception success probability of a UE, a multi-path HARQ combining method proposed in this specification may be used.

Accordingly, in the multi-path HARQ combining method proposed in this specification, a UE having multi-connectivity redundantly receives data generated from the same TB using corresponding multiple radio links, thereby being capable of improving data reception reliability in a radio section.

To this end, the UE may first set up a link through which multi-path HARQ combining will be performed by configuring an HARQ combining cell group (CCG).

First, an HARQ combining cell group (CCG) configuration method is described more specifically.

1. HARQ Combining Cell Group (CCG) Configuration Method

An ultra reliable and low latency MTC (uMTC) UE may start an HARQ combining cell group configuration procedure by the indication of an eNB or by a UE determination.

In the HARQ CCG configuration method, an HARQ combining secondary cell is separately configured for each UE, if necessary, so each UE and an eNB can recognize that the corresponding cell is a cell for multi-path HARQ combining.

To this end, multi-path HARQ indicators may be exchanged between the UE and the eNB.

The HARQ CCG may be together configured in the step of configuring a conventional carrier aggregation (CA) or a secondary cell for dual connectivity (DC).

More specifically, one or more combining cell groups (CCGs) may be configured in a UE with respect to a cell for multi-path HARQ combining.

In this case, a minimum configuration unit of the CCG may be a component carrier (CC) or a cell group (CG).

That is, a combining cell group (CCG) defined in this specification may mean a group of cell(s) or cell group(s) capable of transmitting and receiving multiple packets generated from the same HARQ TB.

FIG. 34 shows an example of future 5G network architecture to which a method proposed in this specification may be applied.

As shown in FIG. 34, the future 5G network architecture may be a multi-connectivity environment in which an eNB that may be connected to a specific UE has multi-connectivity with different two or more eNBs beyond the current carrier aggregation and dual connectivity.

Accordingly, the concept of a cell in the existing LTE may be further extended and used as the concept of each cell.

That is, each cell group (CG) including one or more cells (component carriers) may be configured for each eNB.

Furthermore, a cell group (CG) may have a different scheduler for each eNB.

A minimum configuration unit of the newly defined combining cell group (CCG) may be (1) a component carrier (CC) or (2) a cell group (CG).

First, a case where a minimum configuration unit of a CCG is a component carrier (CC) is described.

Case where a Minimum Configuration Unit of a CCG is a Component Carrier (CC)

If a minimum configuration unit of a CCG is a CC in the multi-connectivity environment, two or more of a specific PCell, PScell and Scell may configure one CCG.

Furthermore, one of cells belonging to a specific eNB having an S-GW and an S1-U interface may be configured as a combining primary cell (CPcell).

Furthermore, a cell(s) other than the CPcell may be defined as a CScell(s).

That is, a cell belonging to the combining cell group (CCG) may include one combining primary cell (CPCell) and one or more combining secondary cell(s) (CSCell).

In this case, the combining primary cell (CPCell) becomes a scheduling subject for a CCG and functions to deliver a TB to be redundantly transmitted to a combining secondary cell.

That is, in FIG. 34, a CCG may include (C1, C2, C3) or (C1, C4, C6). Furthermore, C1 may be the aforementioned CPCell.

If all of CCs belonging to a CCG is configured from one scheduler and one eNB, a CPCell configuration may be neglected.

In this case, a CC in which multi-path HARQ combining is performed is preferably applied to a CC(s) in which one multiplexing function has been applied to a given UE within the same eNB/scheduler.

In the case of the existing technology, one multiplexing function has been applied to data generated from one eNB/scheduler with respect to one UE.

In the multi-path HARQ combining method proposed in this specification, however, a multiplexing function may be applied to a specific bearer(s) mapped as a specific CC(s).

This is described with reference to FIGS. 36b or 37a/37c and 38.

A case where a minimum configuration unit of a CCG is a cell group (CG) is described.

If a Minimum Configuration Unit of a CCG is a Cell Group (CG)

In the multi-connectivity environment, if a minimum configuration unit of a CCG is a CG, a CCG may include a bundle of specific master cell groups (MCGs) or secondary cell groups (SCGs).

This means that a configuration can be performed so that data transmitted in a specific MCG or SCG is redundantly transmitted in another SCG or MCG of a UE.

That is, the CG belonging to the above-defined combining cell group (CCG) may include one combining primary cell group (cPCG) and one or more combining secondary cell groups (cSCGs).

In this case, one of cell groups (CGs) belonging to a specific eNB having an S-GW and an S1-U interface may be configured as a combining primary cell group (cPCG).

A CG as a minimum configuration unit of a CCG may be used if multi-path HARQ combining is configured based on an eNB/scheduler unit not a CC.

Referring to FIG. 34, it may be seen that a CCG includes (SCG1, SCG2).

In FIG. 34, the SCG1 may be configured as a cPCG. In this case, it is assumed that a CC belonging to an SCG may be one or more and all of HARQ TBs transmitted in respective CCs are the same.

What all the HARQ TBs transmitted in the respective CCs are the same may mean that all the HARQ TBs are mapped to one HARQ entity.

As described above, a CC that configures a combining cell group may have various combinations within a cell (or CC) configured in a UE in addition to the method proposed in this specification.

Furthermore, a combining cell group (CCG) may be together configured in a process for a UE to configure multi-connectivity or the CCG may be configured or updated, if necessary (depending on a specific state), after multi-connectivity is configured.

A CCG configured using the aforementioned method may be triggered so that it is activated/deactivated by the indication of an eNB or in response to a request from a UE depending on a specific state.

Hereinafter, a procedure of configuring a CCG and a procedure of activating/deactivating a configured CCG are described more specifically.

First, a procedure of configuring a CCG is described.

Combining Cell Group (CCG) Configuration Procedure

The CCG of a UE may be configured using a procedure related to the radio connection establishment of the UE.

In the case of conventional LTE, an RRC connection reconfiguration procedure may be used to establish/modify/release a radio bearer or to perform handover (HO) or to setup/modify/release measurement or to add/modify/release an SCell.

For reference, "A/B" expressed in this specification may be construed as being "A or B" or "A and B."

A CCG configuration procedure proposed in this specification is a specific function of a corresponding SCell/SCG in a process of configuring one or more CCs or SCGs in a UE like the SCell or SCG, and configures a cell or cell group for multi-path HARQ combining together.

If the CCG of a UE is configured from one or more eNBs, a CCG configuration procedure between a first eNB (e.g., MeNB) and a second eNB (e.g., SeNB(s)) must be first performed before an RRC connection reconfiguration procedure is performed.

Even in the existing LTE-A, a SeNB addition procedure has been defined to be first performed between eNBs in order to configure dual connectivity (DC).

Furthermore, a CCG configuration method may be defined to include CCG information and MAC configuration information about HARQ-combined bearers in a process of configuring a specific SCell or SCG that configures the RRC of a UE in addition to a SeNB addition procedure.

In this case, the MAC configuration information may mean the existing mac-MainConfig, MAC-MainConfigSCell, mac-MainConfig SCG.

Furthermore, the CCG information proposed in this specification may mean a new information element (IE) including a combining cell group ID (CCG ID) and a combining primary cell ID (CPCell ID).

Table 7 is a table showing an example of a CombiningCellGroup Information Element format.

TABLE 7

-- ASN1START
CombiningCellGroup information element
-- ASN1START
CombiningCellGroup ::=    SEQUENCE {
    ccg-Index               INTEGER (0..xx),
    combiningPrimaryId      ENUMERATED {CellGroupId, PhysCellId}
    ccg-Deadline            ENUMERATED {x, y, z}
}
-- ASN1STOP Table 8 shows fields within the CCG IE described in Table 7.

TABLE 8

CombiningCellGroup field descriptions ccg-Index
It is an ID for indexing the ccg of a UE and has a unique value within the UE. An index range may be set by taking into consideration a maximum ccg number of one UE. If one UE can have only one ccg, a 1-bit indicator indicating whether it is a ccg or not may be definedinstead of an index.
combiningPrimaryId
If a ccg is configured in a cc unit, it means the PhysCellId of a cell indicative of a primary cell from among cells belonging to the ccg. If the ccg is configured in a cg unit, it means a CellGroupId indicative of a primary cell group from among cgs belonging to the ccg. A UE must have one combining primary cell with respect to a specific ccg index.
ccg-Deadline
A corresponding timer starts as soon as a first HARQ packet received from
a cell within a CCG is received with respect to a given HARQ PID. If an HARQ packet for the same HARQ PID is not received from all of cells within a configured CCG until the corresponding timer expires, all of HARQ packet(s) that have been received are combined as soon as the corresponding timer expires, and HARQ feedback is transmitted. If all of HARQ packet(s) for the same HARQ PID have been received from all of the cells within the configured CCG before the corresponding timer expires, the corresponding timer is terminated and HARQ feedback may be transmitted. The corresponding timer value may be defined in an SF unit or ms unit. It is assumed that such a time unit has been synchronized between a system and a UE.

An HARQ CCG configuration method proposed in this specification may be divided into three scenarios like (1) if a CCG is configured within the same scheduler (eNB), (2) if a CCG is configured in a CG unit within different schedulers (eNBs), and (3) if a CCG is configured in a CC unit within different schedulers (eNBs).

Each of the scenarios and a procedure required in each scenario are described specifically.

(Scenario 1) if a CCG is Configured within the Same Scheduler (eNB)

Scenario 1 in which a CCG is configured is a method of transmitting and receiving the same HARQ data through specific two or more cells when the two or more cells of configured cells belong to a CCG if a UE transmits and receives data using a carrier aggregation (CA).

That is, an HARQ CCG may be configured through a process of performing SCell add/modify/release of an eNB and a UE.

The CCG information (CCG index, etc.) described in Table 7 may be included in sCellIndex within an RRC Connection Reconfiguration message transmitted in order to add or modify an sCell as in FIG. 35.

FIG. 35 shows an example of a method of configuring a CCG within the same scheduler (eNB), which is proposed in this specification.

Referring to FIG. 35, an RRC connection reconfiguration message transmitted from an eNB (or EUTRAN) to a UE in order to add or modify an SCell includes the CCG information of Table 7.

Thereafter, the UE transmits an RRC connection reconfiguration complete message, providing notification that the RRC connection reconfiguration has been completed, to the eNB.

FIG. 36 is a diagram showing an example of Layer 2 structure for a CCG configuration, which is proposed in this specification.

Specifically, FIG. 36a shows a case where a CCG is configured with respect to all of bearers of a UE, and FIG. 36b shows a case where a CCG is configured with respect to a specific bearer(s) of a UE.

As shown in FIG. 36, a UE and an eNB may map data transmitted and received from a corresponding cell to the same HARQ entity with respect to sCellIndex including CCG information.

That is, it may be seen that one HARQ entity per CCG may be mapped to a CCG proposed in this specification unlike a conventional CA in which one HARQ entity per CC has been configured.

A configuration may be possible so that an HARQ packet generated from a multiplexed HARQ TB is transmitted through each CC with respect to all of bearers configured in a UE (FIG. 36a) or a configuration may be possible so that corresponding data is redundantly transmitted through a CC within a CCG after a multiplexing function is performed on a specific bearer (FIG. 36b).

If a UE is defined as a specialized UE that requires high reliability, the case of FIG. 36a is preferably applied. If a UE is defined to require high reliability with respect to a specific service of a general-purpose UE, the case of FIG. 36b is preferably applied.

(Scenario 2) if a CCG is Configured in a CG Unit within Different Schedulers (eNBs)

Scenario 2 is a method of transmitting and receiving the same HARQ data through corresponding CGs when specific two or more cell groups of configured cell groups belong to a CCG if a UE transmits and receives data using multi-connectivity.

That is, a CCG may be configured through the SCG add/modify/release execution process of an eNB and a UE.

As in FIG. 37, after an SCG configuration process is first performed between eNBs, the eNB may configure a CCG through the RRC Connection Reconfiguration process with the UE.

In this case, information for adding or modifying the SCG may include CCG information.

For the CCG information, reference is made to Table 7.

In FIG. 37, the eNB that transmits a SeNB addition request message may be a MeNB or a SeNB in which a cPCG has been configured.

That is, a representative eNB that controls a specific CCG of the UE may transmit the SeNB addition Request message.

This means that a cell policy to manage the multi-connectivity of a UE must be observed.

That is, if a C-plane is configured through only a MeNB, the SeNB Addition Request message may be transmitted through the MeNB. If a C-plane can be configured with respect to a SeNB, the SeNB Addition Request message may be transmitted through the SeNB.

FIG. 37 shows an example of a procedure of configuring a CCG of a CG unit within different schedulers (eNBs), which is proposed in this specification.

FIG. 38 is a diagram showing another example of Layer 2 structure in the method of configuring a CCG, which is proposed in this specification.

As shown in FIG. 38, a UE and an eNB map the data of bearers transmitted from the cell group (CG) to one HARQ entity through one multiplexing with respect to a cell group including CCG information.

That is, a CCG proposed in this specification may map one HARQ entity per CCG unlike conventional dual connectivity (DC) in which one HARQ entity per CC has been configured.

Furthermore, this means that a packet generated from a multiplexed HARQ TB may be redundantly transmitted through each CC configured for a cSCG with respect to all of bearers configured for the cPCG of a UE.

FIGS. 38(a) and 38(b) show examples for Layer 2 structure in the case where the MCG of a UE is configured as a cPCG of a CCG and data that may be transmitted in the MCG is redundantly transmitted through a specific CeNB (combining eNB).

In this case, the CeNB capable of configuring a cSCG may be the same as a SeNB as in FIG. 38a or may be configured as a specific SeNB different from the SeNB as in FIG. 38b.

FIGS. 38(c) and 38(d) show examples for Layer 2 structure in the case where a specific SCG of a UE is configured as a cPCG of a CCG and data that may be transmitted in the SCG is redundantly transmitted through a specific CeNB (combining eNB).

In this case, the CeNB capable of configuring a cSCG may be the same as the MeNB of a UE as in FIG. 38c or may be configured as a specific SeNB different from the SeNB as in FIG. 38d.

If the CeNB proposed in Scenario 2 independently operates as a CeNB only, a CCG may be configured using the same method as that of a conventional SCG configuration, but it may be assumed that a new DRB (split DRB or SCG DRB) mapped to the corresponding SCG is not present.

For more detailed contents, reference is made to FIG. 38.

FIG. 38a shows an example if multi-path HARQ combining is performed through a secondary eNB, FIG. 38b shows an example if multi-path HARQ combining is performed through a combining eNB, that is, if a SeNB and a CeNB are not identical (SeNB CeNB), FIG. 38c shows an example if multi-path HARQ combining is performed through a master eNB, and FIG. 38d shows an example if multi-path HARQ combining is performed through a combining eNB, that is, if a MeNB and a CeNB are not identical (MeNB CeNB).

(Scenario 3) if a CCG is Configured in a CC Unit within Different Schedulers (eNBs)

Scenario 3 shows a method of transmitting and receiving the same HARQ data through corresponding CCs when specific two or more CCs belonging to different cell groups from among all of CCs within a configured cell group belong to one CCG if a UE transmits/receives data using multi-connectivity.

In this case, the CCG may be configured through the Scell or SCG add/modify/release execution process of the eNB and the UE.

Furthermore, in order to configure CCs belonging to different eNBs as a CCG, after an SCG configuration process between eNBs is first performed, the corresponding eNBs configure the CCG through an RRC Connection Reconfiguration process with the UE.

In this case, information for adding or modifying the Scell or the SCG may include CCG information and may be transmitted.

However, the subject that manages the information must comply with a cell policy that manages multi-connectivity of the UE.

That is, if a C-plane is configured through only a MeNB, although a cPCell has been configured with respect to a SeNB, a SeNB Addition Request message or the RRC connection reconfiguration message of a UE may be transmitted through the MeNB only.

Furthermore, if a C-plane can be configured with respect to a SeNB for a cPCell, a SeNB Addition Request message may be transmitted through the SeNB.

Scenario 3, that is, a CCG configuration procedure of a CG unit within different schedulers (eNBs), is the same as FIG. 37, and FIG. 39 shows an example of Layer 2 structure therefor.

FIG. 39 is a diagram showing yet another example of Layer 2 structure in the method of configuring a CCG, which is proposed in this specification.

FIG. 39a shows an example if multi-path HARQ combining is performed through a CC of a secondary eNB (SeNB), which is proposed in this specification. FIG. 39b shows an example (SeNB≠CeNB) if multi-path HARQ combining is performed through a combining eNB (CeNB), which is proposed in this specification. FIG. 39c shows an example if multi-path HARQ combining is performed through a master eNB (MeNB), which is proposed in this specification. FIG. 39d shows an example (MeNB≠CeNB) if multi-path HARQ combining is performed through a combining eNB (CeNB), which is proposed in this specification.

CCG Activation/Deactivation Procedure

A procedure for CCG activation/deactivation is described below.

If the CCG of a UE is configured through a CCG configuration procedure, HARQ data may be redundantly transmitted to a UE through the configured CCG.

In this case, the HARQ data redundant transmission for the configured CCG may be configured to be activated or deactivated depending on a specific condition.

The activation or deactivation of the CCG may be performed in response to a request from a UE or based on the policy of an eNB based on the measurement results of the UE.

If the UE determines that a specific UE/service does not satisfy required reliability because the measurement results were measured in a specific threshold or less, the UE may request the activation of HARQ combining through a multi-path from the eNB.

This may be performed using various trigger conditions based on a multi-connection procedure policy in a multi-connectivity environment.

Furthermore, a conventional Scell activation/deactivation method may be applied to the CCG activation/deactivation method without any change or an eNB activation/deactivation method of multi-connectivity may be applied thereto.

2. Multiple HARQ Packet(s) Transmission and Reception Method Through HARQ CCG

A method of transmitting and receiving multiple HARQ packets generated from the same HARQ TB through a configured HARQ CCG is described below.

A combining eNB (CeNB) may include a CeNB (CPeNB) including a cPCell and a CeNB (CSeNB) including a cSCell.

The corresponding eNBs must generate and transmit the same HARQ TB so that a UE can combine HARQ TBs received through different paths.

To this end, it is defined that all of CeNBs belonging to a CCG should transmit the same HARQ TB using the same scheduling information.

That is, a process for the CPeNB to generate common scheduling information based on channel information of each CeNB(s) and to deliver the common scheduling information and data (RLC PDU or MAC PDU) for generating the HARQ TB to each CSeNB(s) is first performed.

Furthermore, to this end, the CSeNB(s) needs to periodically transmit channel state information of the UE to the CPeNB in advance through specific control information of an X2 interface.

The common scheduling information shared between the CeNBs may be information (1) to (5) below.

Accordingly, each CeNB(s) can transmit multiple HARQ packets generated from the same HARQ TB because the information (1) to (5) is shared along with an RLC PDU(s) or MAC PDU on which HARQ combining will be performed through the X2 interface between the CeNBs.

(1) Physical resource size: RB size
(2) Modulation and coding scheme (MCS) level
(3) Transport block (TB) size
(4) HARQ redundancy version (RV)
(5) CCG deadline (timer)

The CSeNB(s) that has received the information (1) to (5) generates a TB based on the received RLC PDU(s) or MAC PDU and maps data to a physical resource through channel coding.

In this case, a DL grant transmitted by each CeNB(s) includes an RB size, MCS level, RV, etc. based on the information (1) to (5).

That is, when the CSeNB generates the resource information field (value) of the DL grant for transmitting the corresponding TB, it selects RB resource location information (frequency, time) using the RB size received from the CPeNB.

That is, a resource location value may be different for each CeNB, but the sizes of resources used in all of CeNB(s) are the same.

Furthermore, if an RV is transmitted from the CPeNB, each CSeNB transmits HARQ coded bits based on the RV received from the CPeNB.

If the CPeNB has not transmitted the RV to the CSeNB, the CSeNB may transmit a randomly selected RV.

Furthermore, in a multi-path HARQ data combining method, new data for a specific HARQ PID is always transmitted by a CPeNB.

That is, an NDI for data transmitted by the CSeNB needs to be configured to always provide notification that transmission is retransmission, and means that the NDI is transmitted after a packet transmitted by the CPeNB.

Furthermore, CeNBs need to transmit a packet for an HARQ TB within a CCG deadline (timer) received from a CPeNB.

The CCG deadline (timer) value may be an absolute time value within a network or a relative time value from timing when a corresponding message has been received.

If an HARQ TB is not scheduled in the downlink within the CCG deadline timer, a CeNB cancels the transmission of the HARQ TB. The CCG deadline time needs to be configured so that it is synchronized with a ccg-Deadline (time) value transmitted to a UE.

If two eNBs generate the same HARQ TB through the sharing of an RLC PDU(s) between eNBs, a UE should not add/delete other MAC control information in addition to the shared RLC PDU(s) when a MAC PDU is generated.

Such a method is preferably used if multi-path HARQ combining is applied with respect to only a specific bearer(s).

Furthermore, MAC control information for controlling a UE is preferably transmitted when data for non-combined other bearers is transmitted.

As described above, if a UE receives one or more data from different cells belonging to the same CCG although it has received the data from the different cells, the UE maps the corresponding data to the same HARQ soft buffer, combines one or more HARQ data, and performs decoding.

That is, data for the same HARQ Process ID in a DL grant transmitted by one or more cells belonging to the same CCG is stored in the same HARQ soft buffer.

After all of the received packets are combined or when a ccg-Deadline timer expires, the UE decodes the combined packets.

The UE transmits one feedback for multiple HARQ packets for an HARQ PID # n, received while the ccg-Deadline timer operates, to a transmission stage (eNB).

In this case, the feedback may be transmitted through one or more of CCs in which HARQ packets have been transmitted.

FIG. 40 is a diagram showing an example of a redundant transmission method of an HARQ packet through a CCG, which is proposed in this specification.

FIG. 41 is a flowchart showing an example of a method of processing HARQ packets received through a multi-path, which is proposed in this specification.

Referring to FIG. 41, a UE receives an HARQ packet for an HARQ PID # n (S4101).

Thereafter, the UE checks a CC in which the received HARQ packet is transmitted (S4102), and confirms whether the checked CC is a CC belonging to a CCG (S4103).

If, as a result of the confirmation, the received HARQ packet is not an HARQ packet transmitted by a CC belonging to the CCG, the UE performs an HARQ procedure using a conventional method (S4104).

If, as a result of the confirmation in step S4103, the received HARQ packet is an HARQ packet transmitted by a CC belonging to the CCG, the UE confirms whether the corresponding HARQ packet is new data (S4105).

If, as a result of the confirmation, the corresponding HARQ packet is new data, the UE starts a ccg-Deadline timer (or runs it) (S4106).

Thereafter, the UE stores the corresponding packet in an HARQ buffer corresponding to the HARQ PID # n (S4107).

Thereafter, the UE checks whether the ccg-Deadline has expired or the reception of all of packets from the CCG has been terminated (S4108).

If new data has not been received in step S4105, the UE performs step S4109.

That is, if new data has not been received and retransmission data has been received in step S4105, the UE combines packets stored in an HARQ buffer for an HARQ PID # n (S4109).

Thereafter, if the ccg-Deadline has expired or all of packets have been received from the CCG, the UE terminates the ccg-Deadline timer and performs decoding on the received packets (S4110).

Thereafter, the UE checks whether the decoding on the received packets is successful (S4111).

If, as a result of the check in step S4111, the decoding is not successful, the UE transmits HARQ NACK to the eNB (S4112).

If, as a result of the check in step S4111, the decoding is successful, the UE transmits HARQ ACK to the eNB (S4113).

Thereafter, the UE flushes the HARQ buffer for the HARQ PID # n (S4114).

Furthermore, the UE confirms whether a maximum retransmission number of the received packet has been exceeded after step S4112 (S4115).

If, as a result of the confirmation in step S4115, the maximum retransmission number has been exceeded, the UE performs step S4114.

If, as a result of the confirmation in step S4115, the maximum retransmission number has not been exceeded, the UE performs step S4101.

FIG. 42 is a diagram showing an example of a multi-path HARQ combining execution method through a CCG, which is proposed in this specification.

FIG. 42*a* shows an example if all of packets have been received before the ccg-Deadline timer expires, and FIG. 42*b* shows an example if all of packets have not been received before the ccg-Deadline timer expires.

FIG. 42 shows an operation principle in which packets 1A, 1B, and 1C for an HARQ PID # n received from (CC1, CC2, CC3) are processed if the CCG of a UE includes the (CC1, CC2, CC3).

In this case, all of the packets 1A, packet 1B, and packet 1C indicate coded bits generated from the same HARQ TB.

That is, this means that in the case of an operation in an HARQ chase combining (CC) mode, all of the packets 1A, 1B, and 1C transmitted from the CC1, CC2, and CC3 are packets configured as the same coded bits.

Furthermore, this means that in the case of an operation in an HARQ incremental redundancy (IR) mode, coded bits for different redundancy versions (RVs) are transmitted in the packets 1A, 1B, and 1C transmitted from the CC1, CC2, and CC3.

As shown in FIG. 42*a*, when a UE receives the Packet 1A indicative of new data (S4201), the UE starts (or runs) a ccg-Deadline timer (S4202).

Thereafter, when the UE receives the retransmission data packet 1B (S4203), the UE performs combining on the packet 1A and the packet 1B (S4204).

Such (HARQ) combining is performed until packets are received from CCs belonging to all of CCGs.

If the UE has received the last HARQ packet before the ccg-deadline timer expires, the UE stops the ccg-deadline timer (S4205).

Furthermore, after the UE combines all of the received packets, that is, the packet 1A, packet 1B, and packet 1C (S4206), the UE performs decoding and feeds (or transmits) the decoding results back to the eNB (S4207).

Referring to FIG. 42*b*, when a UE receives the Packet 1A indicative of new data, the UE runs (or starts) a ccg-Deadline timer.

Thereafter, when the UE receives the packet 1B, that is, the retransmission data of the packet 1A, the UE performs combining on the packet 1A and the packet 1B.

As described above, the combining of the packets is performed until packets are received from CCs belonging to all of CCGs.

However, when the timer expires before the last HARQ packet is received, the UE combines only packets (packets 1A and 1B) received while the timer is driven, performs decoding, and transmits the decoding results to an eNB.

FIGS. 42a and 42b show examples in which a UE transmits feedback through a combining primary cell (CP-cell, CC1), but the feedback may be transmitted in one or more cells of CCs belonging to a CCG.

General Apparatus to which the Present Invention May be Applied

FIG. 43 illustrates a block diagram of a wireless communication device to which the methods proposed in this specification may be applied.

Referring to FIG. 43, a wireless communication system includes an eNB 20 and multiple UEs 10 disposed in the eNB (20) area.

The eNB 20 includes a processor 4311, a memory 4312 and a radio frequency (RF) unit 4313. The processor 4311 implements the functions, processes and/or methods proposed in FIGS. 1 to 42. The layers of a radio interface protocol may be implemented by the processor 4311. The memory 4312 is connected to the processor 4311 and stores a variety of types of information for driving the processor 4311. The RF unit 4313 is connected to the processor 4311 and transmits and/or receives radio signals.

The UE 10 includes a processor 4321, a memory 4322 and an RF unit 4323.

The processor 4321 implements the functions, processes and/or methods proposed in FIGS. 1 to 42. The layers of a radio interface protocol may be implemented by the processor 4321. The memory 4322 is connected to the processor 4321 and stores a variety of types of information for driving the processor 4321. The RF unit 4323 is connected to the processor 4321 and transmits and/or receives radio signals.

The memory 4312, 4322 may be positioned inside or outside the processor 4311, 4321 and may be connected to the processor 4311, 4321 by various well-known means.

For example, in order to transmit and receive downlink (DL) data in a wireless communication system supporting a low latency service, a UE may include a radio frequency (RF) unit for transmitting and receiving radio signals; and a processor functionally connected to the RF unit.

Furthermore, the eNB 20 and/or the UE 10 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method of performing an HARQ in a wireless communication system of this specification has been described based on an example in which it is applied to the 3GPP LTE/LTE-A system and the 5G system (new RAT system), but may be applied to various wireless communication systems in addition to the 3GPP LTE/LTE-A system and the 5G system.

The invention claimed is:

1. A method of performing, by a user equipment (UE), a hybrid automatic request (HARQ) in a wireless communication system, the method comprising:
   receiving a first data from a first eNB through a first radio link;
   receiving a second data from at least one second eNB through a second radio link;
   combining the first data and the second data;
   decoding the combined data; and
   feedbacking results of the decoding through at least one of the first radio link or the second radio link,
   wherein the first radio link and the second radio link indicate a cell or cell group (CG) of a combining cell group (CCG),
   wherein the combining cell group (CCG) indicates a set of at least one cell or cell group capable of transmitting and receiving different HARQ data generated from an identical HARQ transport block (TB), and
   wherein the combining comprises:
      confirming whether the second radio link is included in the combining cell group (CCG);
      based on the second radio link being included in the CCG, confirming whether the second data received through the second radio link is new data or is a retransmission of the first data; and
      combining the first data and the second data based on that the second data is the retransmission of the first data.

2. The method of claim 1, further comprising:
   running an HARQ-related timer,
   wherein the HARQ-related timer runs when the initial data is received; and
   confirming whether the retransmission data has been fully received until the HARQ-related timer expires.

3. The method of claim 2, wherein if, as a result of the confirmation, the retransmission data has not been fully received until the HARQ-related timer expires, the feedback is performed on HARQ data received until the HARQ-related timer expires.

4. The method of claim 1, wherein:
the first eNB is a combining primary eNB (CPeNB),
the second eNB is a combining secondary eNB (CSeNB), and
the combining primary eNB is connected to a serving gateway (S-GW) through an S1-U interface.

5. The method of claim 1, wherein:
the combining cell group (CCG) comprises at least two of a primary cell (Pcell), a primary secondary cell (PScell) and a secondary cell (Scell), or
the combining cell group (CCG) comprises a set of master cell groups (MCGs) or secondary cell groups (SCGs).

6. The method of claim 1, further comprising:
configuring the combining cell group,
wherein configuring the combining cell group comprises receiving a first message comprising a combining cell group (CCG) information element (IE).

7. The method of claim 6, wherein the first message is an RRC connection reconfiguration message.

8. The method of claim 6, wherein the combining cell group information element (CCG IE) comprises at least one of a CCG index field to index a specific CCG, a physical cell identifier (PhysCellid) field indicative of a primary cell or primary cell group of a cell or cell group belonging to the CCG, or a ccg-deadline field indicative of an HARQ-related timer.

9. The method of claim 6, wherein the combining cell group information element (CCG IE) is exchanged between the first eNB and the second eNB through an X2 interface before the CCG is configured.

10. The method of claim 6, further comprising:
receiving a second message indicative of an activation or deactivation of the configured combining cell group.

11. A user equipment (UE) for performing a hybrid automatic request (HARQ) in a wireless communication system, the user equipment comprising:
a radio frequency (RF) unit for transmitting and receiving radio signals; and
a processor functionally connected to the RF unit, wherein:
the processor controls to:
receive first data from a first eNB through a first radio link;
receive second data from at least one second eNB through a second radio link;
combine the first data and the second data;
decode the combined data; and
feedback results of the decoding through at least one of the first radio link or the second radio link,
wherein the first radio link and the second radio link indicate a cell or cell group (CG) of a combining cell group (CCG), and
wherein the combining cell group (CCG) indicates a set of at least one cell or cell group capable of transmitting and receiving different HARQ data generated from an identical HARQ transport block (TB), and
wherein the processor combines the first data and the second data by:
confirming whether the second radio link is included in the combining cell group (CCG);
based on the second radio link being included in the CCG, confirming whether the second data received through the second radio link is new data or is a retransmission of the first data; and
combining the first data and the second data based on that the second data is the retransmission of the first data.

* * * * *